US 12,297,675 B2

(12) United States Patent
Sakamoto

(10) Patent No.: US 12,297,675 B2
(45) Date of Patent: May 13, 2025

(54) DOOR HANDLE APPARATUS FOR VEHICLE

(71) Applicant: AISIN CORPORATION, Kariya (JP)

(72) Inventor: Mizuya Sakamoto, Kariya (JP)

(73) Assignee: AISIN CORPORATION, Kariya (JP)

( * ) Notice: Subject to any disclaimer, the term of this patent is extended or adjusted under 35 U.S.C. 154(b) by 143 days.

(21) Appl. No.: 17/811,615

(22) Filed: Jul. 11, 2022

(65) Prior Publication Data
US 2023/0033811 A1 Feb. 2, 2023

(30) Foreign Application Priority Data
Jul. 28, 2021 (JP) ................................. 2021-123147

(51) Int. Cl.
E05B 85/10 (2014.01)
B60J 5/04 (2006.01)
E05B 85/16 (2014.01)

(52) U.S. Cl.
CPC .......... *E05B 85/107* (2013.01); *B60J 5/0468* (2013.01); *E05B 85/103* (2013.01); *E05B 85/16* (2013.01)

(58) Field of Classification Search
CPC ...... E05B 85/103; E05B 85/105; E05B 85/16; B60J 5/0468
See application file for complete search history.

(56) References Cited

U.S. PATENT DOCUMENTS

| 5,035,455 A * | 7/1991 | Kurosaki | E05B 17/0041 292/201 |
| 6,367,124 B1 * | 4/2002 | Bella | E05B 17/0041 292/336.3 |
| 11,339,584 B2 * | 5/2022 | Fujiwara | E05B 5/003 |
| 2011/0148575 A1 * | 6/2011 | Sobecki | E05B 5/006 292/336.3 |

(Continued)

FOREIGN PATENT DOCUMENTS

| CN | 112049532 A * | 12/2020 | ............. E05B 85/16 |
| EP | 3 067 494 A1 | 9/2016 | |

(Continued)

OTHER PUBLICATIONS

Espacenet machine translation of KR 102104888 B1, generated Mar. 22, 2024. (Year: 2024).*

(Continued)

*Primary Examiner* — Eugene G Byrd
*Assistant Examiner* — Emily G. Brown
(74) *Attorney, Agent, or Firm* — Oblon, McClelland, Maier & Neustadt, L.L.P.

(57) ABSTRACT

A door handle apparatus for a vehicle includes: a grip that is allowed to be gripped from a vehicle exterior of the door panel, the grip being supported so as to be rotatable around a shaft extending in a predetermined direction, rotating in a first direction from a first state in which an outer surface of the grip is located in a same plane as an outer surface of the door panel to be transitionable to a second state in which the (Continued)

grip protrudes from the outer surface of the door panel, and rotating in a second direction opposite to the first direction from the second state to be transitionable to the first state; a biasing device that causes the grip to rotate in the second direction; and a resistance force generation device that generates a resistance force.

4 Claims, 40 Drawing Sheets

(56) References Cited

U.S. PATENT DOCUMENTS

| | | | | |
|---|---|---|---|---|
| 2016/0053517 | A1* | 2/2016 | Tomaszewski | E05B 81/06 200/573 |
| 2016/0273247 | A1* | 9/2016 | Fujiwara | G05G 9/02 |
| 2017/0089102 | A1* | 3/2017 | Yoshino | E05B 79/22 |
| 2018/0171686 | A1 | 6/2018 | Couto Maquieira et al. | |
| 2019/0283555 | A1 | 9/2019 | Couto Maquieira et al. | |
| 2022/0154500 | A1* | 5/2022 | Jeong | E05B 77/42 |
| 2022/0170298 | A1* | 6/2022 | Wilke | E05B 85/107 |

FOREIGN PATENT DOCUMENTS

| | | |
|---|---|---|
| JP | 2008-248631 A | 10/2008 |
| JP | 2019-157611 A | 9/2019 |
| JP | 2020-090862 A | 6/2020 |
| KR | 102104888 B1 * | 4/2020 |
| WO | WO 2017/125653 A1 | 7/2017 |

OTHER PUBLICATIONS

Extended European Search Report issued Dec. 19, 2022 in European Patent Application No. 22185581.0, citing references 1-3 and 15-16 therein, 8 pages.

* cited by examiner

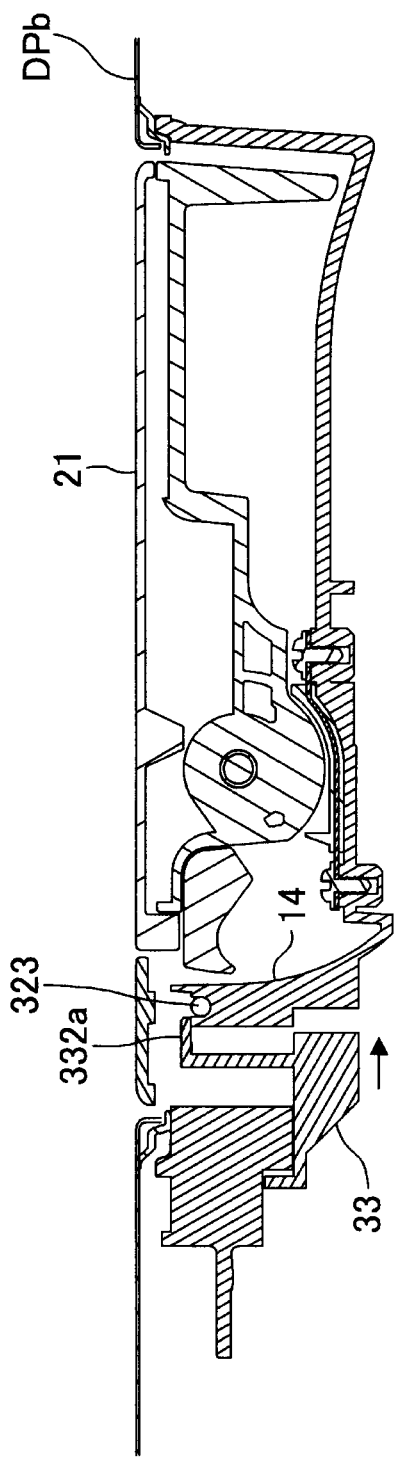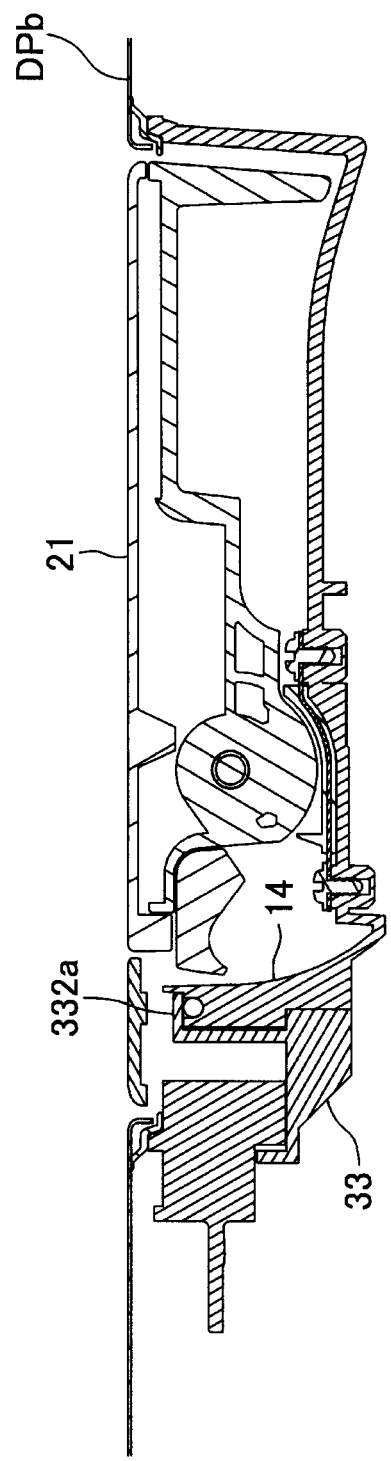
FIG. 7A
FIG. 7B

US 12,297,675 B2

DOOR HANDLE APPARATUS FOR VEHICLE

CROSS REFERENCE TO RELATED APPLICATIONS

This application is based on and claims priority under 35 U.S.C. § 119 to Japanese Patent Application No. 2021-123147, filed on Jul. 28, 2021, the entire content of which is incorporated herein by reference.

TECHNICAL FIELD

This disclosure generally relates to a door handle apparatus for a vehicle. In particular, the present disclosure relates to a door handle apparatus for a vehicle in which a grip is housed in a door panel in a normal state, and the grip protrudes (pops up) to the outside of the door panel when a user opens the door from the outside of a vehicle.

BACKGROUND DISCUSSION

A known door handle apparatus for a vehicle (hereinafter, referred to as a "conventional apparatus") including a grip gripped when a door is opened from outside of a vehicle is disclosed (refer to, for example, JP 2008-248631 A). In general, a door panel of the vehicle includes an inner panel located on a vehicle interior side and an outer panel located on a vehicle exterior side. A space is provided between the inner panel and the outer panel. The conventional apparatus is disposed in the door panel (between the inner panel and the outer panel).

The conventional apparatus includes a base and a grip. The base is a support member that supports the grip. The grip extends in a front-rear direction of the vehicle. The grip is rotatably supported around a first shaft member extending in a height direction of the vehicle. The outer panel is provided with an opening, and the grip is located in the opening. The grip is biased by a torsion spring such that one end side (a portion behind the first shaft member) of the grip in a longitudinal direction is directed toward the vehicle interior side. In a normal state (a state in which the user does not touch the grip), the grip is in contact with the base and is stationary. In this state, there is no step at a boundary between the outer surface of the grip and the outer surface of the door panel, and both the outer surfaces (the outer surface of the grip and the outer surface of the door panel) are located in the same plane. When the user pushes the other end of the grip (a portion in front of the first shaft member) toward the vehicle interior side, the grip rotates around the first shaft member, and one end of the grip protrudes (pops up) outside from the outer surface of the outer panel.

In the conventional apparatus, when the user releases a hand from the grip, the grip is biased by the torsion spring to return to the normal state. Therefore, even when the user wants to open the door again in the middle of closing the door, there is a case where the grip is already housed in the door panel, and the user cannot grip the grip. In this case, the user needs to push the other end portion of the grip to pop up the grip, and then grip the grip. Therefore, practicality (operability) of the conventional apparatus is low.

A need thus exists for a door handle apparatus for a vehicle which is not susceptible to the drawback mentioned above.

SUMMARY

A door handle apparatus for a vehicle according to the present disclosure is assembled to the door panel of the vehicle.

The door handle apparatus for a vehicle includes: a grip that is allowed to be gripped from a vehicle exterior of the door panel, the grip being supported so as to be rotatable around a shaft extending in a predetermined direction, rotating in a first direction from a first state in which an outer surface of the grip is located in a same plane as an outer surface of the door panel to be transitionable to a second state in which the grip protrudes from the outer surface of the door panel, and rotating in a second direction opposite to the first direction from the second state to be transitionable to the first state; a biasing device that causes the grip to rotate in the second direction; and a resistance force generation device that generates a resistance force against an external force causing the grip to rotate in the second direction, the external force acting on the grip from the vehicle exterior.

BRIEF DESCRIPTION OF THE DRAWINGS

The foregoing and additional features and characteristics of this disclosure will become more apparent from the following detailed description considered with the reference to the accompanying drawings, wherein:

FIG. 7A is a cross-sectional view taken along line VII-VII of FIG. 2A, the cross-sectional view illustrating a step of fixing the holder to the base;

FIG. 7B is a cross-sectional view taken along line VII-VII of FIG. 2A, the cross-sectional view illustrating a state of having fixed the holder to the base;

FIRST EMBODIMENT

Figure 1:
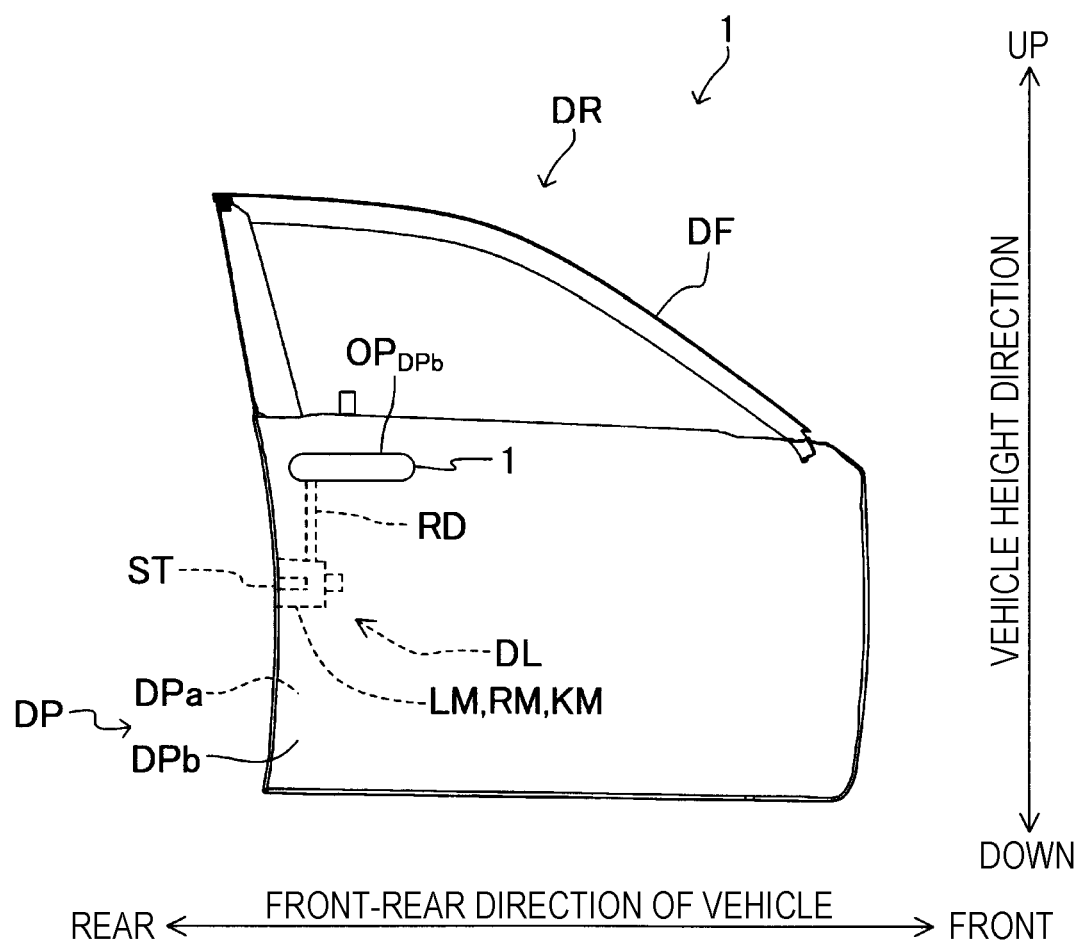
FIG. 1 is a schematic view of a door (right door of a vehicle) to which a door handle apparatus for a vehicle according to a first embodiment disclosed here is applied.

Hereinafter, a door handle apparatus 1 for a vehicle (hereinafter, simply referred to as "door handle apparatus 1") according to the first embodiment of the present disclosure will be described. First, an outline of a door DR to which the door handle apparatus 1 is applied will be described with reference to FIG. 1. The door DR is attached to an entrance provided on a side surface portion of a vehicle body. Various directions in the following description represent directions in a state in which the door DR is closed. The present embodiment is an example in which the present disclosure is implemented as a door handle of the right door DR of the vehicle, and the present disclosure can also be implemented as a door handle apparatus of another door.

The door DR includes a door panel DP and a door frame DF. The door panel DP includes an inner panel DPa and an outer panel DPb. Outer peripheral edges of the inner panel DPa and the outer panel DPb are joined to each other. The inner panel DPa and the outer panel DPb are press-molded in advance such that a space is formed between the inner panel DPa and the outer panel DPb in a state which the outer peripheral edges of the inner panel DPa and the outer panel DPb are joined to each other. That is, the door panel DP has a box shape (or a bag shape). The door frame DF as a window frame is attached to an upper portion of the door panel DP.

A front end surface of the door panel DP is assembled to an inner peripheral portion of the entrance with a hinge (not illustrated). The door panel DP rotates around a shaft of the hinge to open and close the door panel DP.

A door lock apparatus DL and the door handle apparatus 1 are attached to the door panel DP.

The door lock apparatus DL is disposed at a rear portion in the door panel DP. The door lock apparatus DL includes a latch mechanism LM that engages with a striker ST provided on the inner peripheral portion of the entrance of the vehicle to hold a state in which the door DR is closed (fully closed state). A part of the latch mechanism LM is exposed in an opening provided on a rear end surface of the door panel DP. When the door DR is closed, the striker ST enters the door panel DP through the opening, and the latch mechanism LM and the striker ST are engaged with each other.

The door lock apparatus DL includes a release mechanism RM (opening mechanism) that releases the engagement between the latch mechanism LM and the striker ST. The release mechanism RM includes a lever and a link member, which engage with the latch mechanism LM. The release mechanism RM is coupled to the door handle apparatus 1 via a rod RD. When the user pulls the grip of the door handle apparatus 1 in a state in which the door DR is closed, the release mechanism RM is driven via the rod RD, and the engagement between the latch mechanism LM and the striker ST is released.

The door lock apparatus DL further includes a locking mechanism KM. The locking mechanism KM includes an electric actuator that performs switching between a state in which the rod RD and the release mechanism RM are engaged (locked state) and a state in which the engagement is released (unlocked state). The electric actuator of the locking mechanism KM is driven by a control device (hereinafter, referred to as "ECU") (not illustrated).

(Configuration)

Next, a specific configuration of the door handle apparatus 1 will be described. The door handle apparatus 1 is assembled to an opening $OP_{Dpb}$ provided on the rear side of the outer panel DPb and above the door lock apparatus DL.

Figure 2A:
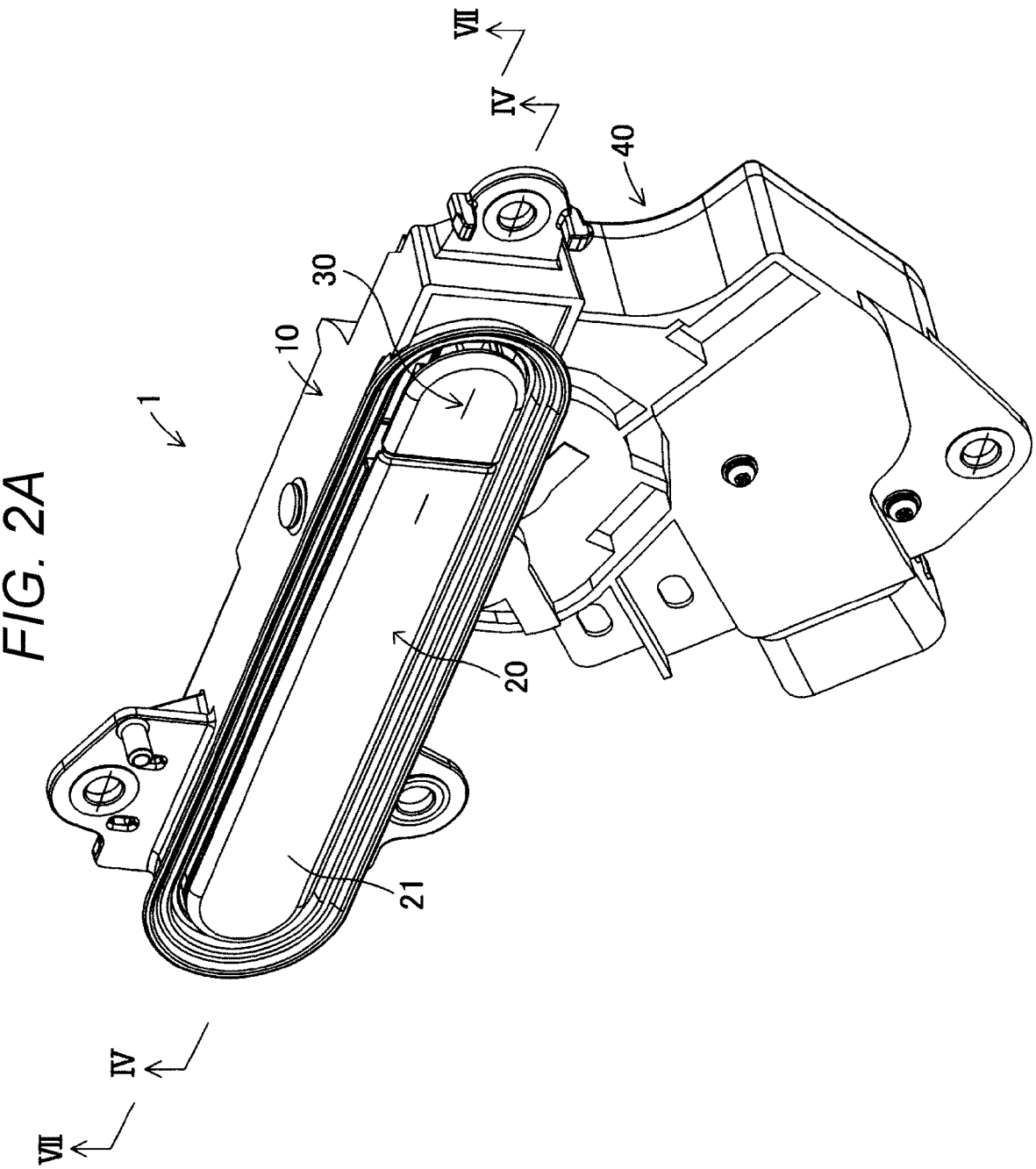
FIG. 2A is a perspective view of the door handle apparatus for a vehicle illustrated in FIG. 1 when viewed from a vehicle exterior side.
Figure 2B:
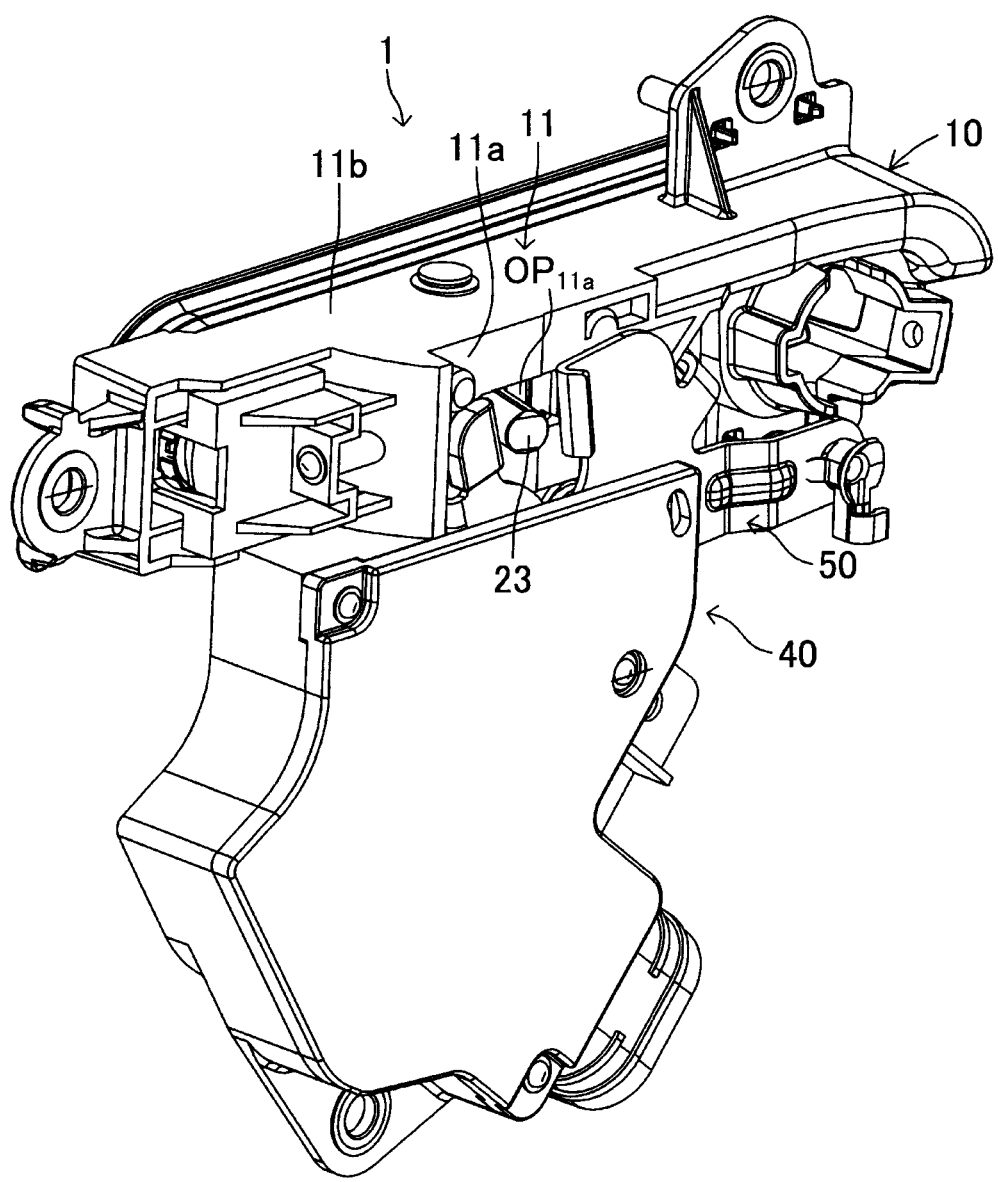
FIG. 2B is a perspective view of the door handle apparatus for a vehicle illustrated in FIG. 1 when viewed from a vehicle interior side.

As illustrated in FIGS. 2A and 2B, the door handle apparatus 1 includes a base 10, a handle 20, a switch device 30, a pop-up mechanism 40, and a bell crank 50.

Figure 3:
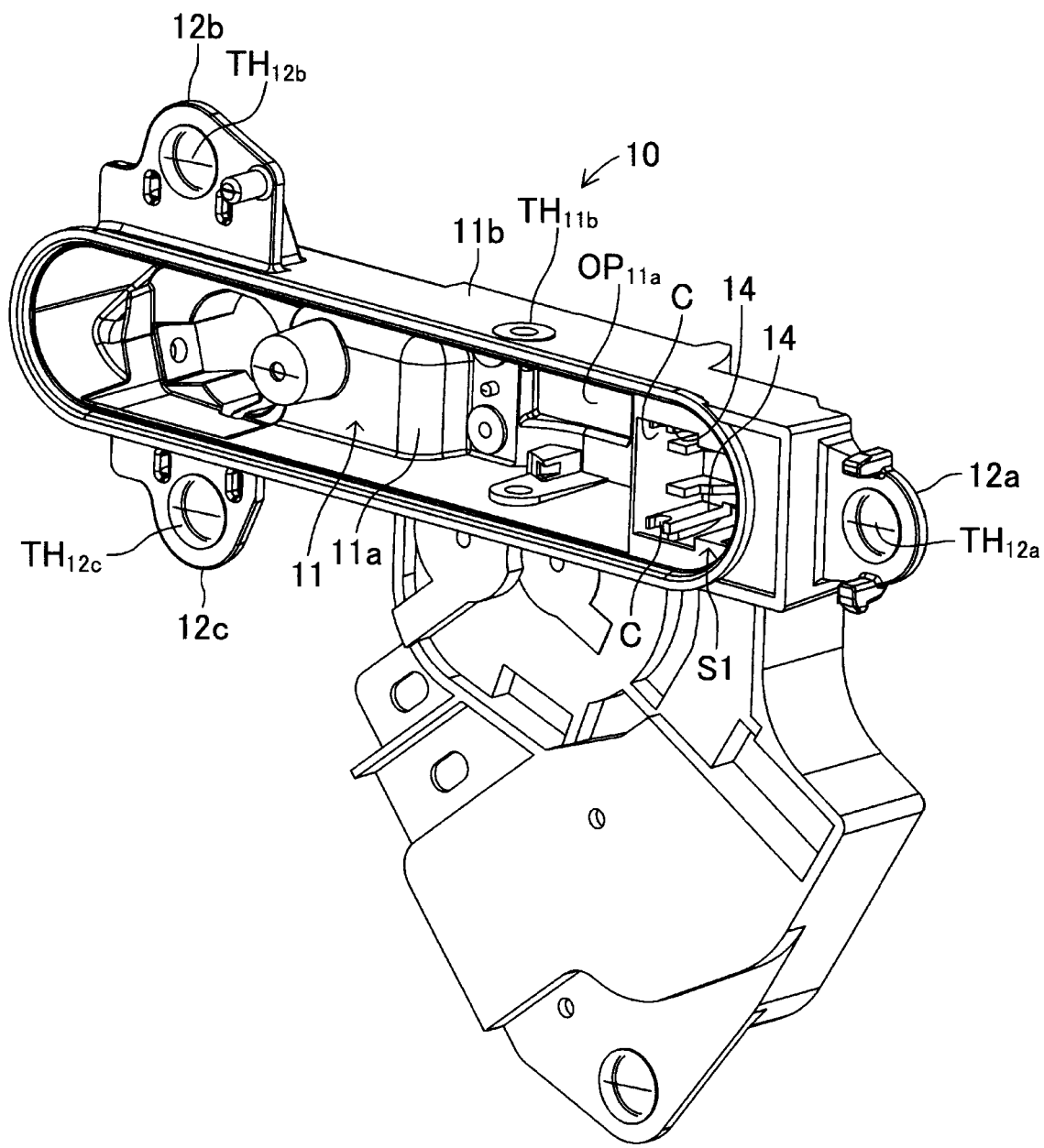
FIG. 3 is a perspective view of a base when viewed from the vehicle exterior side.

The base 10 is a support member that supports the handle 20, the switch device 30, the pop-up mechanism 40, and the bell crank 50, which will be described later. As illustrated in FIG. 3, the base 10 includes a housing portion 11 that houses the handle 20 and the switch device 30. The housing portion 11 extends in a front-rear direction of the vehicle. The housing portion 11 has a bottom wall portion 11a and a peripheral wall portion 11b. The bottom wall portion 11a is a wall portion substantially perpendicular to a vehicle width direction. The bottom wall portion 11a has a substantially elongated circular shape extending in the front-rear direction of the vehicle. An opening $OP_{11a}$ extending in the front-rear direction of the vehicle is provided on a front side of the bottom wall portion 11a. The peripheral wall portion 11b is a plate-like portion perpendicular to the bottom wall portion 11a, and is formed along a peripheral edge of a right surface (surface on the vehicle exterior side) of the bottom wall portion 11a.

The base 10 includes flange portions 12a, 12b, and 12c (refer to FIG. 3). The flange portion 12a protrudes forward from a front end of the housing portion 11. The flange portion 12b protrudes upward from an upper surface of the peripheral wall portion on an upper side of a rear end portion of the housing portion 11. The flange portion 12c protrudes downward from a lower surface of the peripheral wall portion on a lower side of the rear end portion of the housing portion 11. The flange portions 12a, 12b, and 12c are provided with through holes $TH_{12a}$, $TH_{12b}$, and $TH_{12c}$, respectively, the holes $TH_{12a}$, $TH_{12b}$, and $TH_{12c}$ penetrating in the vehicle width direction. Fastening bolts are inserted into the through holes $TH_{12a}$, $TH_{12b}$, and $TH_{12c}$, respectively, and distal ends of the fastening bolts are fastened to boss nuts provided on an inner side surface of the door panel DP. In this manner, the base 10 (door handle apparatus 1 for a vehicle) is fixed to the peripheral edge of the opening $OP_{Dpb}$ of the door panel DP.

Through holes $TH_{11b}$ penetrating in a vehicle height direction are provided in an upper wall portion and a lower wall portion of the peripheral wall portion 11b of the base 10. A shaft member 13 that rotatably supports the handle 20 to be described later is inserted into and fixed to the through holes $TH_{11b}$.

A pair of upper and lower bearing portions 14 and 14 rotatably supporting a switch cover 32 to be described later are provided at a front end portion (portion in front of the opening $OP_{11a}$) of the housing portion 11 of the base 10. The bearing portions 14 and 14 have a columnar shape extending rightward from the bottom wall portion 11a. In a plan view of the base 10, distal end portions of the bearing portions 14 and 14 are cut out in a semicircular shape. As will be described later, a shaft portion 323 of a switch cover 32 is inserted into and supported by a cutout portion C.

Figure 8A:
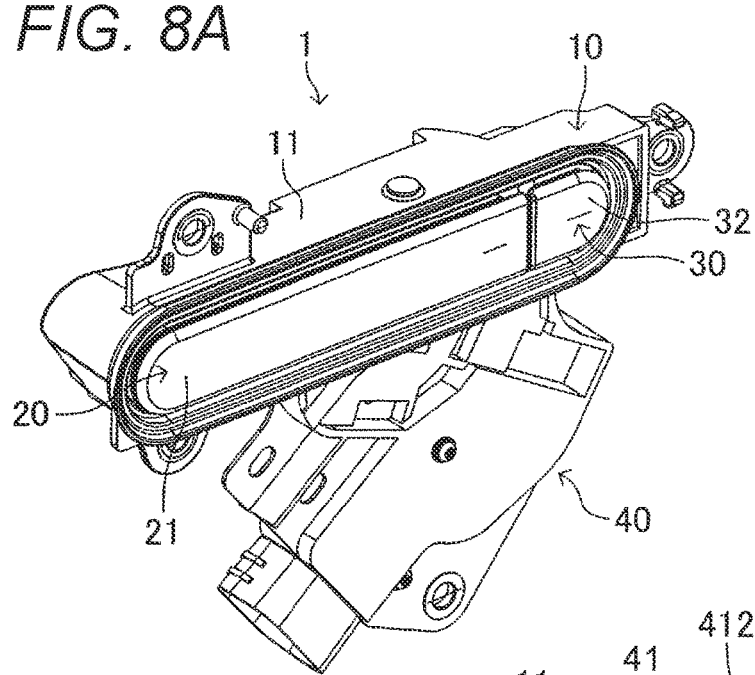
FIG. 8A is a perspective view of the door handle apparatus for a vehicle in an initial state, when viewed from the vehicle exterior side.
Figure 8B:
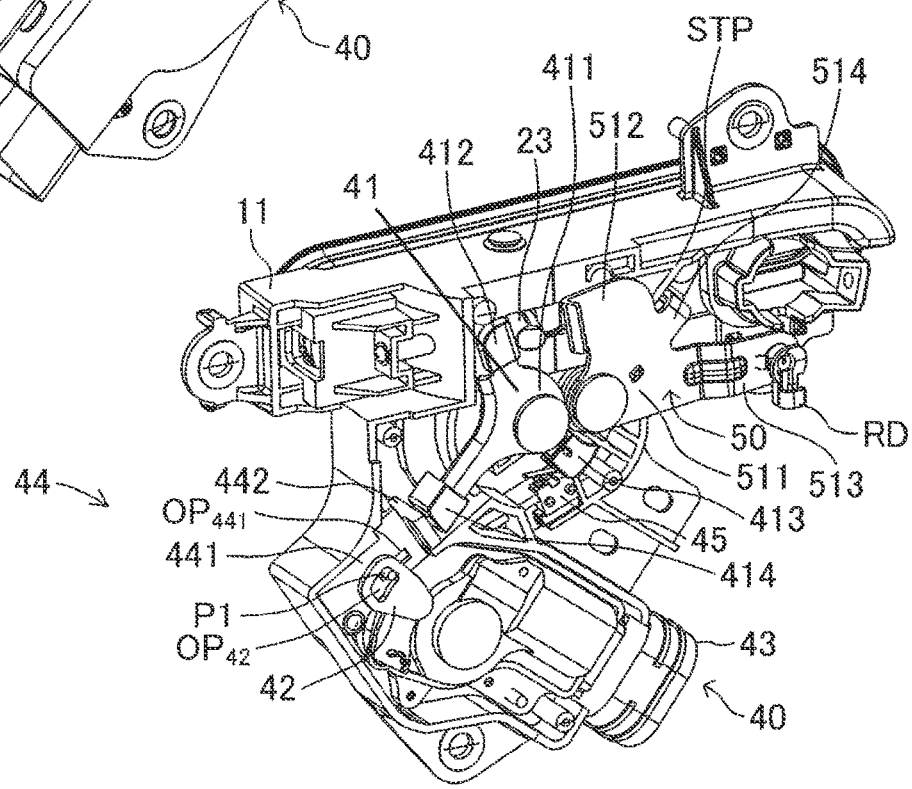
FIG. 8B is a perspective view of the door handle apparatus for a vehicle in the initial state, when viewed from the vehicle interior side.
Figure 8C:
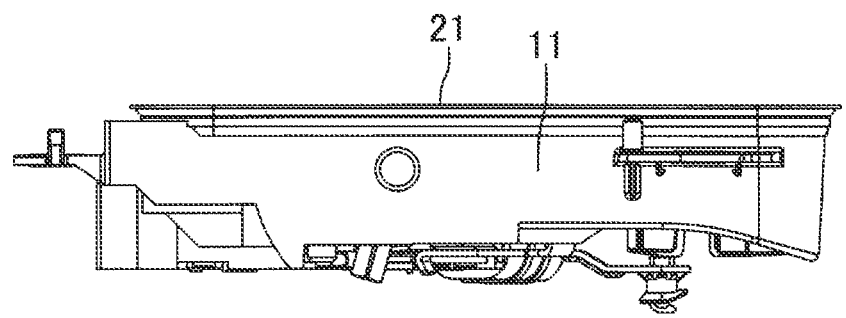
FIG. 8C is a plan view of the door handle apparatus for a vehicle in the initial state, when viewed from above.
Figure 8D:
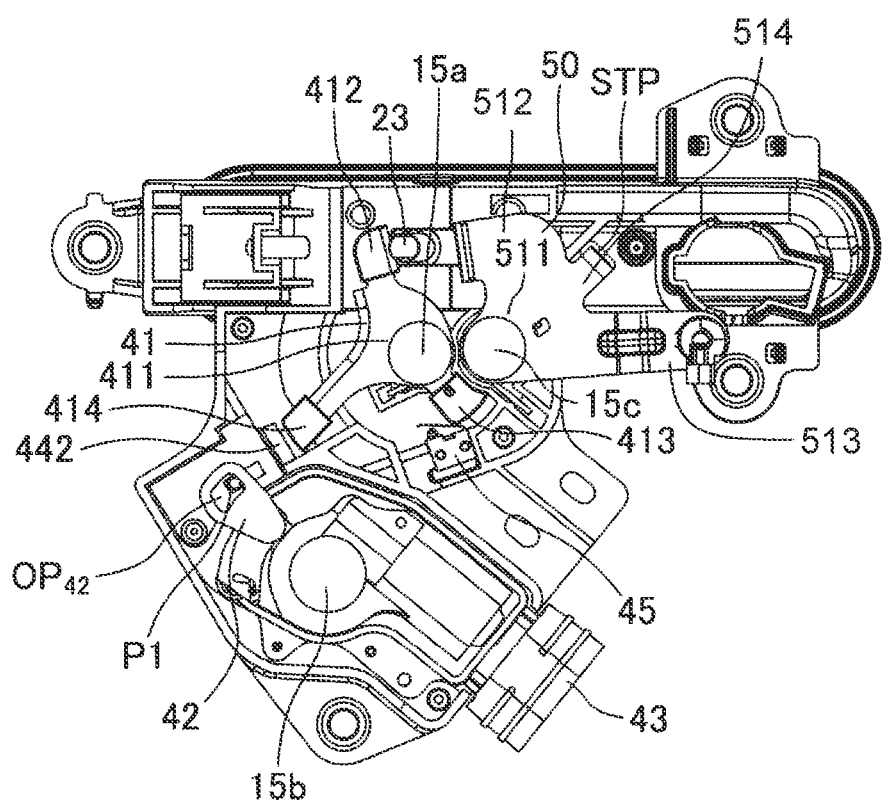
FIG. 8D is a side view of the door handle apparatus for a vehicle in the initial state, when viewed from the vehicle interior side.

In addition, on a left surface of the base 10, shaft portions 15a, 15b, and 15c extending leftward are provided (refer to FIG. 8D). These shaft portions support various levers constituting the pop-up mechanism 40 to be described later. The shaft portion 15a is located below the opening $OP_{11a}$. The shaft portion 15b is located in front of and below the shaft portion 15a (lower left side in FIG. 8D). The shaft portion 15c is located behind (right side in FIG. 8D) the shaft portion 15a.

Figure 4:
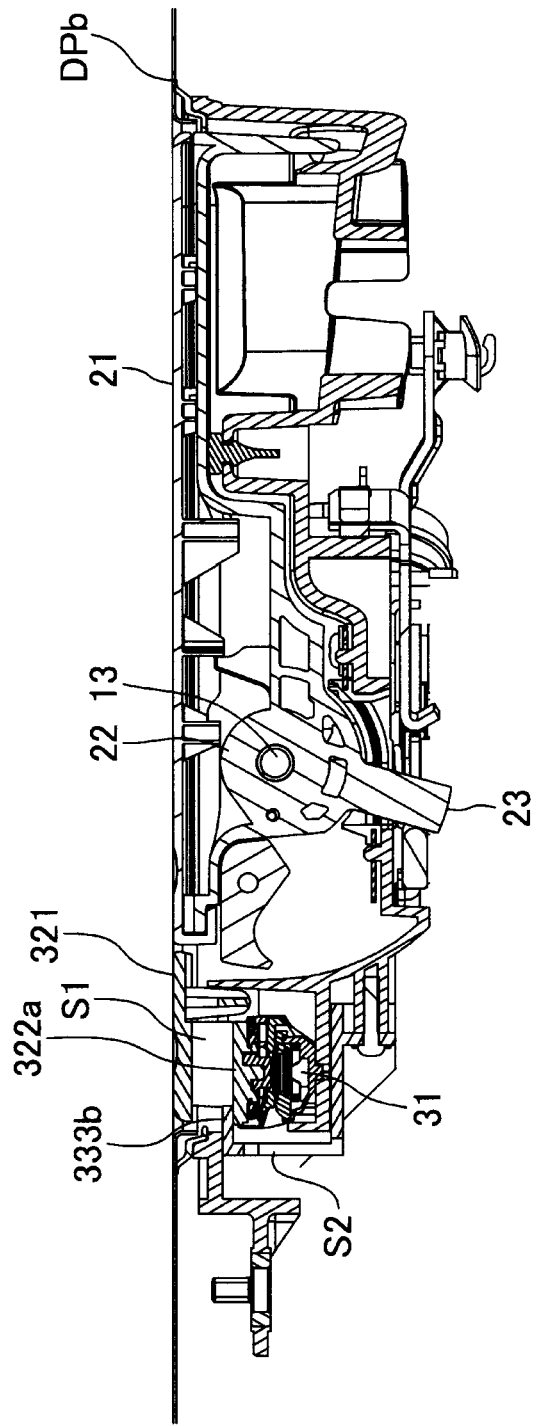
FIG. 4 is a cross-sectional view taken along line IV-IV of FIG. 2A.

The handle 20 includes a grip 21 (refer to FIG. 2A). The grip 21 has a rod shape (columnar shape) extending in the front-rear direction of the vehicle. When viewed from the right side of the door DR, the outer shape of the grip 21 is substantially the same as the outer shape of the housing portion 11 (outer shape of the portion excluding the front end portion of the housing portion 11). Specifically, the front end of the grip 21 has a rectangular shape, and the rear end has a semicircular shape. A bearing portion 22 (cylindrical portion) is provided in a portion slightly behind the front end of the grip 21 (refer to FIG. 4). The shaft member 13 is inserted into the bearing portion 22 and the through hole $TH_{11b}$ in a state where the bearing portion and the through hole TH b are coaxially arranged, and the grip 21 is rotatably supported around the shaft member 13. An arm 23 protruding leftward from the bearing portion 22 is provided (refer to FIGS. 2B and 4). The arm 23 protrudes to the left side of the bottom wall portion 11a through the opening $OP_{11a}$. The handle 20 is biased by a torsion spring (not illustrated) such that the rear end portion side of the grip 21 rotates from the right side of the bottom wall portion 11a toward the bottom wall portion 11a. The grip 21 comes into contact with the bottom wall portion 11a and is stopped. That is, the grip 21 is housed in the housing portion 11. A space S1 is provided between the front end of the grip 21 and the front end of the housing portion 11, and the switch device 30 to be described later is disposed in the space S1 (refer to FIGS. 2A and 3).

The switch device 30 includes a tact switch 31, the switch cover 32, and a holder 33. The tact switch 31 is fixed to a wall portion constituting the space S1 in a state in which a push button portion of the tact switch 31 is directed rightward (refer to FIG. 4). The tact switch 31 is connected to the ECU via a wire harness, a bus bar, or the like (not illustrated).

Figure 5A:
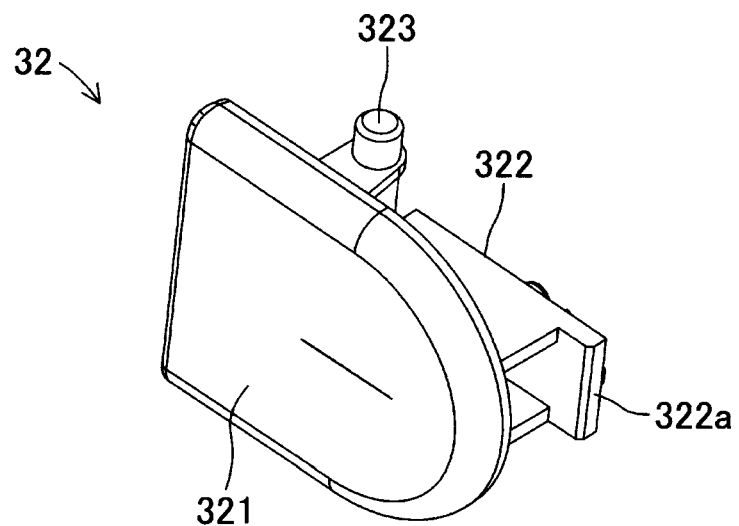
FIG. 5A is a perspective view of a switch cover when viewed from the vehicle exterior side.
Figure 5B:
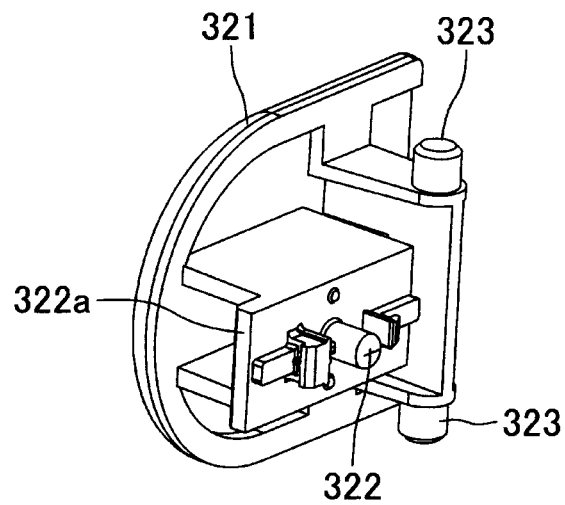
FIG. 5B is a perspective view of the switch cover when viewed from the vehicle interior side.

As illustrated in FIGS. 5A and 5B, the switch cover 32 includes a cover portion 321, a button pressing portion 322, and a pair of upper and lower shaft portions 323 and 323. The cover portion 321 has a substantially plate shape. When viewed from the right side of the vehicle, the outer shape of the cover portion 321 is substantially the same as the outer shape of the front end portion of the housing portion 11. The button pressing portion 322 is provided substantially at the central portion of the left surface of the cover portion 321. A flange portion 322a protruding forward is provided at a front end portion of the button pressing portion 322. The shaft portions 323 and 323 extend in the vehicle height direction respectively from an upper portion and a lower portion of a rear end portion of the left surface of the cover portion 321.

Figure 6A:
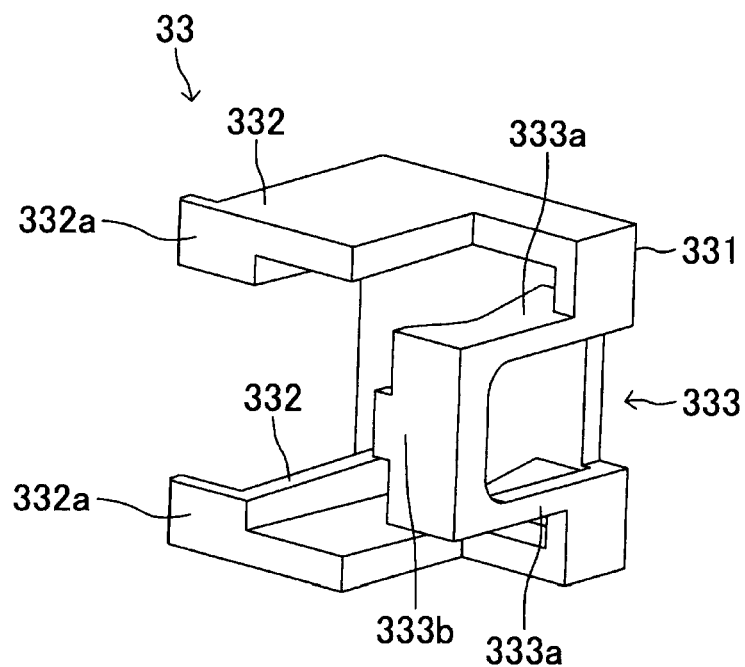
FIG. 6A is a perspective view of a holder when viewed from the vehicle exterior side.
Figure 6B:
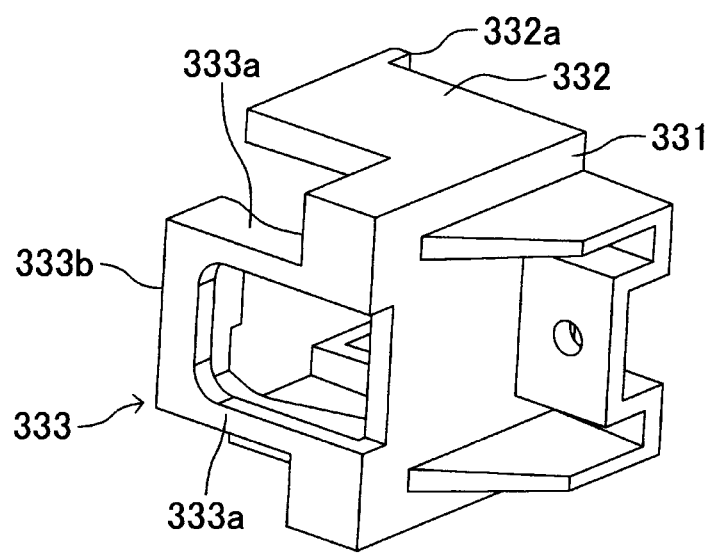
FIG. 6B is a perspective view of the holder when viewed from the vehicle interior side.

As illustrated in FIGS. 6A and 6B, the holder 33 includes a base portion 331. The base portion 331 is a plate-like portion having a substantially rectangular shape when viewed from the right side of the switch device 30. The holder 33 includes a pair of upper and lower shaft support portions 332 and 332 that support the shaft portions 323 and 323 of the switch cover 32. The shaft support portions 332 and 332 extend rightward from an upper end portion and lower end portion of a rear end portion of the right surface of the base portion 331. The flange portions 332a and 332a protruding rearward are formed at the distal end portions of the shaft support portions 332 and 332. In addition, the holder 33 includes a stopper 333 that restricts a rotation of the switch cover 32. The stopper 333 has an arch shape protruding rightward from the front end portion of the right surface of the base portion 331. That is, the stopper 333 includes a pair of upper and lower support portions 333a and 333a and a bridge portion 333b bridged between the distal ends of the lower support portions 333a and 333a.

In a state in which the tact switch 31 is fixed in the space S1, the shaft portions 323 and 323 of the switch cover 32 is inserted into the bearing portions 14 and 14 from the right side of the bearing portions 14 and 14. Next, as illustrated in FIGS. 7A and 7B, the holder 33 is moved from the front side to the rear side of the base 10, and the holder 33 is fastened to the base 10 in a state in which the flange portions 332a and 332a are put on the bearing portions 14 and 14. As a result, the shaft portions 323 and 323 can be rotated without coming off from the bearing portions 14 and 14. In this state, the button pressing portion 322 comes into contact with (faces) the surface of the push button portion of the tact switch 31, and the flange portion 322a is inserted into a space S2 surrounded by the support portions 333a and 333a and the bridge portion 333b and comes into contact with the bridge portion 333b. The tact switch 31 is connected to the ECU, and the ECU monitors an ON and OFF state of the tact switch 31. In a state in which the user does not touch the switch cover 32, the outer surface of the cover portion 321 and the outer surface of the outer panel DPb are located in the same plane. In this state, the push button portion of the tact switch 31 is not pushed. That is, the tact switch 31 is in an OFF state. When the user pushes the switch cover 32 from the vehicle exterior side, the switch cover 32 rotates to slightly enter the inside of the door panel DP, and the button pressing portion 322 presses the push button portion of the tact switch 31. As a result, the tact switch 31 is in an ON state. In a state in which the user does not touch the switch cover 32, the flange portion 322a come into contact with the bridge portion 333b, and the movement of the front end side of the switch cover 32 toward the outside of the door panel DP (rotation of the switch cover 32) is restricted. When the transition of the tact switch 31 from the OFF state to the ON state is detected in a state in which the door DR is unlocked, the ECU drives the locking mechanism KM to lock the door DR. On the other hand, when it is detected that the user performs an unlocking operation by using a portable terminal (key) (not illustrated) in a state in which the door DR is locked, the ECU drives the locking mechanism KM to unlock the door DR.

As illustrated in FIGS. 8A and 8B, the pop-up mechanism 40 includes a pop-up lever 41, an actuator lever 42, an electric actuator 43, a stopper 44, and a switch 45.

The pop-up lever 41 is a plate-like member. The pop-up lever 41 includes a base portion 411 and arms 412, 413, and 414. The base portion 411 is rotatably supported around the shaft portion 15a. The base portion 411 is biased by a torsion spring (not illustrated) so as to rotate clockwise in FIG. 8D (when viewed from the left side).

When viewed from the left side of the pop-up lever 41, the arms 412, 413, and 414 extend outward from an outer edge portion of the base portion 411 (outward in a radial direction of the shaft portion 15a). The arm 412 and the arm 413 extend in directions opposite to each other when viewed from a rotation center of the pop-up lever 41. The arm 414 extends in a direction substantially perpendicular to the extending direction of the arm 412 (414).

The actuator lever 42 is a plate-like member. The actuator lever 42 is rotatably supported around the shaft portion 15b. The actuator lever 42 has a slit-like opening $OP_{42}$ having a short arc shape extending in the rotation direction of the actuator lever 42.

The electric actuator 43 is disposed behind and below the actuator lever 42. The electric actuator 43 includes an electric motor. An output shaft of the electric motor extends forward and upward, and a worm gear is attached to a distal end portion of the output shaft. A worm wheel is attached to the actuator lever 42, and the worm wheel meshes with the worm gear of the electric motor. The electric motor of the electric actuator 43 is controlled by the ECU.

The stopper 44 is disposed adjacent to the right side of the actuator lever 42. The stopper 44 includes a guide plate 441 and a head portion 442. The guide plate 441 is a plate-like portion parallel to the actuator lever 42. The guide plate 441 is provided with a slit-like opening $OP_{441}$. The opening $OP_{441}$ is disposed on the right side of the opening $OP_{42}$, and partially communicates with the opening $OP_{42}$. The opening $OP_{441}$ linearly extends such that one end of the opening $OP_{441}$ in the extending direction is located above the other end. The slit width of the opening $OP_{441}$ is slightly smaller than the slit width of the opening $OP_{42}$.

The head portion 442 includes a base portion and a flange portion. The base portion is a rectangular plate-like portion parallel to the actuator lever 42. A cylindrical protrusion P1 protruding leftward is provided on the left surface of the base portion. The protrusion P1 is inserted into the opening $OP_{441}$ and the opening $OP_{42}$. The flange portion is a rectangular plate-like portion connected to one peripheral end surface of the base portion. The base portion and the flange portion are orthogonal to each other. That is, the head portion 442 has a T shape. The plate thickness direction of the flange portion is parallel to the extending direction of the opening $OP_{441}$.

One end of a coil spring (compression spring) (not illustrated) is supported by the base 10, and the other end of the coil spring is connected to the head portion 442. The coil spring presses the head portion 442 to bias the head portion 442 rearward and upward (in a direction parallel to the opening $OP_{441}$).

The switch 45 is disposed below and behind the pop-up lever 41, when viewed from the rotation center of the pop-up lever 41. The switch 45 is a tact switch, and the push button portion of the switch 45 is directed to the rotation center side of the pop-up lever 41. The switch 45 is connected to the ECU, and the ECU monitors an ON and OFF state of the switch 45.

The bell crank 50 is a plate-like member. The bell crank 50 includes a base portion 511 and arms 512, 513, and 514. The base portion 511 is rotatably supported around the shaft portion 15c. The base portion 511 is biased by a torsion spring (not illustrated) so as to rotate counterclockwise in FIG. 8D (when viewed from the left side).

When viewed from the left side of the bell crank 50, the arms 512, 513, and 514 extend outward from an outer edge portion of the base portion 511 (outward in a radial direction of the shaft portion 15c). The arm 512 and the arm 513 extend in directions substantially orthogonal to each other. The arm 514 is disposed between the arm 512 and the arm 513. That is, an angle between the arm 512 (513) and the arm 514 is approximately 45°.

(Operation)

When the user opens the door DR from the vehicle exterior side, the door handle apparatus 1 operates as follows.

<Initial State>

Before the user starts the operation of opening the door DR (in the initial state), the handle 20 is biased by a torsion spring, and the grip 21 is housed in the housing portion 11 and is stopped (refer to FIG. 8A). The arm 23 is located on the front end portion of the opening $OP_{11a}$. As described above, the bell crank 50 is biased counterclockwise by the torsion spring in FIG. 8D, but the distal end portion of the arm 514 comes into contact with a stopper STP provided in the base 10, and the bell crank 50 is stopped. The arm 23 is separated from the distal end portion of the arm 512.

Here, as described above, the pop-up lever 41 is biased clockwise by the torsion spring in FIG. 8D, but a biasing force of the torsion spring is smaller than the biasing force of the torsion spring of the handle 20. Accordingly, the distal end portion of the arm 412 of the pop-up lever 41 comes into contact with the front surface of the arm 23 of the handle 20, and the movement of the pop-up lever 41 (clockwise rotation of the pop-up lever 41) is restricted. That is, the pop-up lever 41 is stopped at the initial position illustrated in FIGS. 8A and 8B.

In this state, the arm 414 of the pop-up lever 41 extends forward and downward (lower left side in FIG. 8D) when viewed from the rotation center of the pop-up lever 41. The head portion 442 of the stopper 44 faces the distal end surface of the arm 414. The electric actuator 43 is not operated. That is, power is not supplied to the electric motor, and the output shaft of the electric motor is stopped. Therefore, the actuator lever 42 is stopped at a predetermined initial position illustrated in FIG. 8D. That is, the opening $OP_{42}$ is located forward and upward (upper left side in FIG. 8D) when viewed from the rotation center of the actuator lever 42.

The protrusion P1 of the stopper 44 is moved to the other end portion (lower left side in FIG. 8D) of the opening $OP_{441}$ by the actuator lever 42, and is stopped. The head portion 442 is separated from the distal end portion of the arm 414. The coil spring of the stopper 44 is pressed to some extent. That is, although the head portion 442 is pressed toward the upper right side by the coil spring in FIG. 8D, the movement of the protrusion P1 inserted into the opening $OP_{42}$ of the actuator lever 42 is restricted (locked to the end portion of the opening $OP_{42}$), and thus the head portion 442 is stopped in a state of being separated from the distal end surface of the arm 414.

The arm 413 extends rearward and downward (lower right side in FIG. 8D) when viewed from the rotation center of the pop-up lever 41. The distal end portion of the arm 413 is separated from the switch 45 in the counterclockwise direction in FIG. 8D.

In the initial state, the locking mechanism KM is in a locked state. That is, the door DR is locked.

<Transition to Standby State>

Figure 9A:
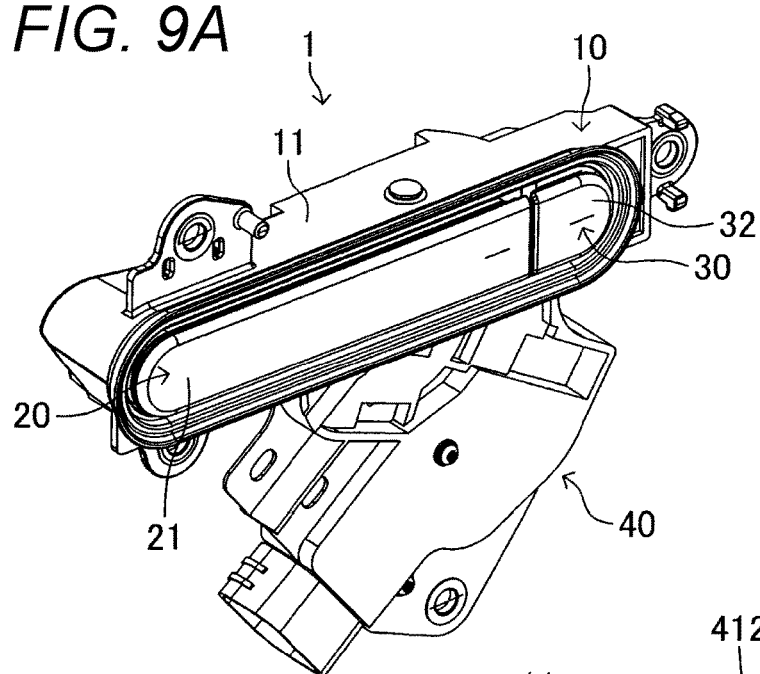
FIG. 9A is a perspective view of the door handle apparatus for a vehicle in a standby state, when viewed from the vehicle exterior side.
Figure 9B:
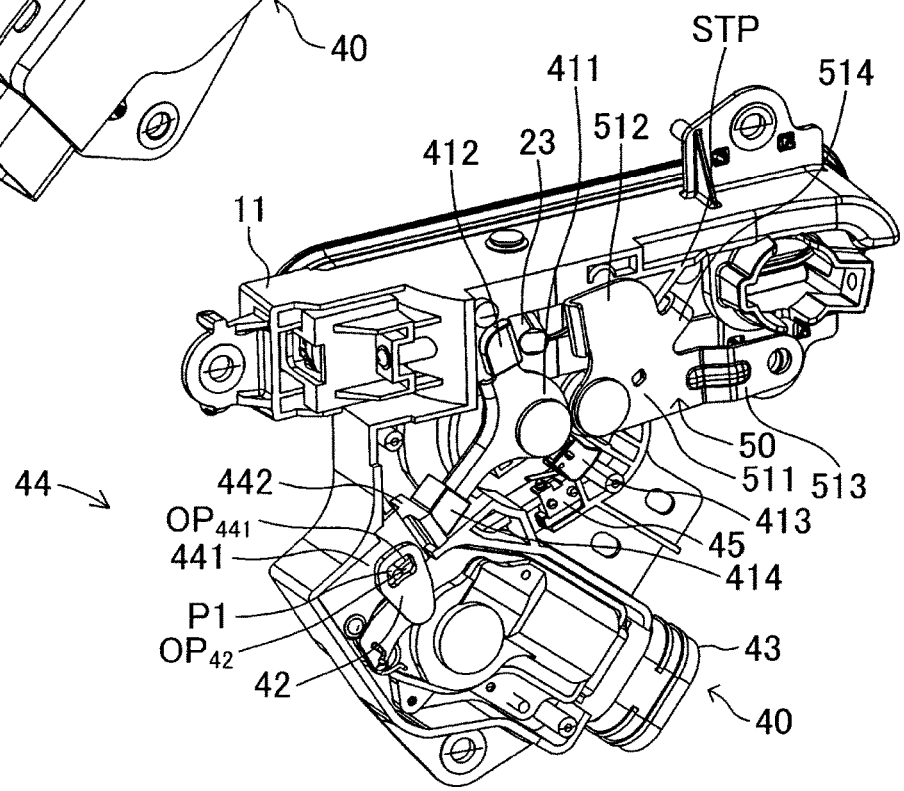
FIG. 9B is a perspective view of the door handle apparatus for a vehicle in the standby state, when viewed from the vehicle interior side.

In the initial state, when the user performs an unlocking operation by using a portable terminal (key) (not illustrated), the door handle apparatus 1 transitions to the standby state illustrated in FIGS. 9A and 9B. Specifically, first, the ECU drives the electric actuator of the locking mechanism KM to transit the locked state of the locking mechanism KM to the unlocked state. The ECU drives the electric actuator 43 to rotate the actuator lever 42 from the initial position illustrated in FIG. 8D in the clockwise direction in FIG. 8D, moves the actuator lever 42 to a predetermined pop-up position illustrated in FIG. 9D, and stops driving the electric actuator 43. This releases the restriction on the movement of the head portion 442 (protrusion P1).

Figure 9C:
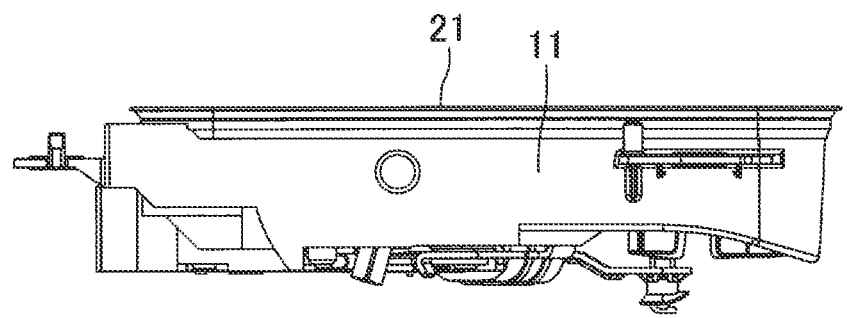
FIG. 9C is a plan view of the door handle apparatus for a vehicle in the standby state, when viewed from above.
Figure 9D:
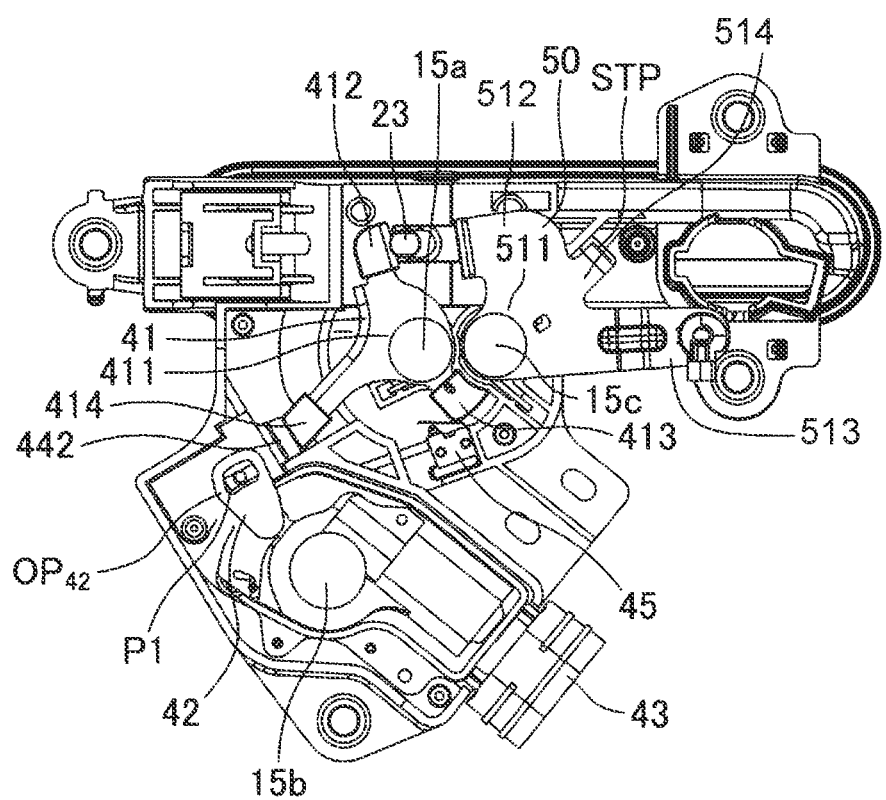
FIG. 9D is a side view of the door handle apparatus for a vehicle in the standby state, when viewed from the vehicle interior side.

The head portion 442 is biased by the coil spring, moves in the upper right direction in FIG. 8D, and comes into contact with the distal end surface of the arm 414 to be stopped as illustrated in FIG. 9D. In this state, the coil spring of the stopper 44 is slightly extended as compared with the initial state, but is still in a pressed state.

As illustrated in FIGS. 9A and 9B, in this standby state, the grip 21 is housed in the housing portion 11 as in the initial state.

<Transition to Pop-Up State>

Figure 10A:
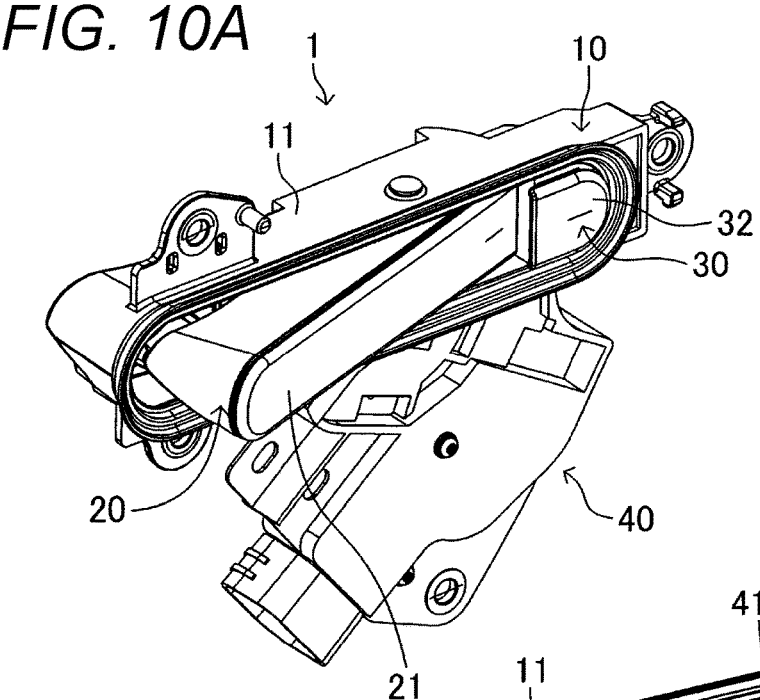
FIG. 10A is a perspective view of the door handle apparatus for a vehicle in a pop-up state, when viewed from the vehicle exterior side.
Figure 10B:
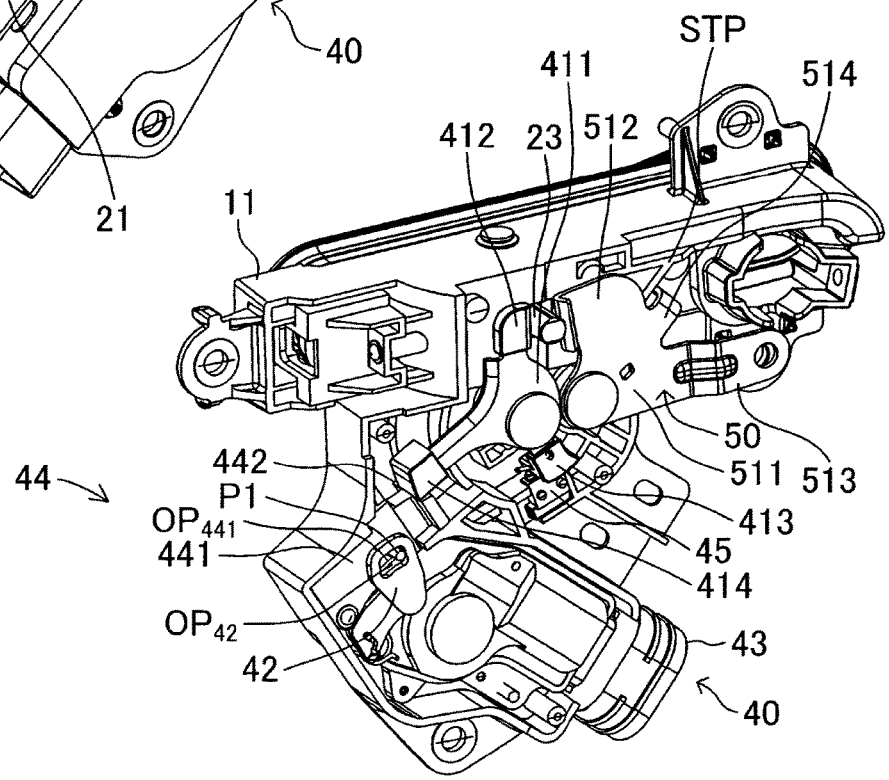
FIG. 10B is a perspective view of the door handle apparatus for a vehicle in the pop-up state, when viewed from the vehicle interior side.
Figure 10C:
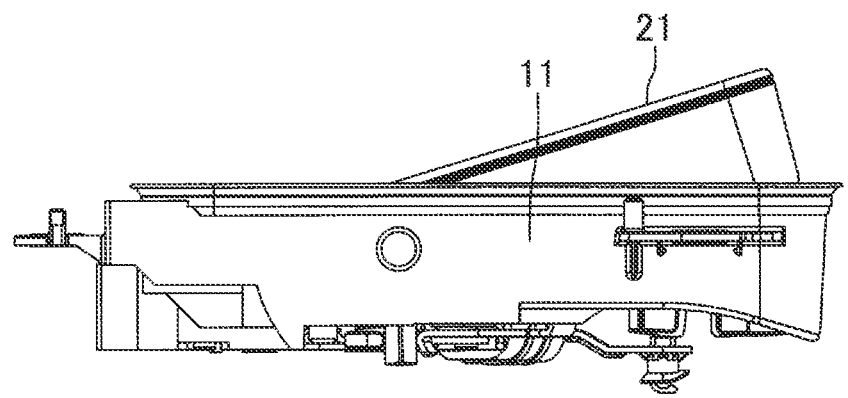
FIG. 10C is a plan view of the door handle apparatus for a vehicle in the pop-up state, when viewed from above.
Figure 10D:
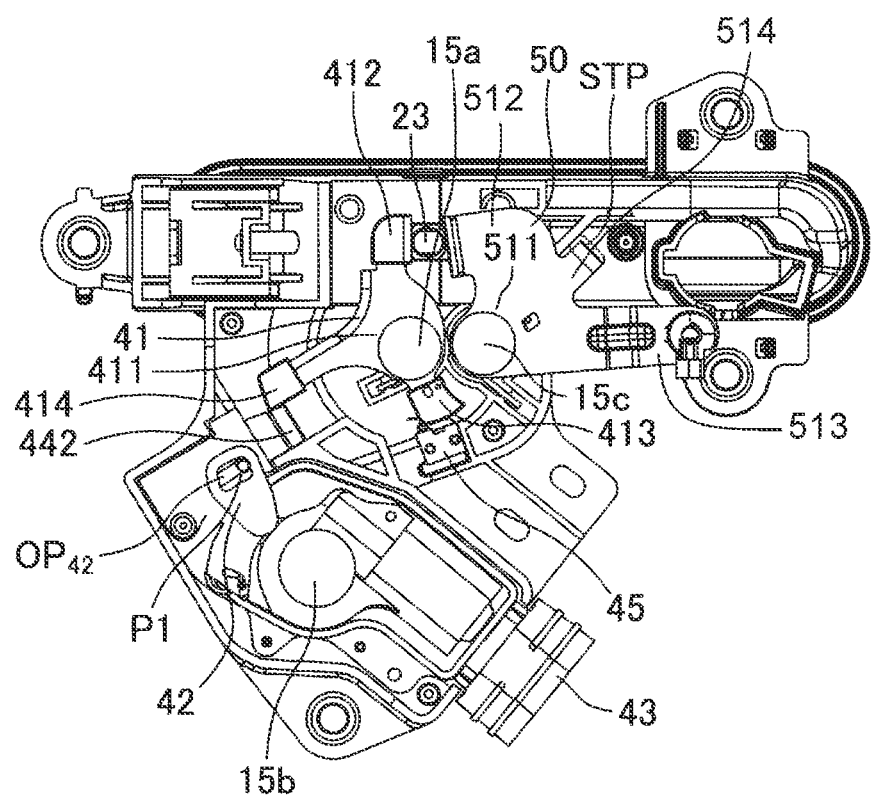
FIG. 10D is a side view of the door handle apparatus for a vehicle in the pop-up state, when viewed from the vehicle interior side.

When the user pushes the front end portion of the grip 21 of the handle 20 (a portion in front of the shaft member 13) in the standby state, the door handle apparatus 1 transitions to the pop-up state illustrated in FIGS. 10A and 10B. Specifically, the grip 21 rotates counterclockwise in FIG. 9C to reach a pop-up position illustrated in FIGS. 10A and 10C (a state in which the user can grip the grip 21). As illustrated in FIG. 10D, the distal end of the arm 23 moves rearward from the initial state and comes into contact with the distal end portion of the arm 512 of the bell crank 50. This makes it difficult for the grip 21 to rotate. Accordingly, the user can recognize that the door handle apparatus 1 reaches the pop-up state. As described above, the movement restriction of the distal end portion of the arm 414 is released when the arm 23 retreats. That is, the pop-up lever 41 is biased by the torsion spring to rotate clockwise in FIG. 9D, and reaches the pop-up position illustrated in FIG. 10D.

When the pop-up lever 41 rotates and the distal end portion of the arm 414 is separated from the head portion 442, the head portion 442 protrudes in the upper right direction by the biasing force of the coil spring in FIG. 9D. Accordingly, the counterclockwise rotation of the pop-up lever 41 is restricted, and the forward movement of the arm 23 is restricted. Therefore, even when the user releases the hand from the grip 21 of the handle 20, the grip 21 remains stopped at the pop-up position.

The arm 413 presses the push button portion of the switch 45, and the switch 45 transitions from the OFF state to the ON state. Accordingly, the ECU can recognize that the door handle apparatus 1 is in the pop-up state.

<Transition to Door-Open State>

Figure 11A:
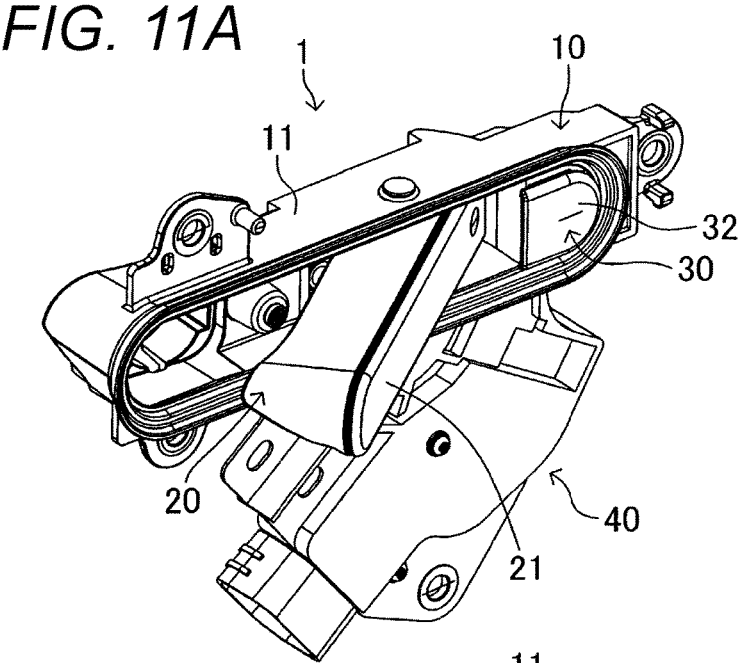
FIG. 11A is a perspective view of the door handle apparatus for a vehicle in a door-open state, when viewed from the vehicle exterior side.
Figure 11B:
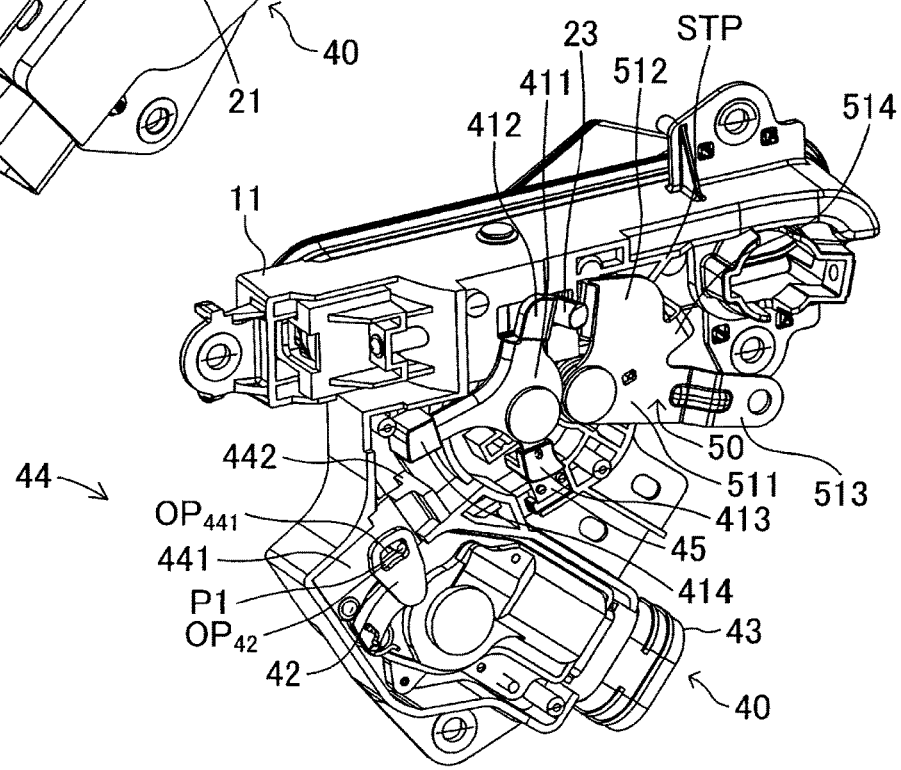
FIG. 11B is a perspective view of the door handle apparatus for a vehicle in the door-open state, when viewed from the vehicle interior side.
Figure 11C:
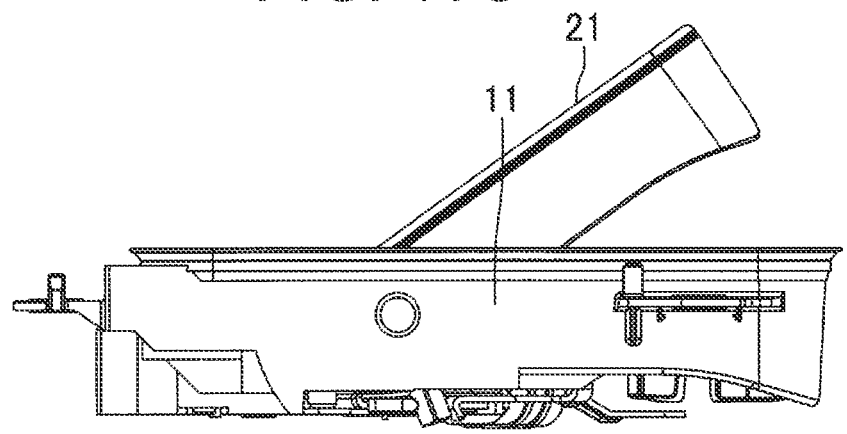
FIG. 11C is a plan view of the door handle apparatus for a vehicle in the door-open state, when viewed from above.
Figure 11D:
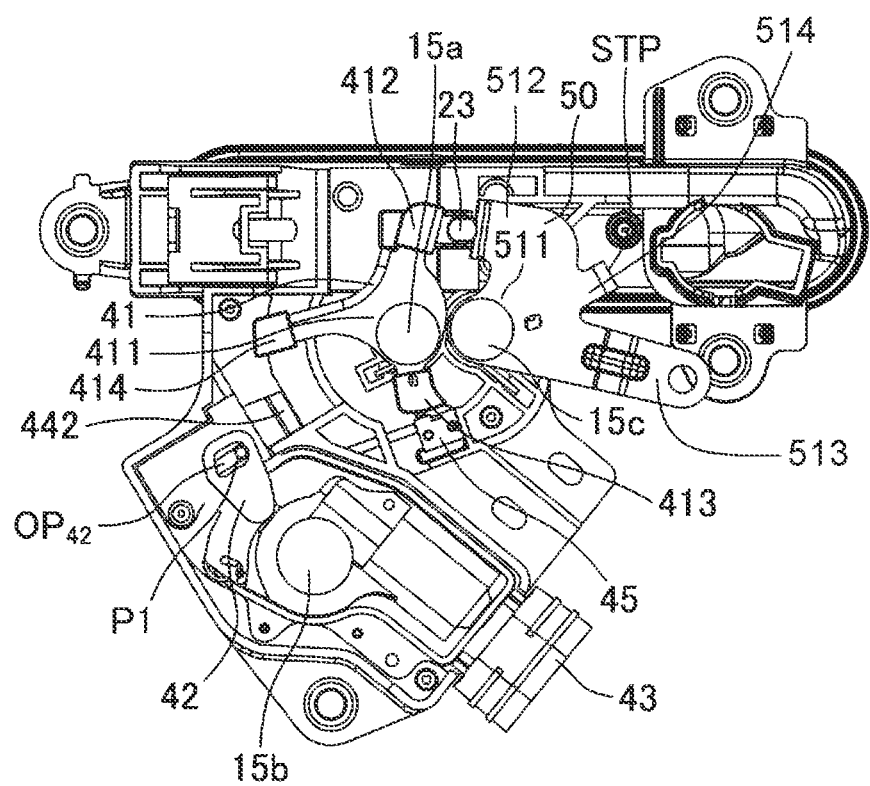
FIG. 11D is a side view of the door handle apparatus for a vehicle in the door-open state, when viewed from the vehicle interior side.

When the user grips the grip 21 of the handle 20 in the pop-up state, and pulls the grip 21 toward the user, the door handle apparatus 1 transitions to the door-open state illustrated in FIGS. 11A and 11B. Specifically, the grip 21 rotates counterclockwise in FIG. 10C. Accordingly, the distal end of the arm 23 moves rearward. The distal end portion of the arm 512 of the bell crank 50 is pressed rearward by the arm 23, and the bell crank 50 rotates clockwise in FIG. 10D to reach a door-open position illustrated in FIG. 11D. At this time, the rod RD connected to the distal end portion of the arm 513 moves downward. As a result, the release mechanism RM is driven to release the engagement between the latch mechanism LM and the striker ST, and the door DR is opened (openable). When the user releases the hand from the grip 21, the grip 21 and the bell crank 50 are biased by the torsion spring to return to the pop-up position. As described above, the forward movement of the arm 23 is restricted by the arm 412, the grip 21 is stopped at the pop-up position.

<Transition to Initial State (Regression)>

When it is detected that the switch 45 transitions from the OFF state to the ON state, the ECU starts measuring an elapsed time. When the elapsed time (measurement result) exceeds a predetermined threshold value, the ECU drives the electric actuator 43 to return the actuator lever 42 to the initial position. Accordingly, the head portion 442 of the stopper 44 moves to the lower left side (initial position side) in FIG. 10D and is separated from the arm 414 of the pop-up lever 41. That is, the restriction on the counterclockwise rotation of the pop-up lever 41 is released. According to this, the grip 21 is biased by the torsion spring and rotates clockwise in FIG. 10C, and the arm 23 moves forward in FIG. 10D. The distal end portion of the arm 412 is pressed forward by the arm 23. As a result, the pop-up lever 41 rotates counterclockwise in FIG. 10D and returns to the initial position.

(Effects)

In a case where the switch cover 32 is supported by a body portion of the tact switch 31, in order to position the surface of the switch cover 32 and the surface of the outer panel DPb in the same plane, it is necessary to keep attachment position accuracy of the tact switch 31 with respect to the base 10 and attachment position accuracy of the switch cover 32 with respect to the tact switch 31 high. On the other hand, as described above, in the present embodiment, the switch cover 32 is directly supported by the base 10. Therefore, according to the present embodiment, the attachment position of the switch cover 32 is hardly affected by the attachment position accuracy of the tact switch 31. That is, according to the present embodiment, the surface of the switch cover 32 is easily positioned in the same plane as the surface of the outer panel DPb.

The switch cover 32 is disposed adjacent to the front side of the grip 21. The extending direction of the rotation shaft of the switch cover 32 and the extending direction of the rotation shaft of the grip 21 are parallel to each other. In a case where each of the shaft portions 323 of the switch cover 32 is disposed on the front end side of the switch cover 32, when the user pushes the front end portion of the grip 21 to pop up the grip 21, the user may erroneously push the rear end portion of the switch cover 32. In this case, there is a case where the switch cover 32 rotates, the tact switch 31 transitions from the OFF state to the ON state, and thus the door DR is locked. On the other hand, in the present embodiment, the shaft portion 323 of the switch cover 32 is disposed at the rear end portion of the switch cover 32 (near a boundary between the grip 21 and the cover portion 321). Accordingly, in a case where the user pushes the front end portion of the grip 21 to pop up the grip 21, even when the user erroneously pushes the rear end portion of the switch cover 32, the pushed portion is near the shaft portion 323, and thus it is difficult for the switch cover 32 to rotate. Therefore, when the grip 21 is popped up, a situation hardly occurs in which the door DR is erroneously locked.

In the door handle apparatus 1, when the grip 21 is popped up, the pop-up lever 41 is locked to the stopper 44, and the pop-up state is temporarily held. That is, even when the user releases the hand from the grip 21, the grip 21 is in the pop-up state, and the user can grip the grip 21 again. For example, the user can grip the grip 21 and open the door DR again in the middle of closing the door DR.

The electric actuator 43 is a device for driving the stopper 44, and does not drive the grip 21 on which a relatively large force (biasing force of the torsion spring) acts. Therefore, a relatively small (low output (low torque)) electric motor can be adopted. Accordingly, the door handle apparatus 1 can be downsized.

As described above, the door handle apparatus 1 has high assemblability and practicality (operability).

Second Embodiment (Configuration)

A door handle apparatus 2 according to the second embodiment of the present disclosure will be described. In the door handle apparatus 1 according to the first embodiment is configured such that the user pushes the switch cover 32 to unlock the door handle apparatus 1, and then pushes the front end portion of the grip 21 of the handle 20 to cause the door handle apparatus 1 to transition from the initial state to the pop-up state. On the other hand, the door handle apparatus 2 is configured such that when the user pushes the switch cover 32 to unlock the door handle apparatus 2, the door handle apparatus 2 automatically transitions from the initial state to the pop-up state.

In the door handle apparatus 2, a pop-up lever 61 and an actuator lever 62, which are illustrated in FIGS. 12 to 20, are used instead of the pop-up lever 41 and actuator lever 42 of the door handle apparatus 1. Since the other components are the same as the components of the door handle apparatus 1, the description thereof will be omitted.

The pop-up lever 61 is a plate-like member. Like the pop-up lever 41, the pop-up lever 61 includes a base portion 611, an arm 612, an arm 613, and an arm 614.

The base portion 611 is rotatably supported around the shaft portion 15a. When viewed from the left side of the pop-up lever 61, the arms 612, 613, and 614 extend outward from an outer edge portion of the base portion 611 (outward in a radial direction of the shaft portion 15a). The arm 612 and the arm 613 extend in directions opposite to each other. The arm 614 extends in a direction substantially orthogonal to the arm 612 (613). A cylindrical protrusion P2 extending rightward is provided on the right surface of the distal end portion of the arm 614. A protrusion P3 protruding rightward is provided in an intermediate portion of the arm 614. When viewed from the left side of the pop-up lever 61, the protrusion P3 has a substantially triangular shape. The protrusion P3 is disposed at an edge portion of the arm 614 on a side opposite to the arm 612.

The actuator lever 62 is a plate-like member. A base portion 621 and an arm 622 are provided. The base portion 621 extends in a predetermined direction. One end portion of the base portion 621 is rotatably supported around the shaft portion 15c. A slit-like opening $OP_{62}$ extending in a rotation direction of the base portion 621 is provided in an intermediate portion of the base portion 621 in the longitudinal direction. The arm 622 is provided at the other end (distal end portion) of the base portion 621.

The arm 622 is wider than the base portion 621. An opening $OP_{622}$ is provided in a central portion of the arm 622. That is, a portion excluding the outer edge portion of the arm 622 is opened. In other words, the arm 622 has an annular shape. The opening $OP_{622}$ has a substantially trapezoidal shape. That is, the opening $OP_{622}$ has four sides (E1 to E4).

The actuator lever 62 is disposed adjacent to the right side of the pop-up lever 61, and the protrusion P1 and the protrusion P2 are inserted into the opening $OP_{621}$ and the opening $OP_{622}$, respectively.

In the second embodiment, an electric motor having an output torque greater than that of the first embodiment is adopted in the electric actuator 43.

(Operation)

<Initial State>

Before the user starts the operation of opening the door DR (in the initial state), the grip 21 is housed in the housing portion 11 and is stopped similarly to the first embodiment. The arm 23 is located on the front end portion of the opening $OP_{11a}$. The bell crank 50 is also stopped similarly to the first embodiment.

The distal end portion of the arm 612 comes into contact with the front surface of the arm 23.

The arm 614 extends forward and downward (lower left side in FIG. 12) when viewed from the rotation center of the pop-up lever 61. The electric actuator 43 is not operated. That is, power is not supplied to the electric motor, and the output shaft of the electric motor is stopped. Therefore, the actuator lever 62 is stopped at a predetermined initial position illustrated in FIG. 12. The protrusion P2 comes into contact with a side E1 located at the lowermost position and extending in a substantially horizontal direction (front-rear direction of the vehicle) among the sides constituting the inner peripheral edge of the opening $OP_{622}$.

The protrusion P1 of the stopper 44 is stopped at the other end portion (lower left side in FIG. 12) in the movable range of the protrusion P1 by the actuator lever 62. The head portion 442 faces (separates from) a side surface portion P3a of the protrusion P3. The coil spring of the stopper 44 is pressed to some extent. That is, although the head portion 442 is pressed toward the upper right side by the coil spring in FIG. 12, the movement of the protrusion P1 inserted into the opening $OP_{621}$ of the actuator lever 62 is restricted (locked to the end portion of the opening $OP_{621}$), and thus the head portion 442 is stopped in a state of being separated from the protrusion P3.

<Transition to Pop-Up State>

In the initial state, when the user performs an unlocking operation by using a portable terminal (key) (not illustrated), the ECU drives the electric actuator of the locking mechanism KM, and causes the locking mechanism KM to transition from the locked state to the unlocked state. The ECU drives the electric actuator 43 to rotate the actuator lever 62 from the state illustrated in FIG. 12 in the clockwise direction in FIG. 12, moves the actuator lever 62 to a predetermined pop-up position illustrated in FIG. 16 through the states illustrated in FIGS. 13 to 15, and stops driving the electric actuator 43. In the process, the protrusion P2 of the pop-up lever 61 is pushed up by the actuator lever 62, and the pop-up lever 61 rotates clockwise in FIG. 12. Accordingly, the distal end of the arm 23 is pressed by the arm 612 and moves backward. That is, the grip 21 rotates to reach the pop-up position (state in which the user can grip the grip 21). In the pop-up state illustrated in FIG. 16, the distal end of the arm 23 comes into contact with the distal end portion of the arm 512 of the bell crank 50.

Figure 12:
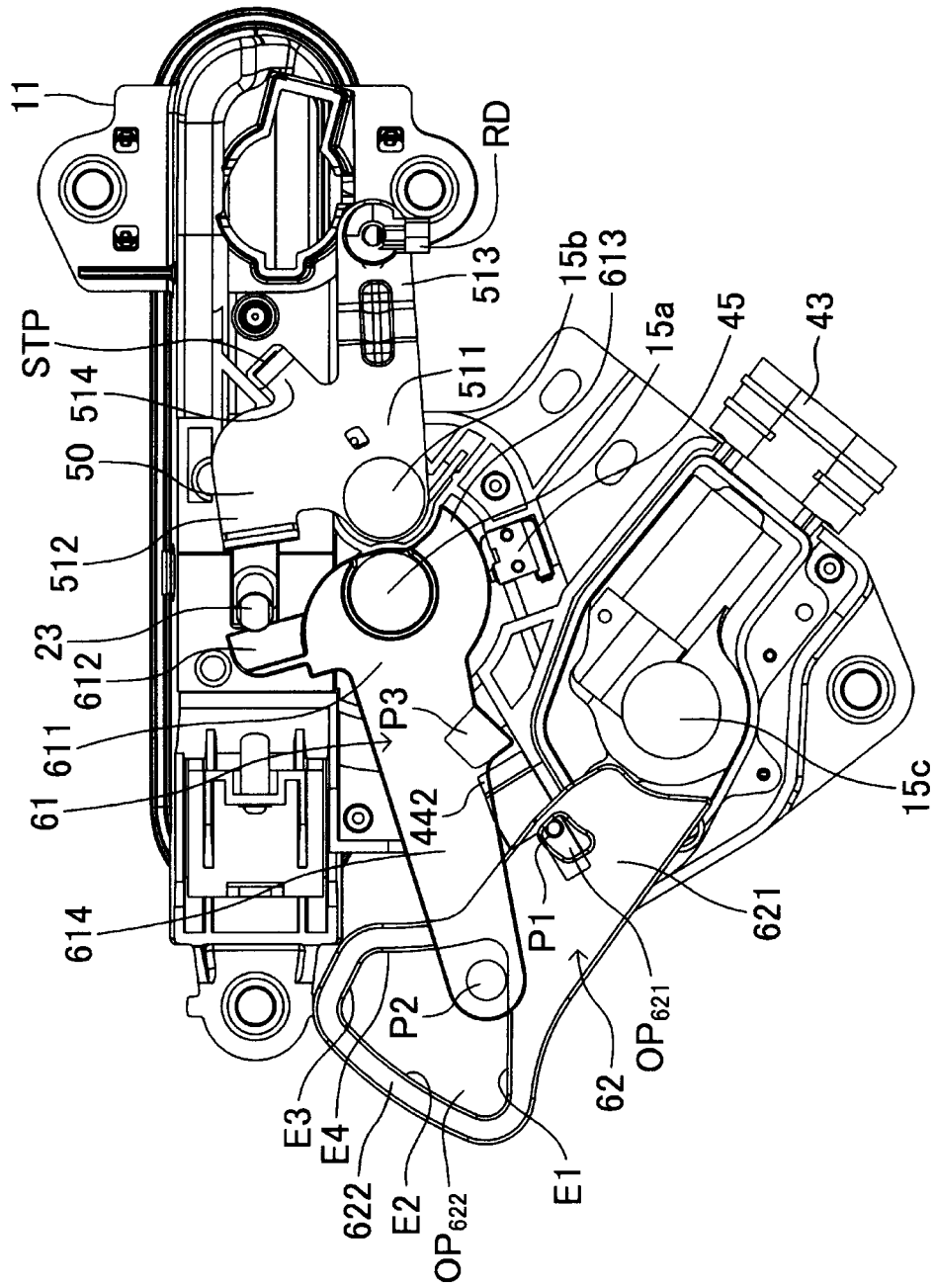
FIG. 12 is a side view of a door handle apparatus for a vehicle according to a second embodiment disclosed here, and is the side view of the door handle apparatus for a vehicle in an initial state, when viewed from the vehicle interior side.
Figure 13:
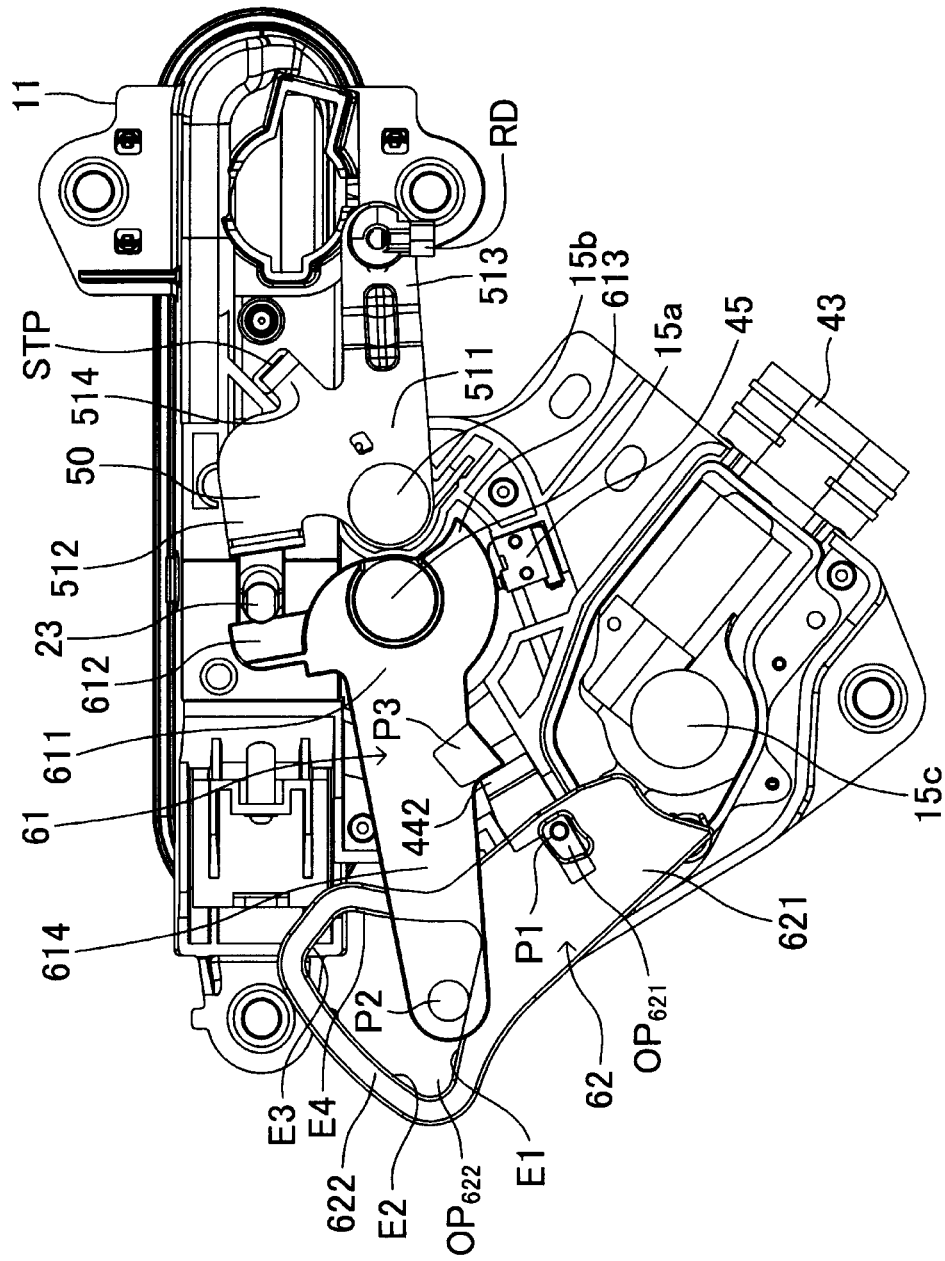
FIG. 13 is a side view of the door handle apparatus for a vehicle in a first stage in the middle of reaching the pop-up state from the initial state, when viewed from the vehicle interior side.

When the opening $OP_{621}$ of the actuator lever 62 rotates clockwise in FIG. 12, the movement restriction of the head portion 442 (protrusion P1) is released. The head portion 442 is biased by the coil spring, moves in the upper right direction in FIG. 12, and comes into contact with the side surface portion P3a of the protrusion P3 as illustrated in FIG. 13. In this state, the coil spring is slightly extended as compared with the initial state, but is still in a pressed state.

Figure 14:
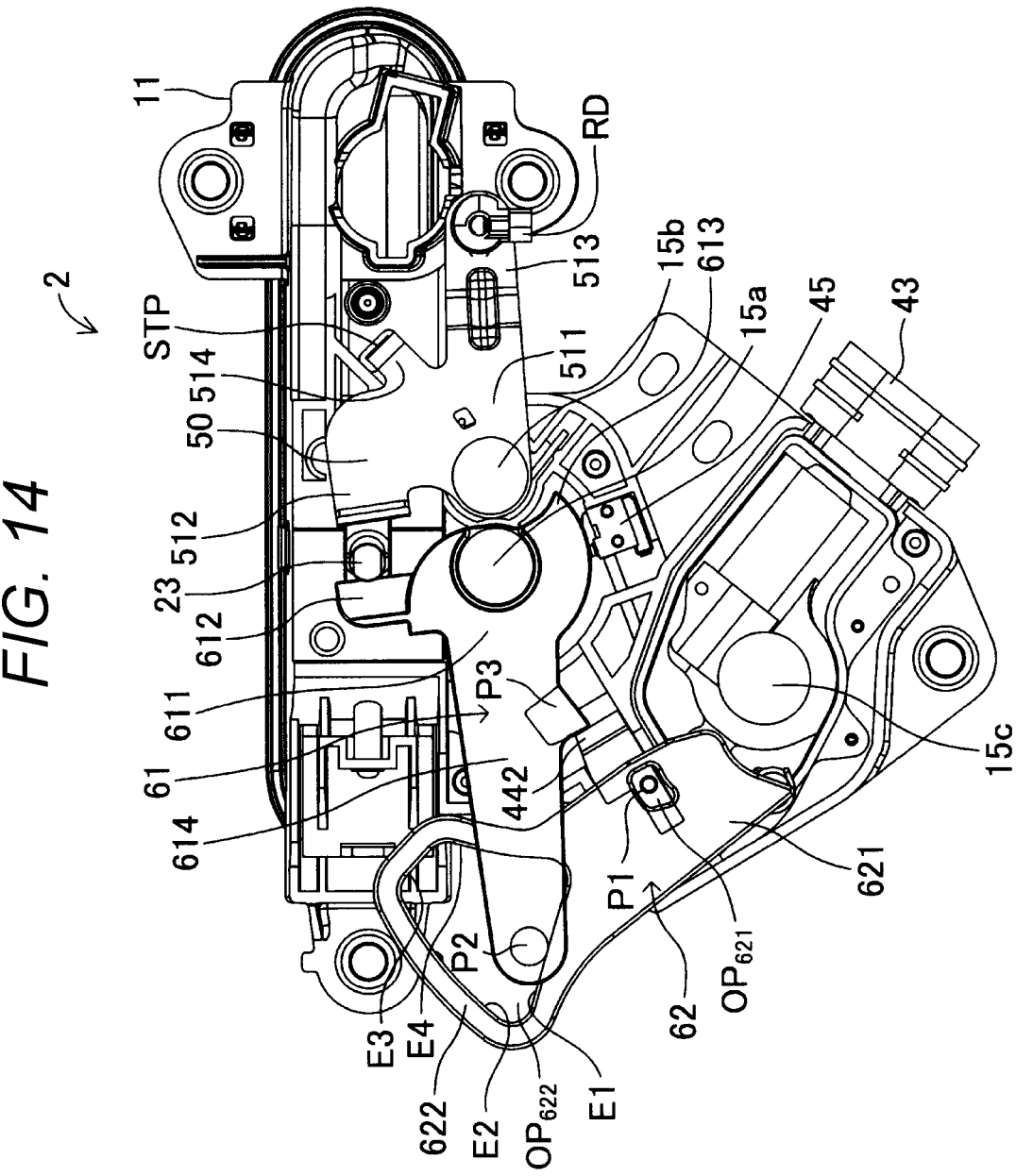
FIG. 14 is a side view of the door handle apparatus for a vehicle in a second stage in the middle of reaching the pop-up state from the initial state, when viewed from the vehicle interior side.
Figure 15:
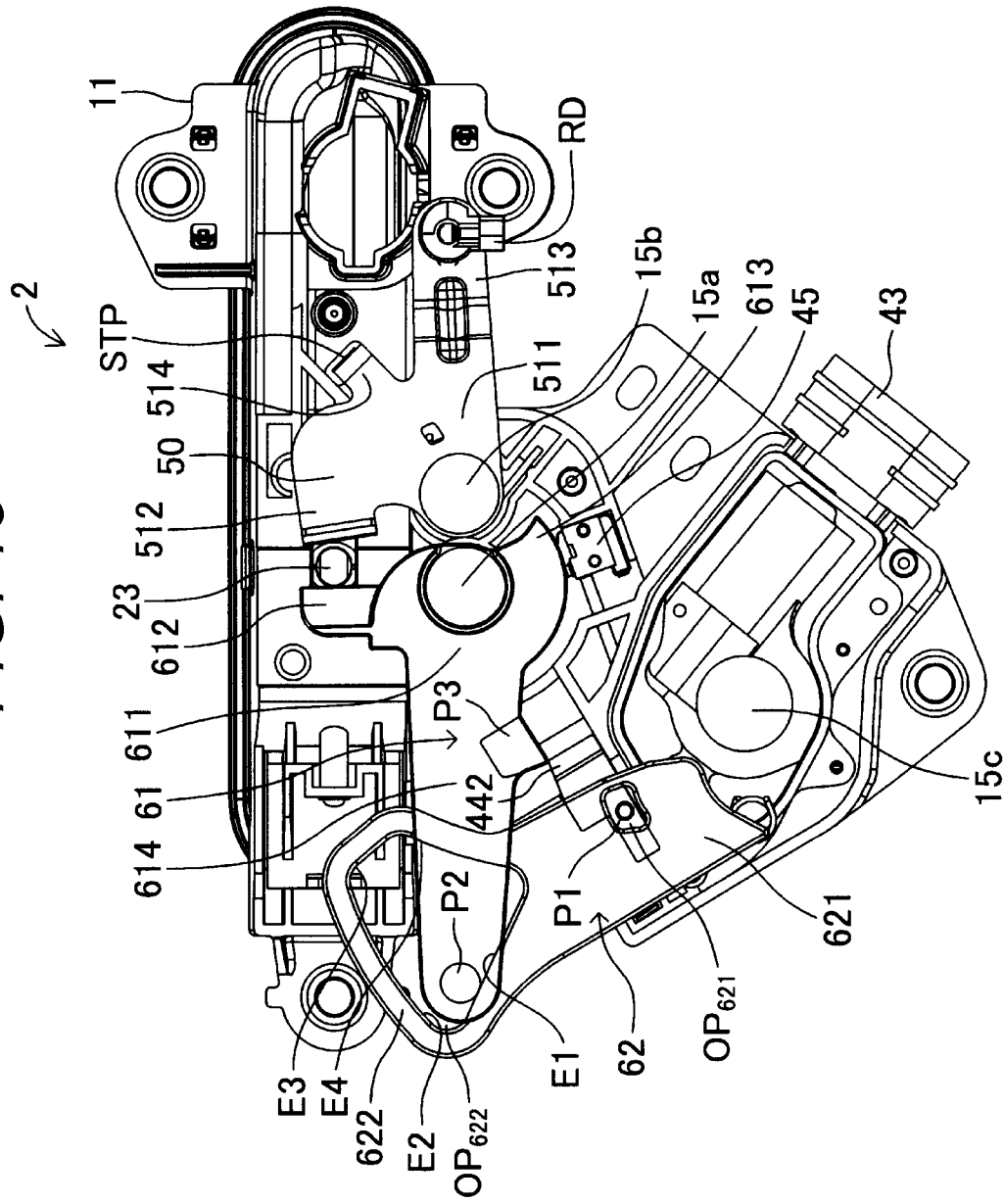
FIG. 15 is a side view of the door handle apparatus for a vehicle in a third stage in the middle of reaching the pop-up state from the initial state, when viewed from the vehicle interior side.
Figure 16:
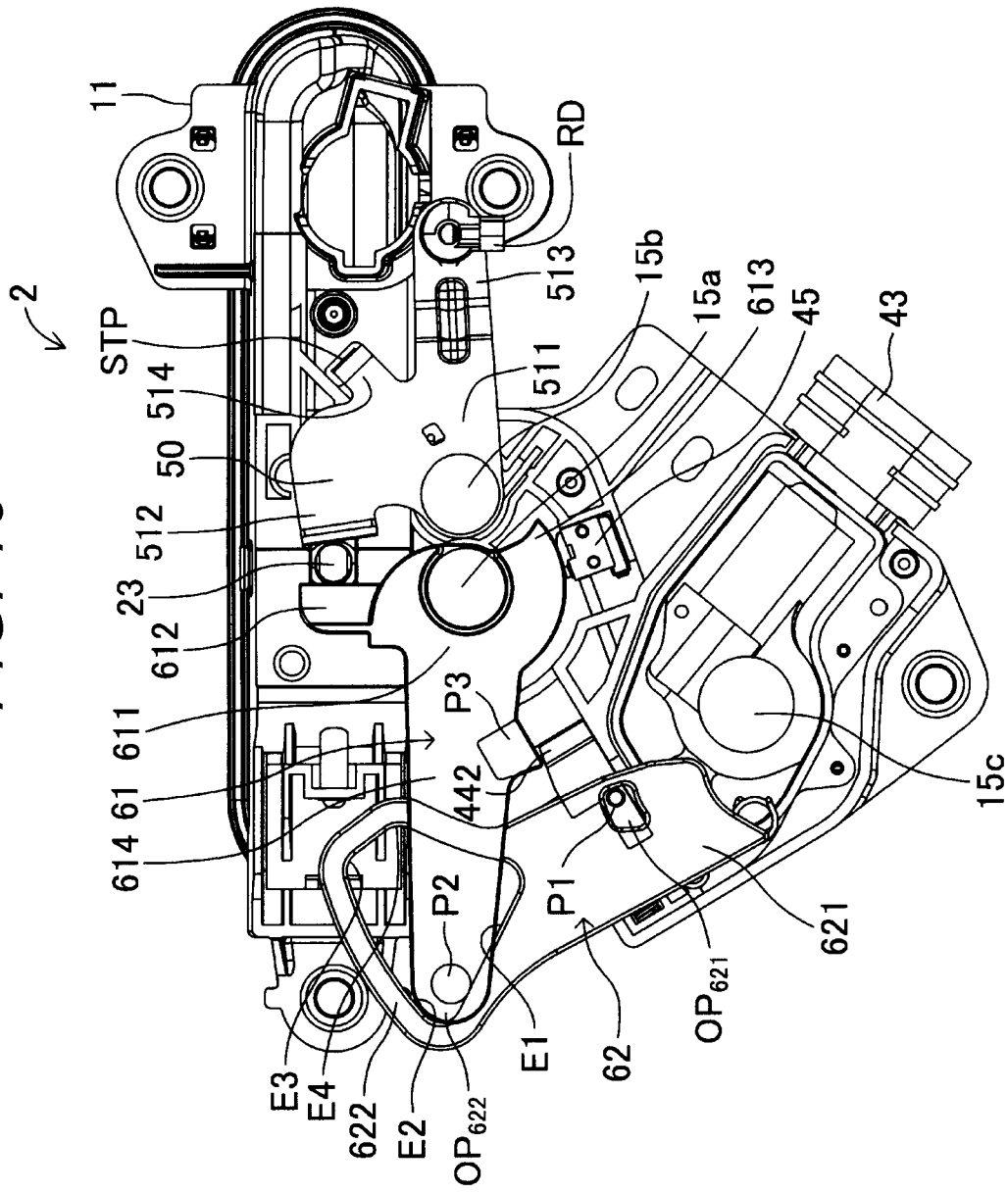
FIG. 16 is a side view of the door handle apparatus for a vehicle in the pop-up state, when viewed from the vehicle interior side.

The pop-up lever 61 rotates from the state of FIG. 13, and through the state illustrated in FIG. 14, as illustrated in FIG. 15, a vertex of the protrusion P3 (intersection portion (ridgeline) of the side surface portion P3a and a side surface portion P3b) is separated from the head portion 442. At this time, the head portion 442 protrudes in the upper right direction by the biasing force of the coil spring as illustrated in FIG. 16. The head portion 442 comes into contact with the side surface portion P3b of the protrusion P3. Accordingly, the counterclockwise rotation of the pop-up lever 61 is restricted. That is, the forward movement of the arm 23 is restricted by the arm 612. Therefore, even in a state in which power is not supplied to the electric actuator 43, the grip 21 remains stopped at the pop-up position.

The arm 613 presses the push button portion of the switch 45, and the switch 45 transitions from an OFF state to an ON state. Accordingly, the ECU can recognize that the door handle apparatus 1 is in the pop-up state.

<Transition to Door-Open State>

In the pop-up state illustrated in FIG. 16, when the user pulls the grip 21 toward the user, the state transitions from the pop-up state to the door-open state as in the first embodiment.

<Transition to Initial State (Regression)>

Figure 17:
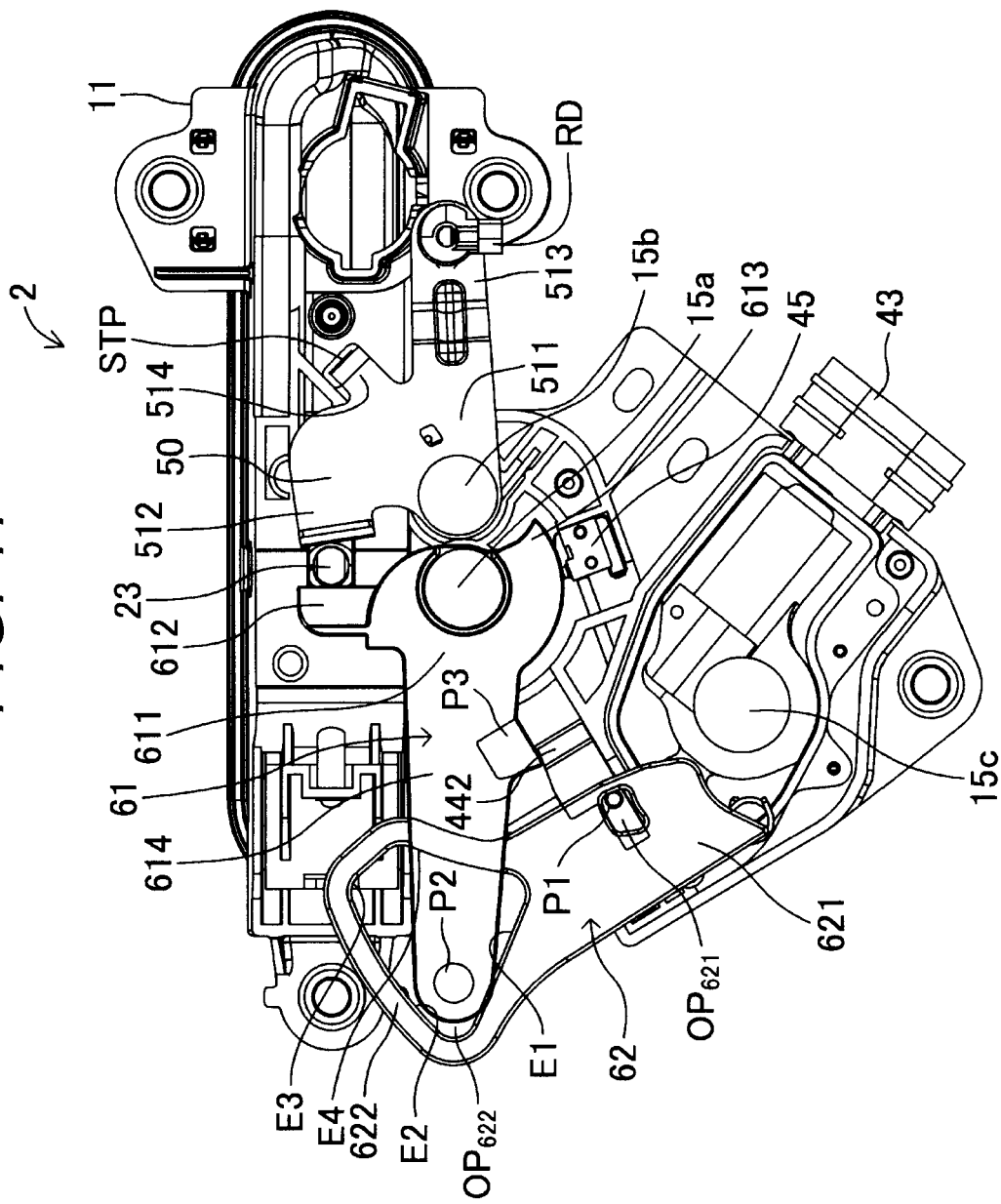
FIG. 17 is a side view of the door handle apparatus for a vehicle in a first stage in the middle of reaching the initial state from the pop-up state, when viewed from the vehicle interior side.
Figure 18:
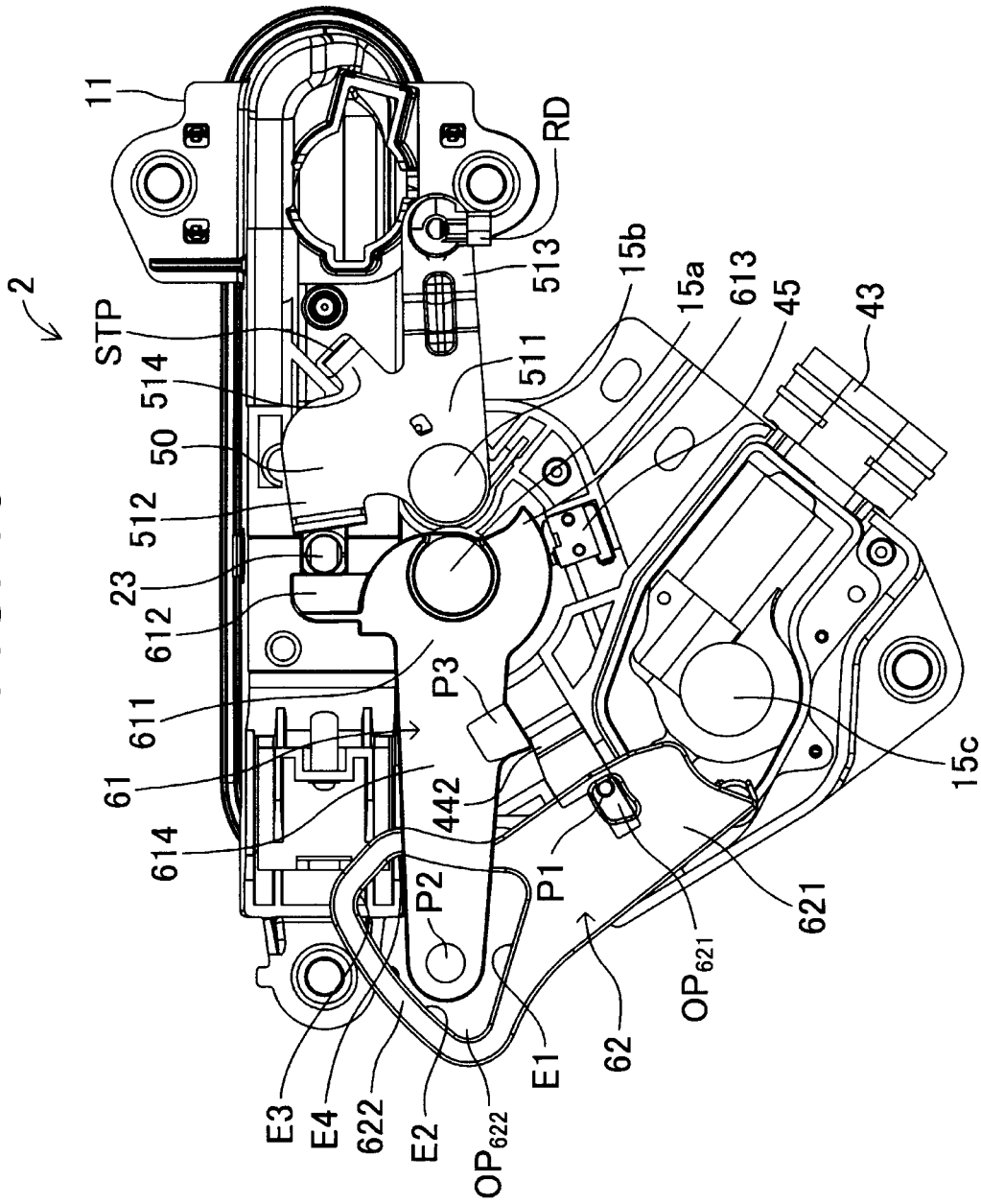
FIG. 18 is a side view of the door handle apparatus for a vehicle in a second stage in the middle of reaching the initial state from the pop-up state, when viewed from the vehicle interior side.
Figure 19:
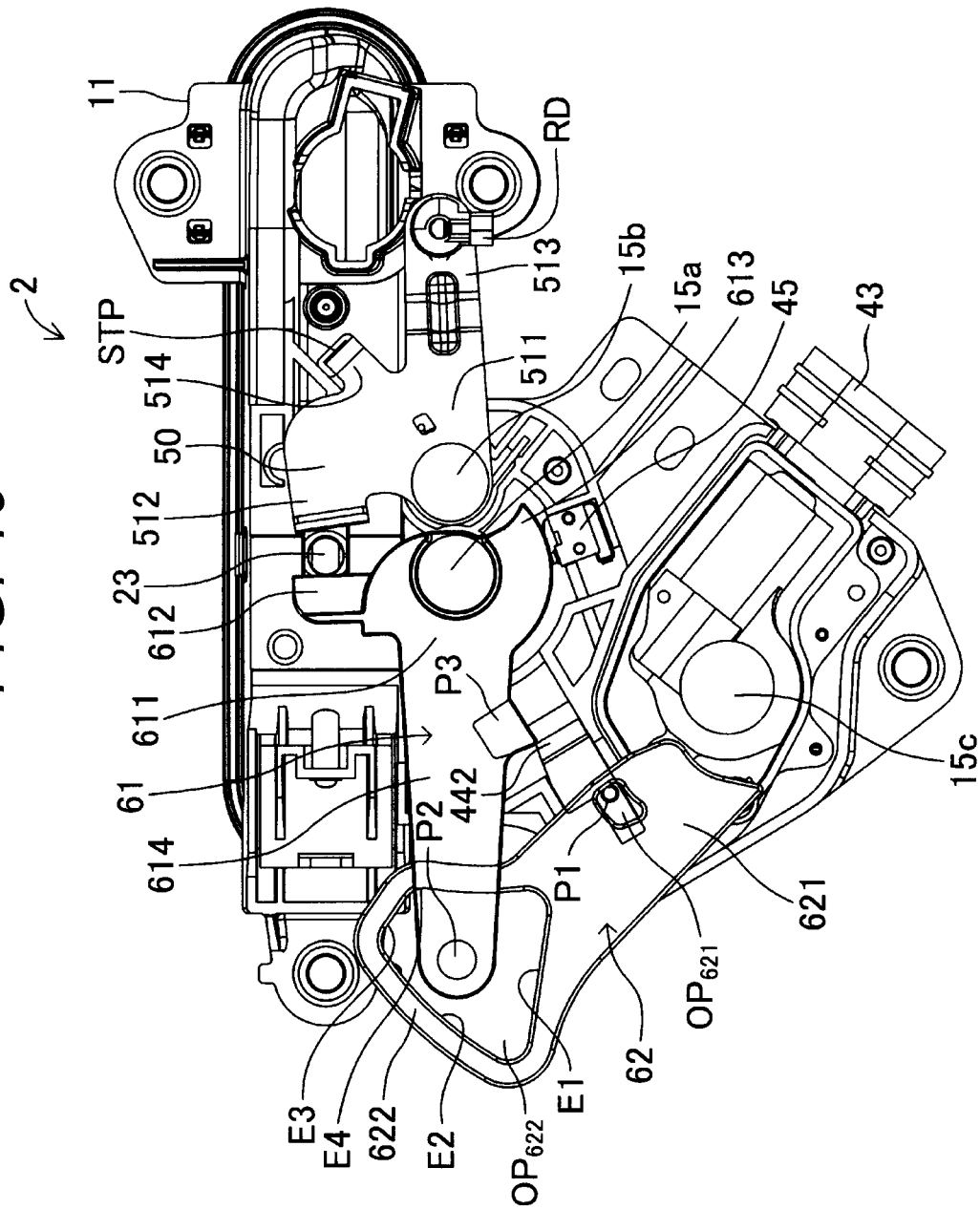
FIG. 19 is a side view of the door handle apparatus for a vehicle in a third stage in the middle of reaching the initial state from the pop-up state, when viewed from the vehicle interior side.
Figure 20:
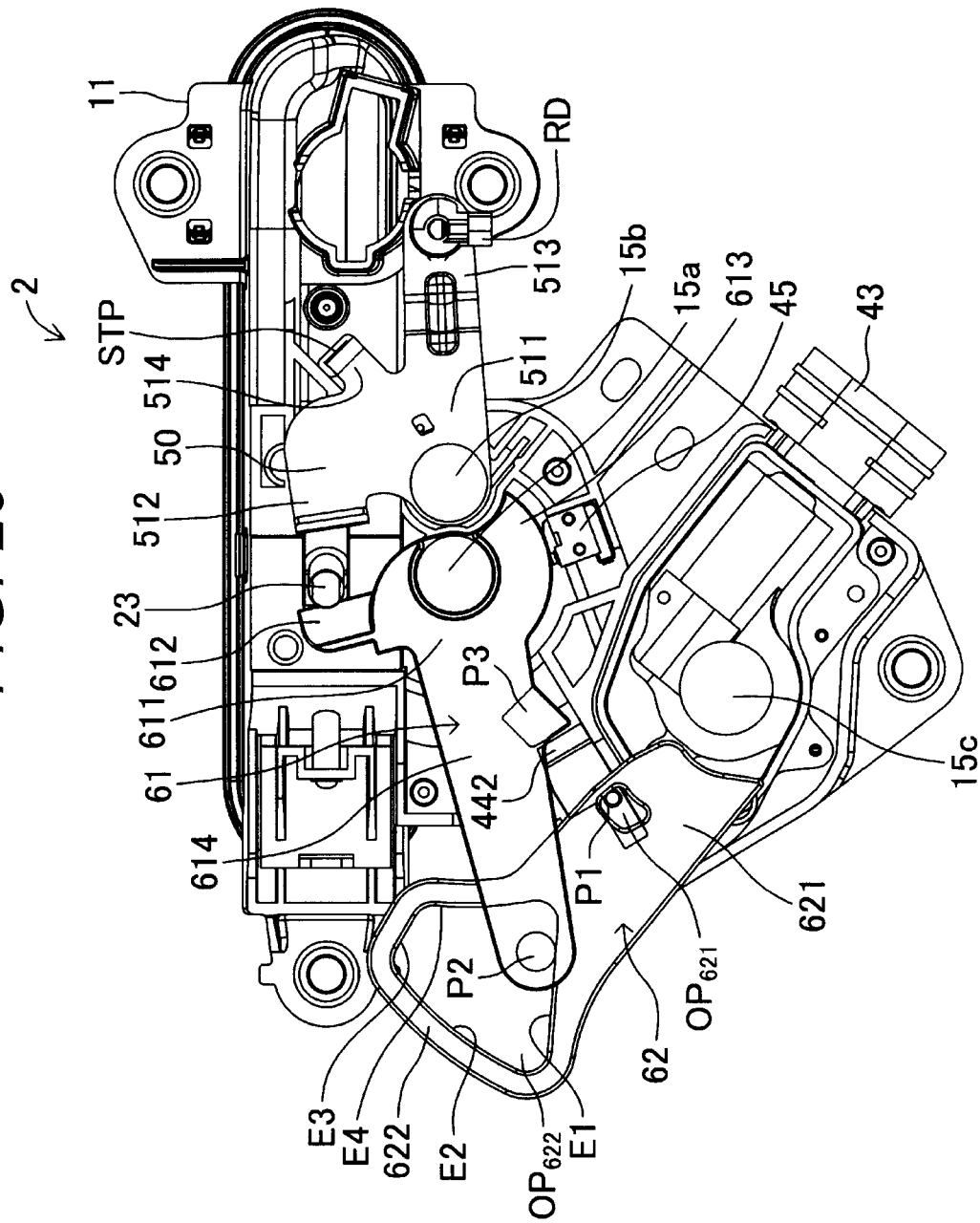
FIG. 20 is a side view of the door handle apparatus for a vehicle in a fourth stage in the middle of reaching the initial state from the pop-up state, when viewed from the vehicle interior side.

In the door-open state, when the user releases the hand from the grip 21, the grip 21 and the bell crank 50 are biased by the torsion spring to return to the pop-up position. The ECU measures the elapsed time from the time of transition to the pop-up state, and when the measurement result exceeds a predetermined threshold value, the ECU drives the electric actuator 43 to rotate the actuator lever 62 counterclockwise in FIG. 16. As illustrated in FIG. 17, the head portion 442 comes into contact with the side surface portion P3b, and thus the actuator lever 62 starts rotating in a state in which the pop-up lever 61 remains stopped. As the opening $OP_{621}$ rotates, the head portion 442 (protrusion P1) moves to the lower left side (initial state side) as illustrated in FIG. 18. As illustrated in FIG. 19, the head portion 442 is separated from the side surface portion P3b of the protrusion P3. That is, the restriction on the counterclockwise rotation of the pop-up lever 61 is released. Accordingly, the grip 21 is biased by the torsion spring to rotate, and the arm 23 moves forward. The distal end portion of the arm 612 of the pop-up lever 61 is pressed forward by the arm 23. As a result, the pop-up lever 61 rotates counterclockwise in FIG. 19 and returns to the initial position illustrated in FIG. 12 through the state illustrated in FIG. 20.

(Effects)

In a case where the door handle apparatus 1 is adopted, the user needs to push the front end portion of the grip 21 to pop up the grip 21. On the other hand, in a case where the door handle apparatus 2 is adopted, when the user unlocks the door DR, the electric actuator 43 is driven to automatically pop up the grip 21. Therefore, the convenience of the door handle apparatus 2 is higher than that of the door handle apparatus 1.

Modification Example of Second Embodiment (Configuration)

A pop-up lever 71 and an actuator lever 72, which are illustrated in FIGS. 21 to 29, are used instead of the pop-up lever 61 and the actuator lever 62.

The pop-up lever 71 is a plate-like member similar to the pop-up lever 41, but has a plate thickness greater than that of the pop-up lever 41. The pop-up lever 71 has a plurality of ribs. The pop-up lever 71 includes a base portion 711 and arms 712, 713, 714 in a similar manner to the pop-up lever 41. However, unlike the above-described pop-up lever 61, a substantially columnar protrusion P4 extending to a "left side" is provided at the distal end portion of the arm 714. The protrusion P3 is provided in an intermediate portion of the arm 714 similarly to the arm 614.

The actuator lever 72 includes a base portion 721 and an arm 722. One end portion of the base portion 721 is rotatably supported around the shaft portion 15b. A slit-like opening $OP_{721}$ extending in a rotation direction of the base portion 721 is provided at a corner portion of the other end portion of the base portion 721 in the longitudinal direction. The arm 722 is rotatably assembled to the other end portion of the base portion 721. A rotation angle of the arm 722 with respect to the base portion 721 is restricted within a predetermined range by a rotation restriction mechanism 73. The arm 722 extends outward from the base portion 721. A substantially elongated circular opening $OP_{722}$ is provided at the distal end portion of the arm 722. A width of the opening $OP_{722}$ is equal to a diameter of the protrusion P4.

The actuator lever 72 is disposed adjacent to the left side of the pop-up lever 71, and the protrusion P1 and the protrusion P4 are inserted into the opening $OP_{721}$ and the opening $OP_{722}$, respectively.

(Operation)

<Initial State>

Figure 21:
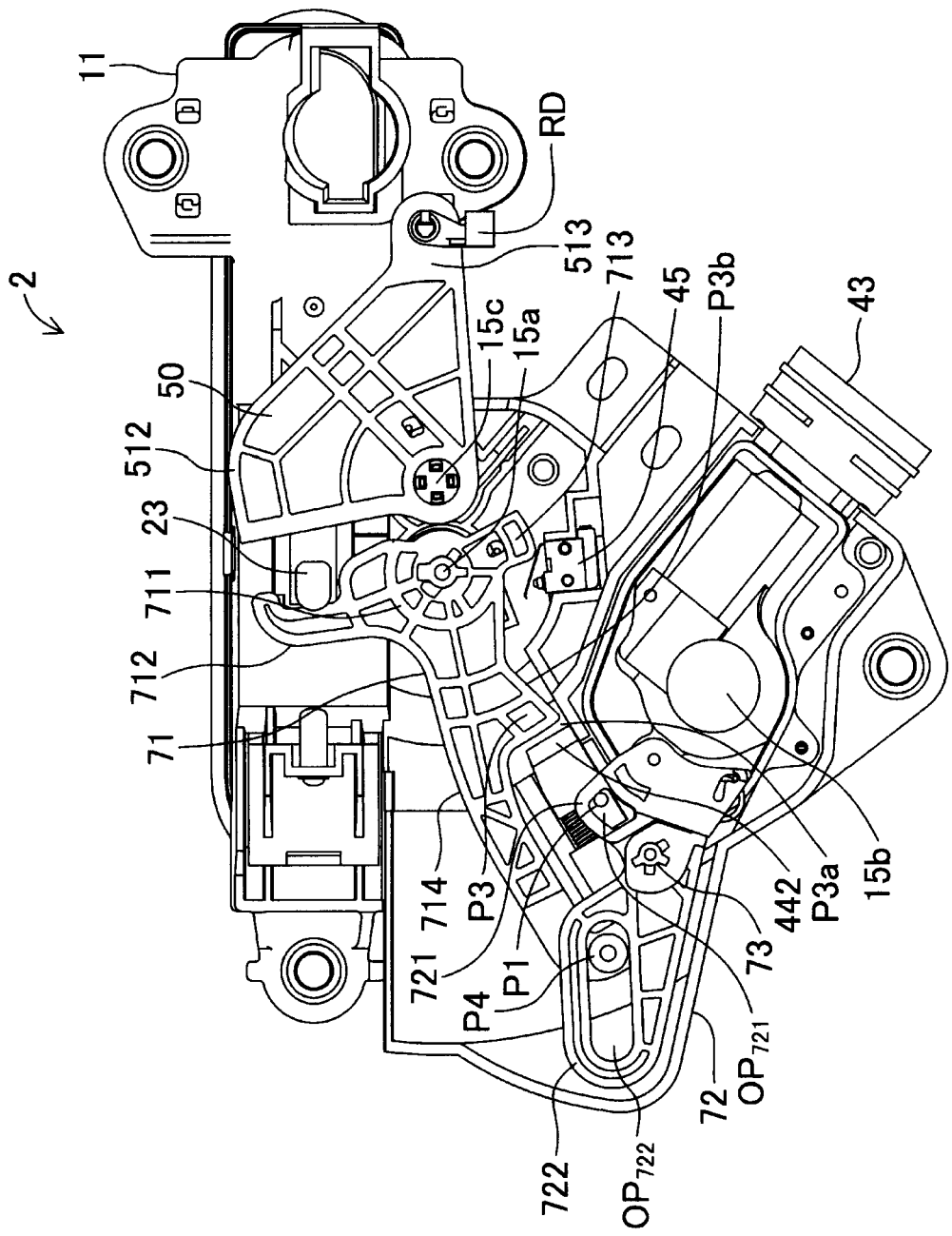
FIG. 21 is a side view of a door handle apparatus for a vehicle according to a modification example of the second embodiment disclosed here, and is the side view of the door handle apparatus for a vehicle in an initial state, when viewed from the vehicle interior side.

Before the user starts the operation of opening the door DR (in the initial state), the grip 21 is housed in the housing portion 11 and is stopped similarly to the first embodiment. As illustrated in FIG. 21, the arm 23 is located on the front end portion of the opening $OP_{11a}$. The bell crank 50 is also stopped similarly to the first embodiment.

The rear surface of a distal end portion 712a of the arm 712 of the pop-up lever 71 comes into contact with the front surface of the arm 23 of the handle 20.

The arm 713 extends rearward and downward (lower right side in FIG. 21) when viewed from the rotation center of the pop-up lever 71. The electric actuator 43 is not operated. That is, power is not supplied to the electric motor, and the output shaft of the electric motor is stopped. Therefore, the actuator lever 72 is stopped at a predetermined initial position illustrated in FIG. 21.

The arm 713 of the pop-up lever 71 extends rearward and downward (lower right side in FIG. 21) when viewed from the rotation center of the pop-up lever 71. The distal end portion of the arm 713 is separated from the switch 45 in the counterclockwise direction in FIG. 21.

An angle between the base portion 721 of the actuator lever 72 and the arm 722 is the maximum value of a variable range of the angle. That is, the rotation restriction mechanism 73 restricts the rotation of the arm 722 with respect to the base portion 721 such that the angle between the base portion 721 and the arm 722 does not increase beyond the variable range.

The protrusion P1 of the stopper 44 is stopped at the other end portion (lower left side in FIG. 21) in the movable range of the protrusion P1 by the actuator lever 62. The head portion 442 faces (separates from) a side surface portion P3a of the protrusion P3. The coil spring of the stopper 44 is pressed to some extent. That is, although the head portion 442 is pressed toward the upper right side by the coil spring in FIG. 21, the movement of the protrusion P1 inserted into the opening $OP_{721}$ of the actuator lever 72 is restricted (locked to the end portion of the opening $OP_{721}$), and thus the head portion 442 is stopped in a state of being separated from the protrusion P3.

<Transition to Pop-Up State>

In the initial state, when the user performs an unlocking operation by using a portable terminal (key) (not illustrated), the ECU drives the electric actuator of the locking mechanism KM, and causes the locking mechanism KM to transition from the locked state to the unlocked state. The ECU drives the electric actuator 43 to rotate the actuator lever 72 from the initial position illustrated in FIG. 21 in the clockwise direction in FIG. 21, moves the actuator lever 72 to a predetermined pop-up position illustrated in FIG. 25 through the states illustrated in FIGS. 22 to 24, and stops driving the electric actuator 43. In the process, the protrusion P2 of the pop-up lever 71 is pushed up by the actuator lever 72, and the pop-up lever 71 rotates clockwise in FIG. 21. Accordingly, the distal end of the arm 23 is pressed by the arm 712 and moves backward. That is, the grip 21 rotates to reach the pop-up state (state in which the user can grip the grip 21). As illustrated in FIG. 25, in the pop-up state, the distal end of the arm 23 comes into contact with the distal end portion of the arm 512 of the bell crank 50.

Figure 22:
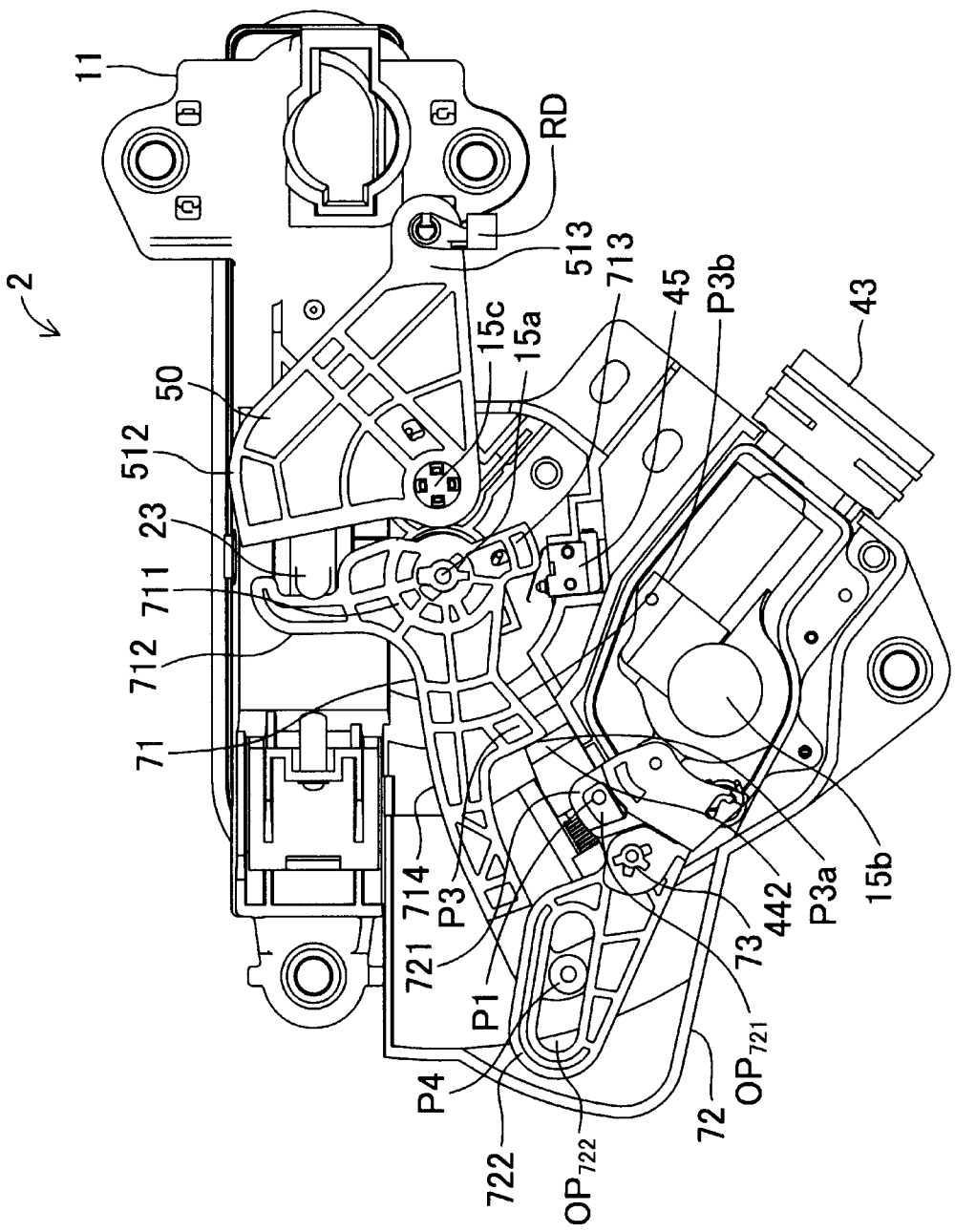
FIG. 22 is a side view of the door handle apparatus for a vehicle in a first stage in the middle of reaching the pop-up state from the initial state, when viewed from the vehicle interior side.

When the opening $OP_{721}$ of the actuator lever 72 rotates clockwise in FIG. 21, the movement restriction of the head portion 442 (protrusion P1) is released. The head portion 442 is biased by the coil spring, moves in the upper right direction in FIG. 21, and comes into contact with the side surface portion P3a of the protrusion P3 as illustrated in FIG. 22. In this state, the coil spring is slightly extended as compared with the initial state, but is still in a pressed state.

Figure 23:
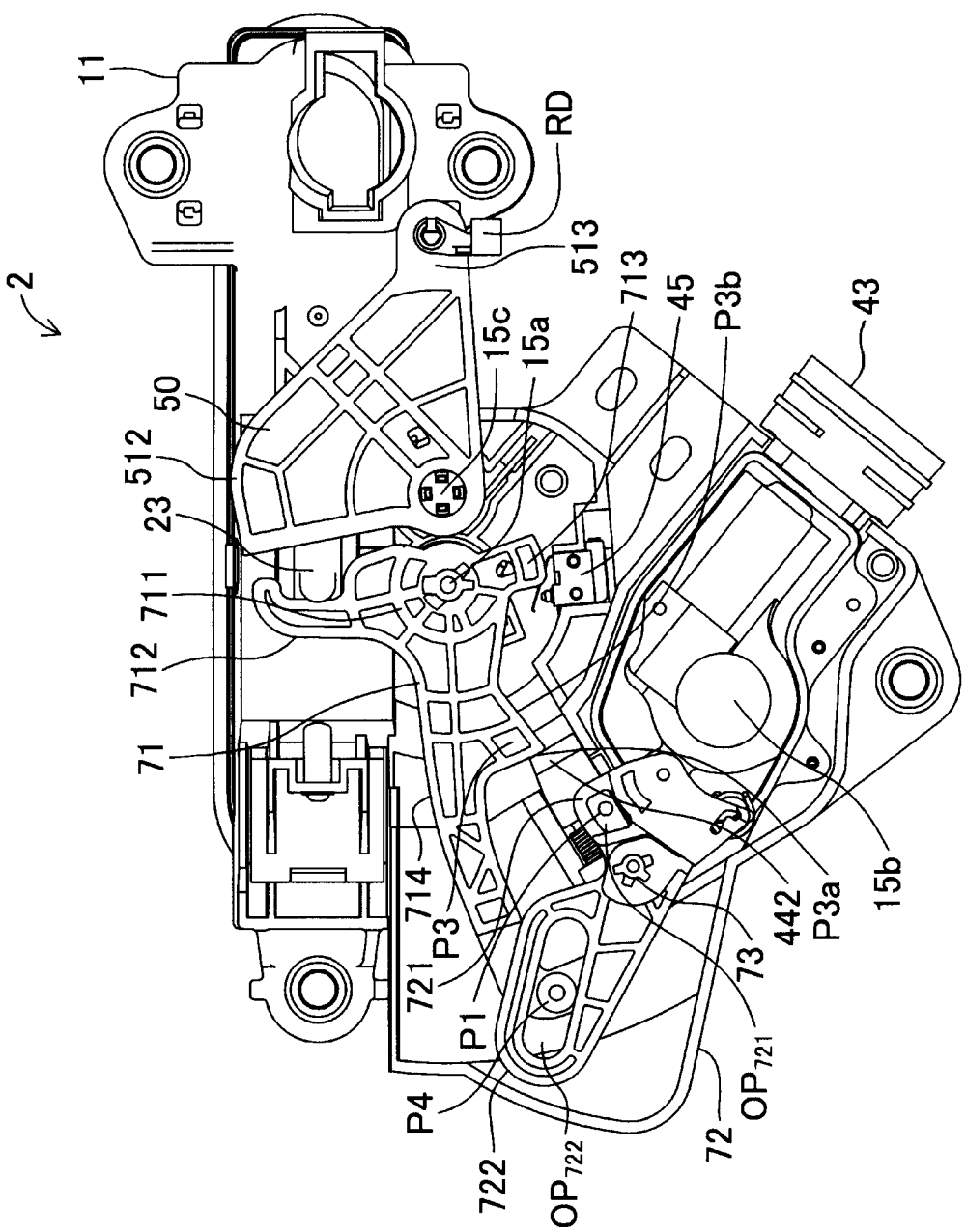
FIG. 23 is a side view of the door handle apparatus for a vehicle in a second stage in the middle of reaching the pop-up state from the initial state, when viewed from the vehicle interior side.
Figure 24:
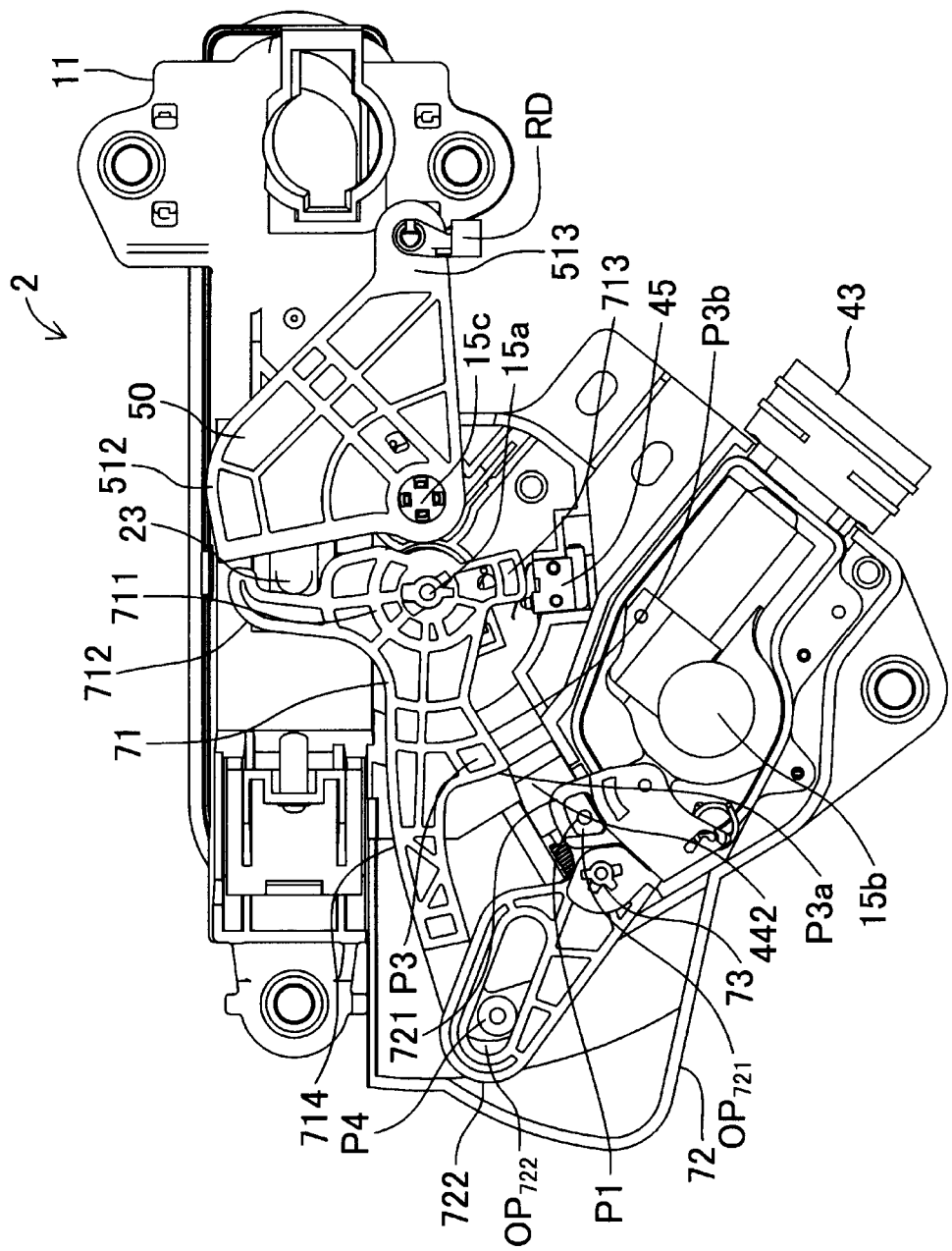
FIG. 24 is a side view of the door handle apparatus for a vehicle in a third stage in the middle of reaching the pop-up state from the initial state, when viewed from the vehicle interior side.
Figure 25:
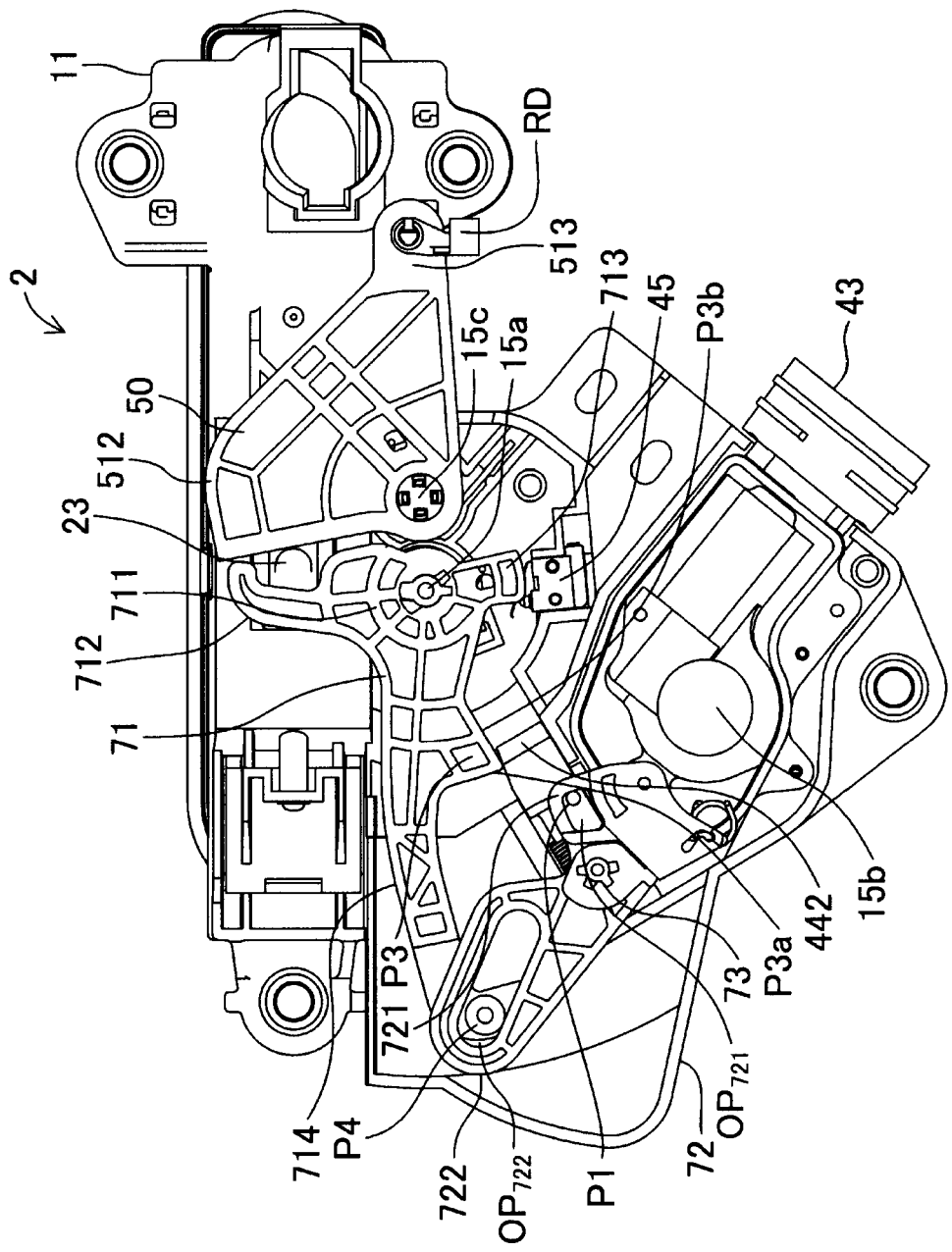
FIG. 25 is a side view of the door handle apparatus for a vehicle in the pop-up state, when viewed from the vehicle interior side.

As illustrated in FIG. 23, the pop-up lever 71 further rotates from the state of FIG. 22, and as illustrated in FIG. 24, when a vertex of the protrusion P3 (intersection portion (ridgeline) of the side surface portion P3a and the side surface portion P3b) is separated from the head portion 442, the head portion 442 protrudes in the upper right direction by the biasing force of the coil spring in FIG. 24. As illustrated in FIG. 25, the head portion 442 comes into contact with the side surface portion P3b of the protrusion P3. Accordingly, the counterclockwise rotation of the pop-up lever 71 is restricted. That is, the forward movement of the arm 23 is restricted by the arm 712. Therefore, even in a state in which power is not supplied to the electric actuator 43, the grip 21 remains stopped at the pop-up position.

The arm 713 presses the push button portion of the switch 45, and the switch 45 transitions from an OFF state to an ON state. Accordingly, the ECU can recognize that the door handle apparatus 1 is in the pop-up state.

<Transition to Door-Open State>

In the pop-up state, when the user pulls the grip 21 toward the user, the state transitions from the pop-up state to the door-open state as in the first embodiment.

<Transition to Initial State (Regression)>

Figure 26:
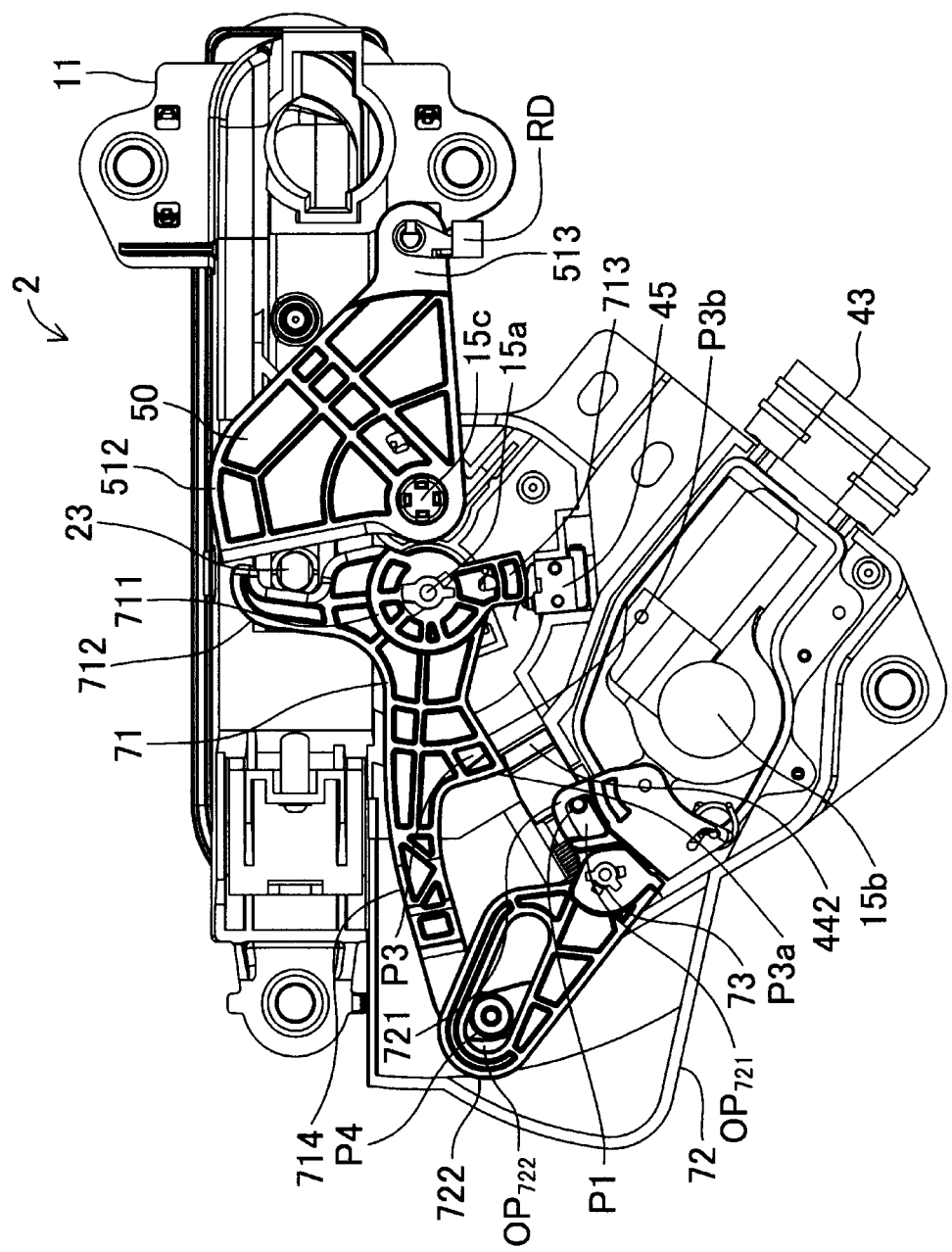
FIG. 26 is a side view of the door handle apparatus for a vehicle in a first stage in the middle of reaching the initial state from the pop-up state, when viewed from the vehicle interior side.
Figure 27:
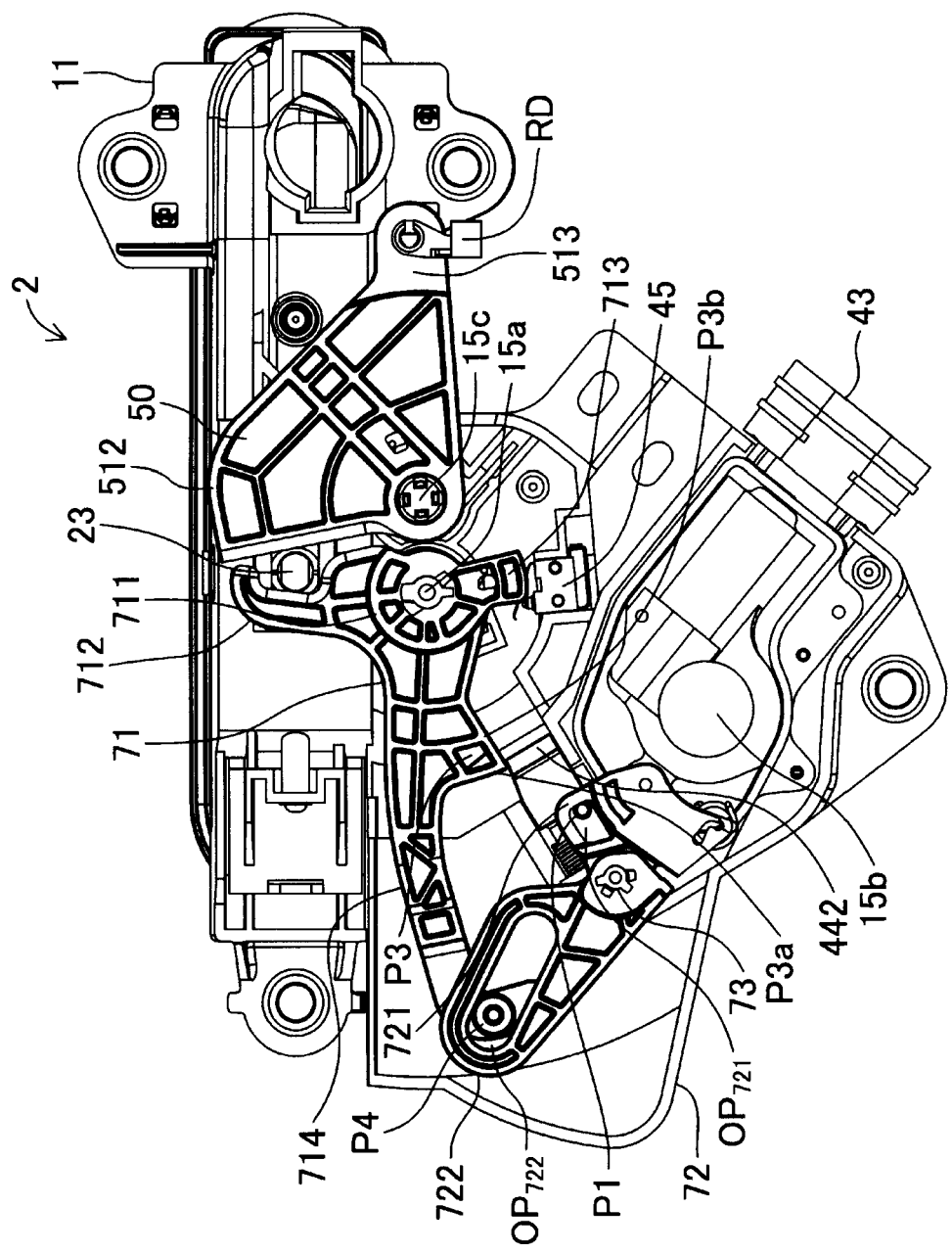
FIG. 27 is a side view of the door handle apparatus for a vehicle in a second stage in the middle of reaching the initial state from the pop-up state, when viewed from the vehicle interior side.
Figure 28:
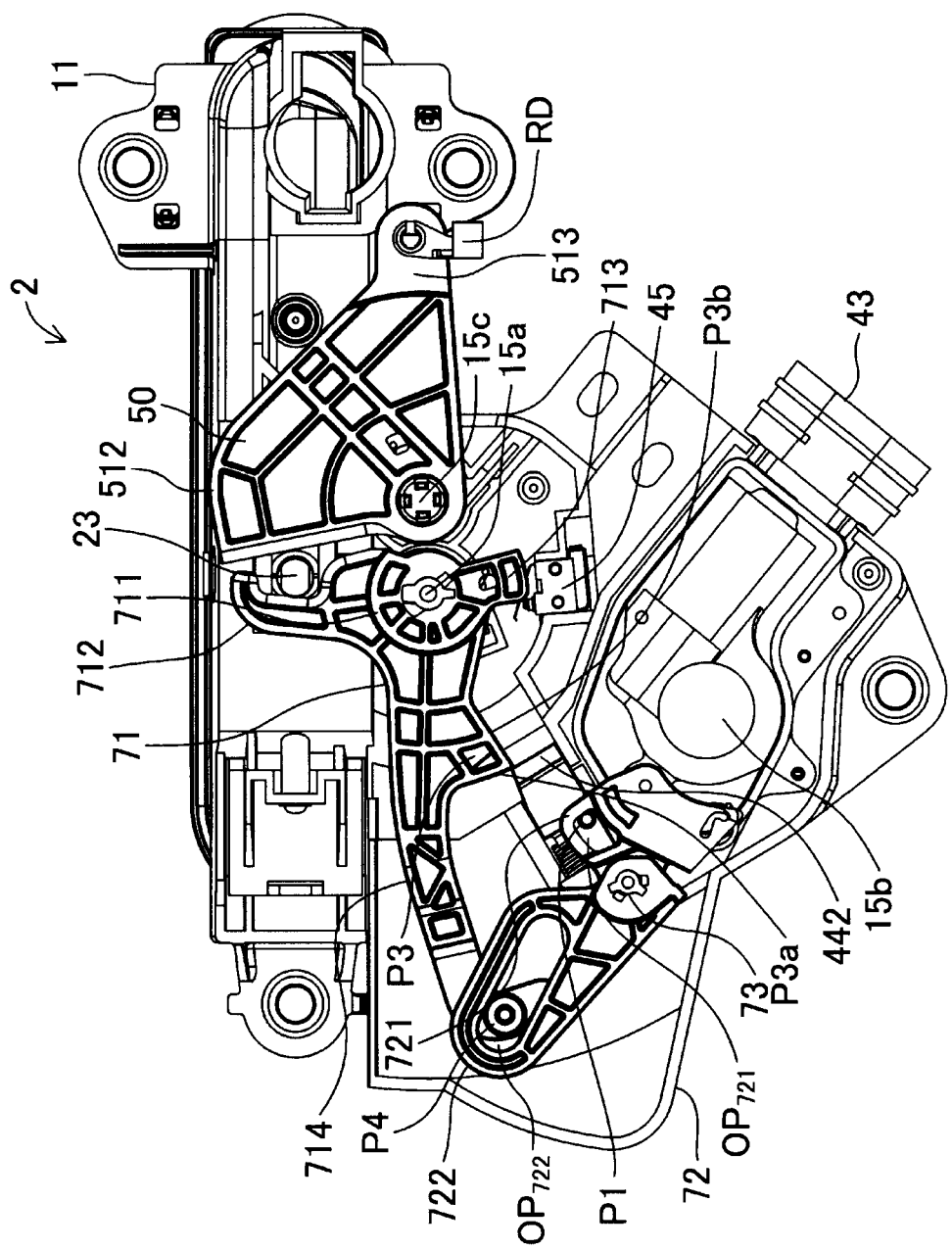
FIG. 28 is a side view of the door handle apparatus for a vehicle in a third stage in the middle of reaching the initial state from the pop-up state, when viewed from the vehicle interior side.
Figure 29:
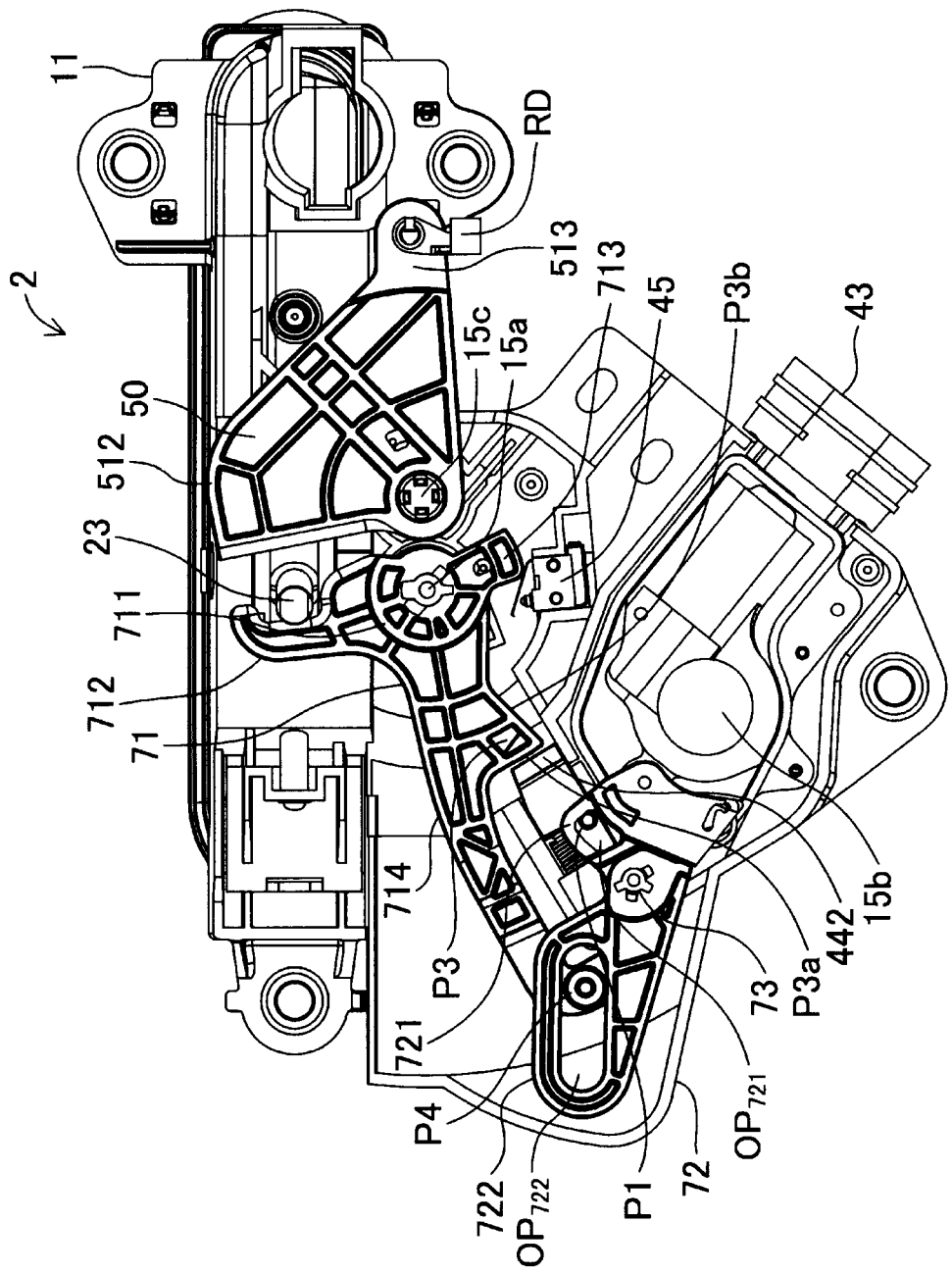
FIG. 29 is a side view of the door handle apparatus for a vehicle in a fourth stage in the middle of reaching the initial state from the pop-up state, when viewed from the vehicle interior side.

In the door-open state, when the user releases the hand from the grip 21, the grip 21 and the bell crank 50 are biased by the torsion spring to return to the pop-up position. The ECU measures the elapsed time from the time of transition to the pop-up state, and when the measurement result exceeds a predetermined threshold value, the ECU drives the electric actuator 43 to rotate the actuator lever 72 counterclockwise in FIG. 25. As illustrated in FIG. 25, since the head portion 442 comes into contact with the side surface portion P3b, the base portion 721 starts rotating counterclockwise in FIG. 25 such that the angle between the base portion 721 and the arm 722 decreases in a state in which the pop-up lever 71 remains stopped. As illustrated in FIG. 26, as the opening $OP_{721}$ rotates counterclockwise in FIG. 26, the head portion 442 (protrusion P1) moves to the lower left side (initial state side) in FIG. 26. Through the state illustrated in FIG. 27, as illustrated in FIG. 28, the head portion 442 is separated from the side surface portion P3b of the protrusion P3. That is, the restriction on the counterclockwise rotation of the pop-up lever 71 is released. Accordingly, the grip 21 is biased by the torsion spring to rotate, and the arm 23 moves forward. The distal end portion of the arm 714 of the pop-up lever 71 is pressed forward by the arm 23. As a result, the pop-up lever 71 rotates counterclockwise in FIG. 28. Therefore, as illustrated in FIG. 29, the angle between the base portion 721 and the arm 722 increases, and returns to the initial position illustrated in FIG. 21.

Third Embodiment (Configuration)

Figure 30A:
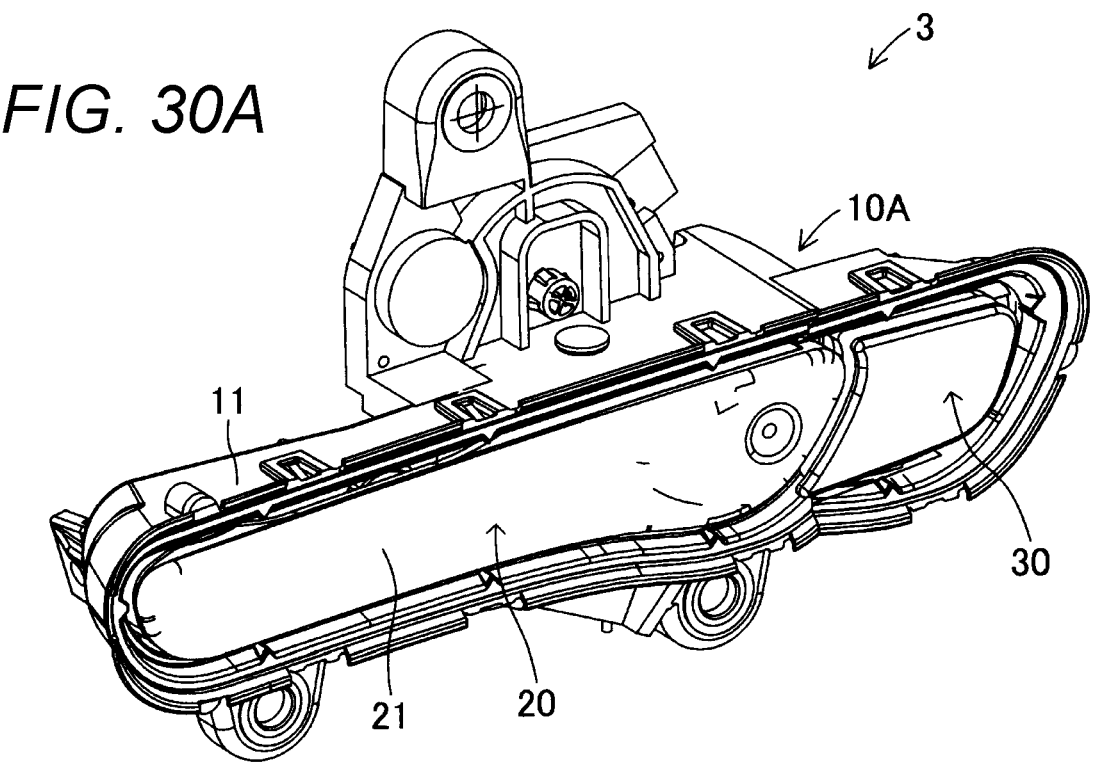
FIG. 30A is a perspective view of a door handle apparatus for a vehicle according to a third embodiment disclosed here, and is the perspective view of the door handle apparatus for a vehicle in the initial state, when viewed from the vehicle exterior side.
Figure 30B:
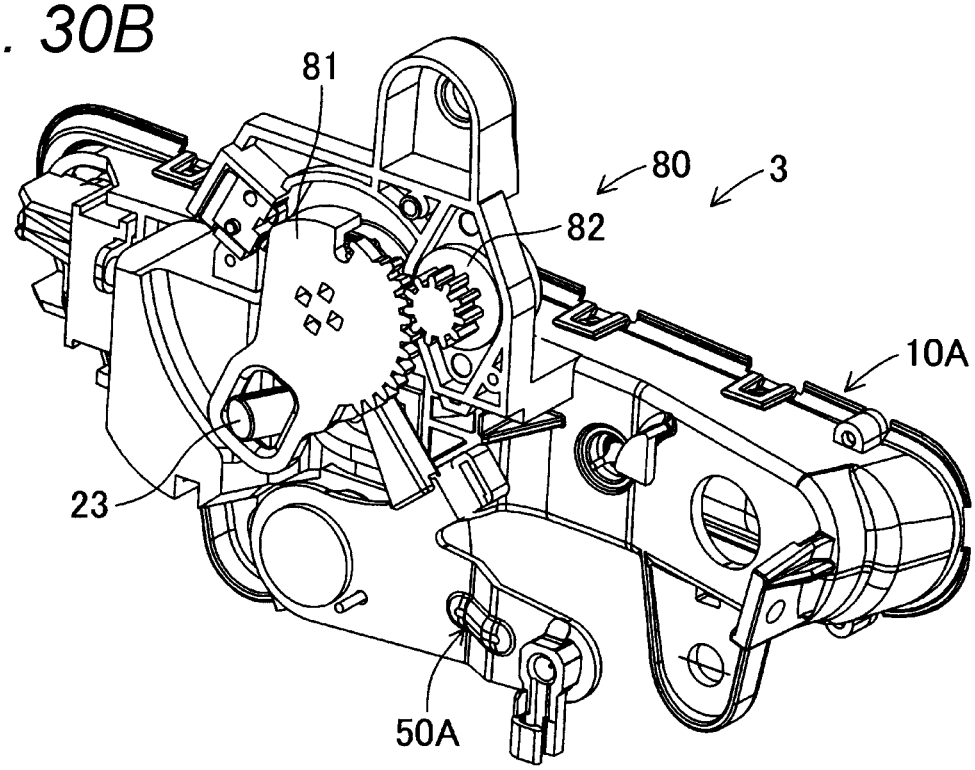
FIG. 30B is a perspective view of the door handle apparatus for a vehicle in the initial state, when viewed from the vehicle interior side.

A door handle apparatus 3 according to the third embodiment of the present disclosure will be described. As illustrated in FIGS. 30A and 30B, the door handle apparatus 3 includes a base 10A different from the base 10. The door handle apparatus 3 includes a damping mechanism 80 that reduces the rotation speed of the grip 21 by applying a resistance force (torque) in a direction opposite to the rotation direction of the grip 21, instead of the stopper 44. The door handle apparatus 3 further includes a bell crank 50A instead of the bell crank 50. Unlike the door handle apparatus 1 and the door handle apparatus 2, the door handle apparatus 3 does not include a pop-up lever, an actuator lever, a stopper, and an electric actuator that drives the pop-up lever, the actuator lever, and the stopper.

The base 10A includes shaft portions 15d and 15e similarly to the shaft portions 15a and 15c of the base 10. The shaft portion 15d is located above an opening $OP_{11a}$. The shaft portion 15e is located below the opening $OP_{11a}$. Other configurations of the base 10A are similar to those of the base 10.

The damping mechanism 80 includes a lever 81 and a rotary damper 82. A lever 81 includes a base portion 811 and an arm 812. The base portion 811 is rotatably supported by the shaft portion 15d. A part of the outer peripheral portion of the base portion 811 has an arc shape, and a tooth T1 meshing with a tooth T2 of a spur gear G of the rotary damper 82 to be described later is provided in an arc portion 811a. Another part of the outer peripheral portion of the base portion 811 has a cam shape. That is, in a cam portion 811b, the radial dimension of the cam portion 811b gradually increases as being directed from one end side to the other end side in the peripheral direction of the base portion 811. The arm 812 is disposed between the arc portion 811a and the cam portion 811b in the outer peripheral portion of the base portion 811. When viewed from the left side of the lever 81, the arm 812 extends outward in the radial direction of the base portion 811. An opening $OP_{812}$ is provided in the arm 812. The opening $OP_{812}$ has a substantially rectangular shape. The arm 23 is inserted into the opening $OP_{812}$.

The rotary damper 82 includes a case 821. A rotor and oil having a relatively high viscosity are housed in the case 821. A shaft portion connected to the rotor protrudes outward from the case. The spur gear G is attached to the shaft portion. The case 821 is fixed to the base 10A such that a center axis of the spur gear G is positioned behind and above the shaft portion 15d (upper right side in FIG. 30D). The tooth T2 of the spur gear G meshes with the tooth T1 of the lever 81.

The bell crank 50A includes a base portion 50A1, an arm 50A2, and an arm 50A3. The base portion 50A1 is rotatably supported by the shaft portion 15e. The arm 50A2 extends outward in the radial direction of the base portion 50A1 from the outer peripheral portion of the base portion 50A1. The distal end portion of a rod RD is connected to the distal end portion of the arm 50A2. The arm 50A3 protrudes from a portion between the central portion of the base portion 50A1 and the distal end portion of the arm 50A2. The arm 50A3 extends in a direction inclined with respect to the extending direction of the arm 50A2.

Figure 30C:
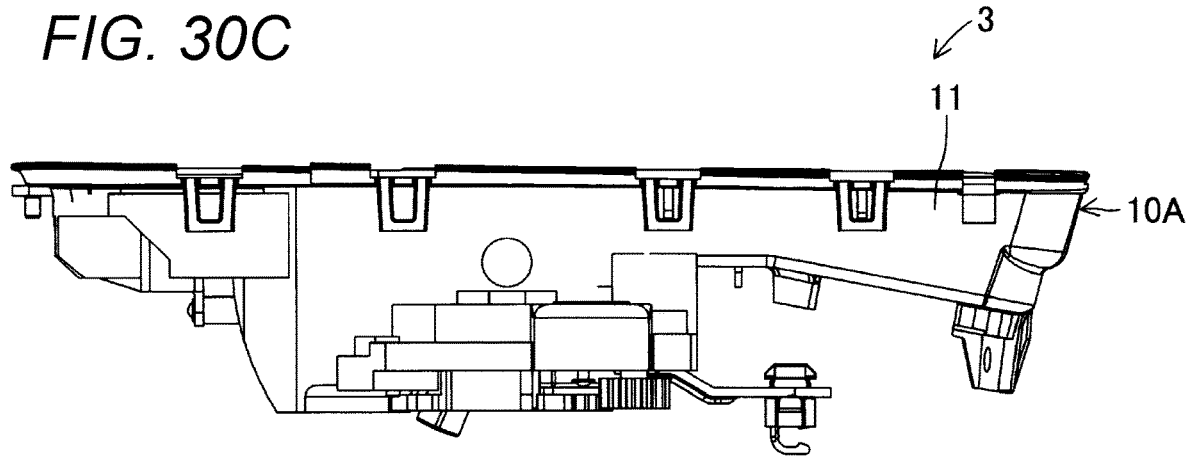
FIG. 30C is a plan view of the door handle apparatus for a vehicle in the initial state, when viewed from above.
Figure 30D:
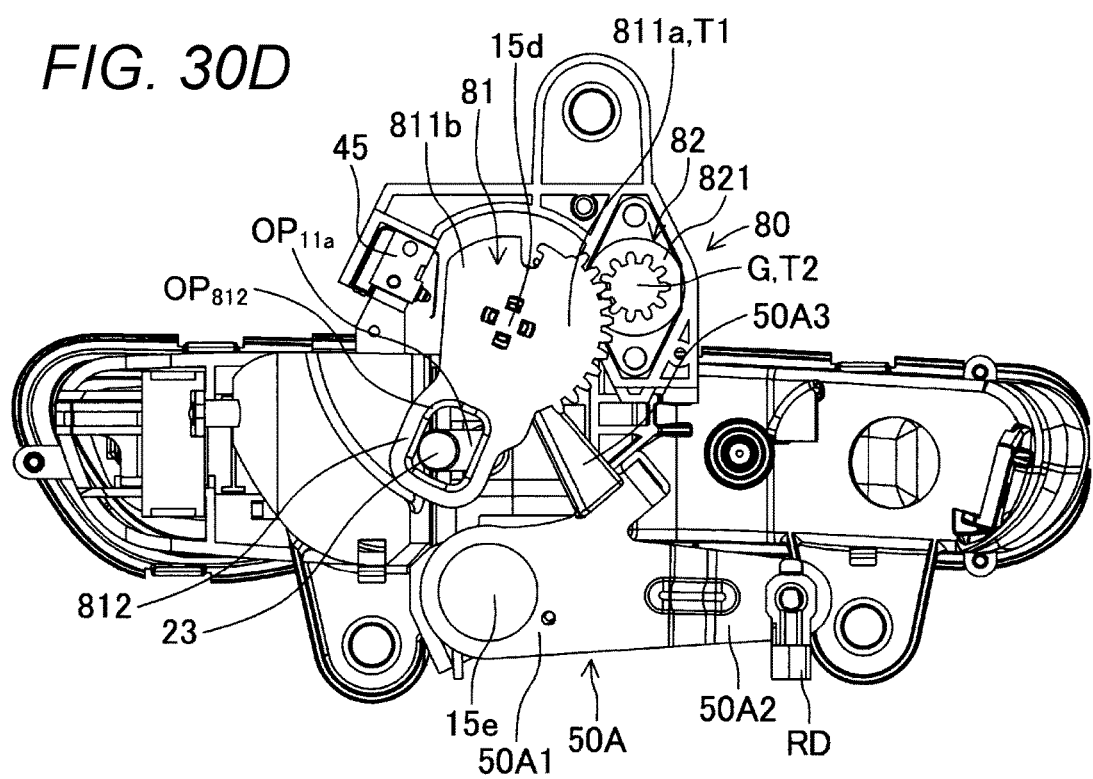
FIG. 30D is a side view of the door handle apparatus for a vehicle in the initial state, when viewed from the vehicle interior side.

A switch 45 is disposed in front of and above the shaft portion 15d (upper left side in FIG. 30D).

(Operation)

<Initial State>

Before the user starts the operation of opening the door DR (in the initial state), the handle 20 is biased by a torsion spring, and as illustrated in FIGS. 30A and 30B, the grip 21 is housed in the housing portion 11 and is stopped. The arm 23 is located on the front end portion of the opening $OP_{11a}$. The distal end portion of the arm 23 is inserted into the opening $OP_{812}$. The bell crank 50A is biased counterclockwise by the torsion spring in FIG. 30D, but a part of the arm 50A3 comes into contact with a stopper STP provided in the base 10A, and the bell crank 50A is stopped. The arm 23 is separated from the distal end portion of the arm 50A3. The cam portion 811b is separated from the push button portion of the switch 45. That is, the switch 45 is in an OFF state.

<Transition to Pop-Up State>

In the initial state, when the user performs an unlocking operation by using a portable terminal (key) (not illustrated), the ECU drives the electric actuator of the locking mechanism KM, and causes the locking mechanism KM to transition from the locked state to the unlocked state.

Figure 31A:
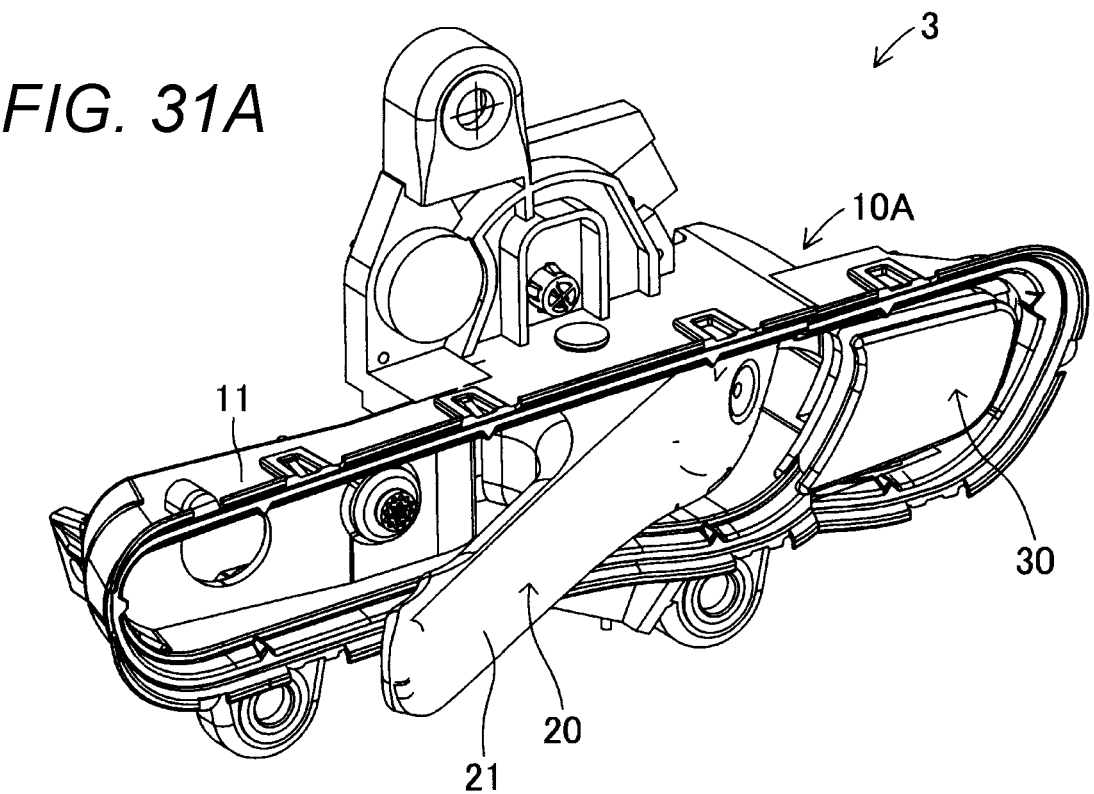
FIG. 31A is a perspective view of the door handle apparatus for a vehicle in a pop-up state, when viewed from the vehicle exterior side.
Figure 31B:
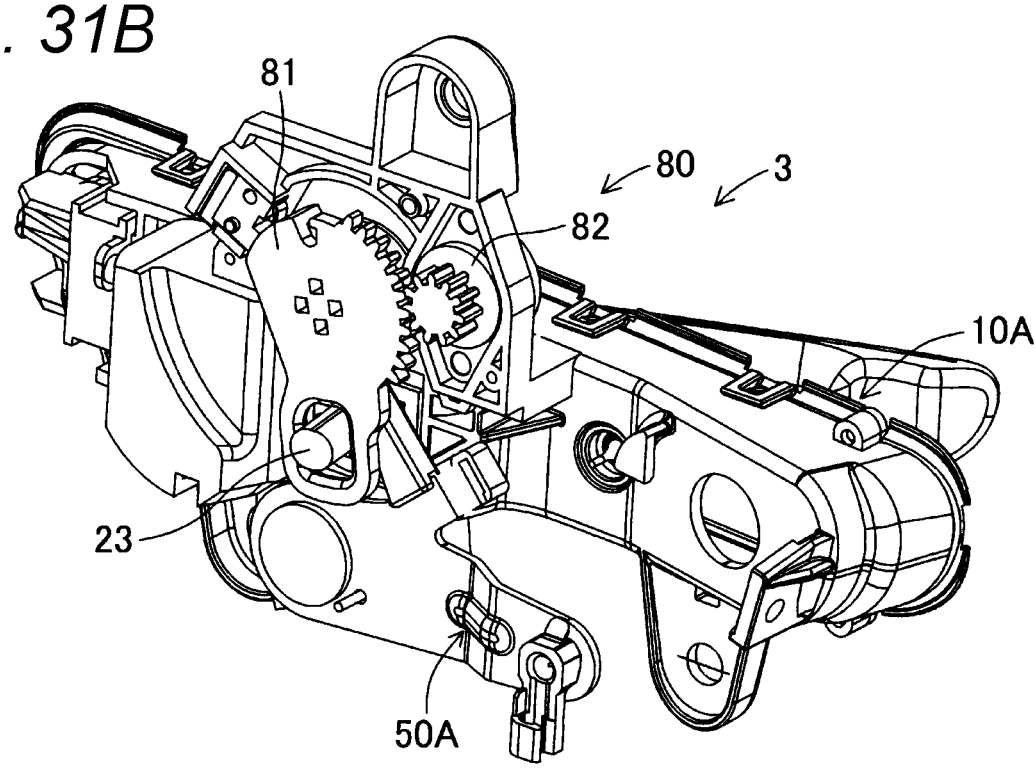
FIG. 31B is a perspective view of the door handle apparatus for a vehicle in the pop-up state, when viewed from the vehicle interior side.
Figure 31C:
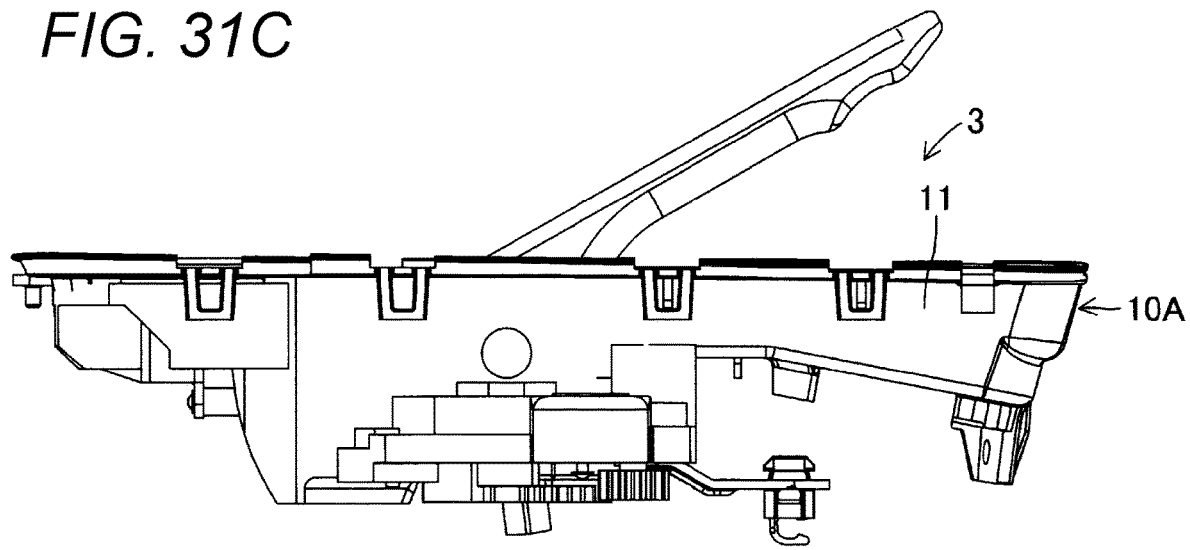
FIG. 31C is a plan view of the door handle apparatus for a vehicle in the pop-up state, when viewed from above.

When the user pushes the front end portion of the grip 21 of the handle 20 (portion in front of the shaft member 13), the grip 21 rotates counterclockwise in FIG. 30C to reach a pop-up position illustrated in FIGS. 31A and 31B (state in which the user can grip the grip 21). In this process, the distal end of the arm 23 moves rearward from the initial position illustrated in FIG. 30D, and the lever 81 is rotated counterclockwise in FIG. 30D. Since the tooth T1 of the lever 81 meshes with the tooth T2 of the rotary damper 82, the shaft portion of the rotary damper 82 rotates in accordance with the rotation of the lever 81. Accordingly, a torque (resistance force) acts on the lever 81 in a rotation direction opposite to the rotation direction of the lever 81. Therefore, the operational feeling of the grip 21 is heavier as compared with a case where the rotary damper 82 is not mounted. When the arm 23 comes into contact with the distal end portion of the arm 50A3 of the bell crank 50A, the operational feeling of the grip 21 become heavier. Therefore, the user can recognize that the door handle apparatus 1 reaches the pop-up state. The push button portion of the switch 45 is pressed by the cam portion 811b and the switch 45 transitions from an OFF state to an ON state.

<Transition to Door-Open State>

Figure 31D:
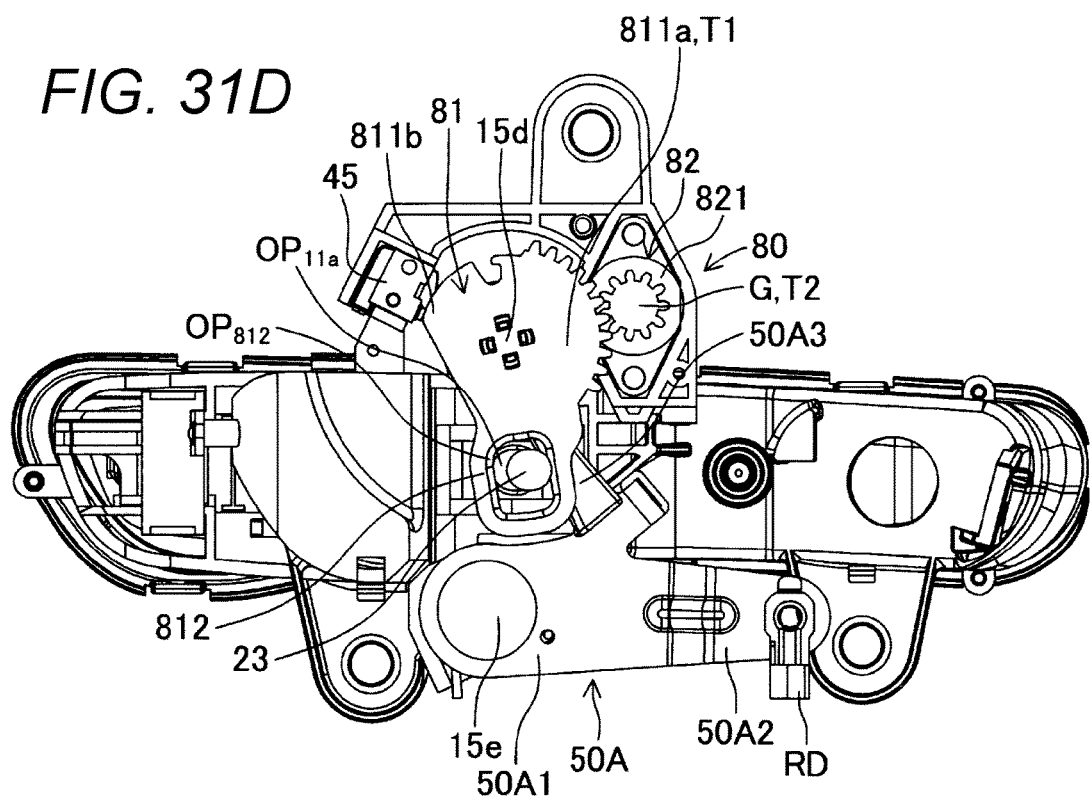
FIG. 31D is a side view of the door handle apparatus for a vehicle in the pop-up state, when viewed from the vehicle interior side.
Figure 32A:
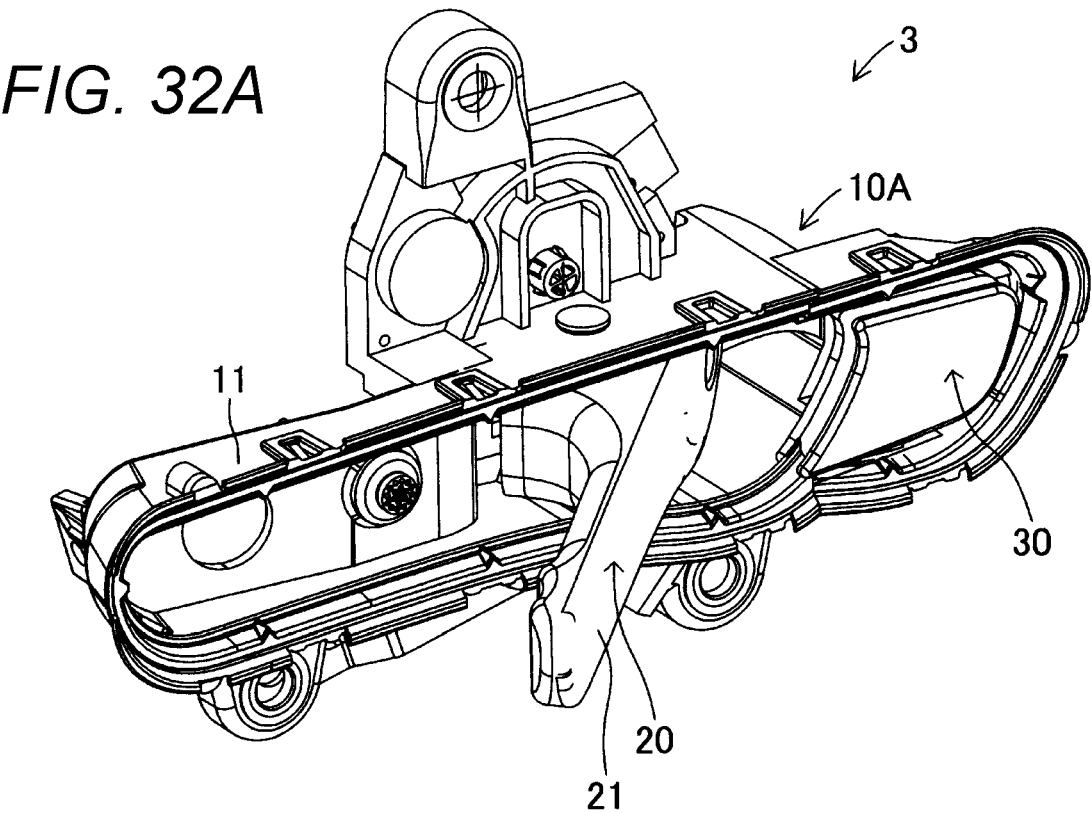
FIG. 32A is a perspective view of the door handle apparatus for a vehicle in a door-open state, when viewed from the vehicle exterior side.
Figure 32B:
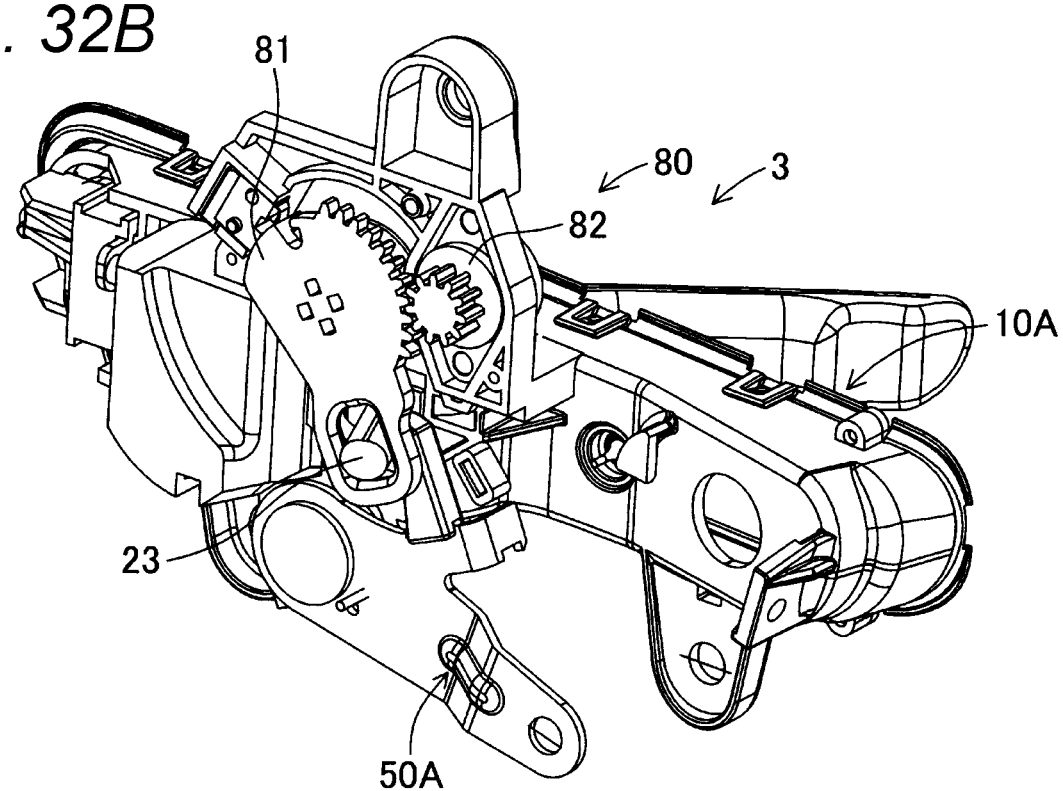
FIG. 32B is a perspective view of the door handle apparatus for a vehicle in the door-open state, when viewed from the vehicle interior side.
Figure 32C:
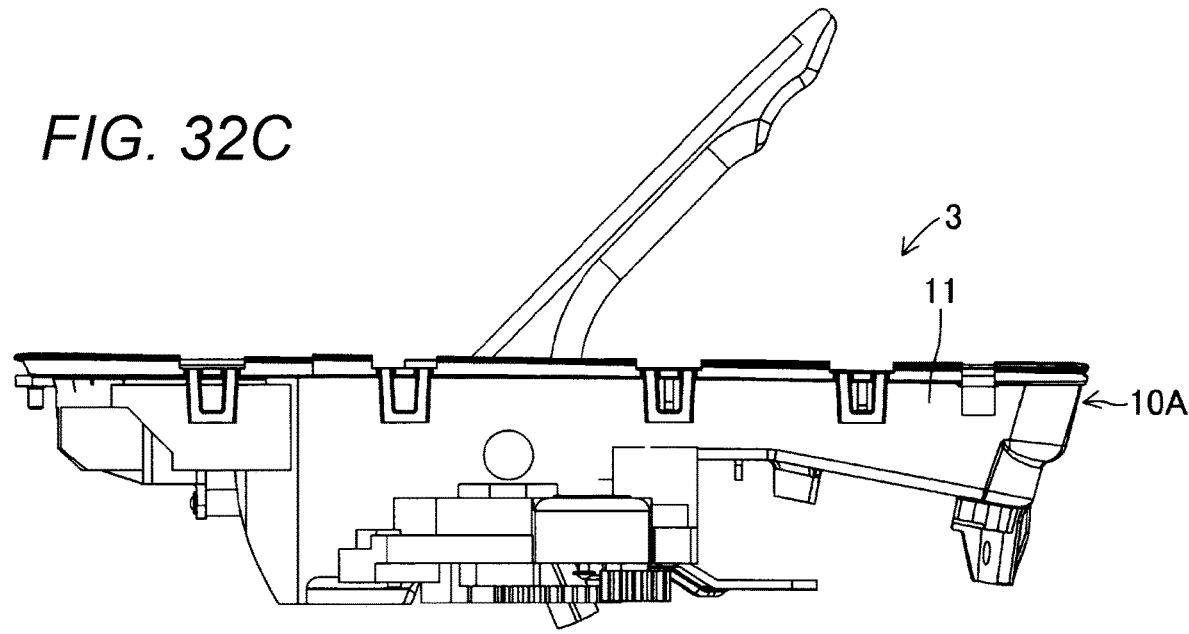
FIG. 32C is a plan view of the door handle apparatus for a vehicle in the door-open state, when viewed from above.

In the pop-up state, when the user grips and pulls the grip 21 of the handle 20 toward the user, the distal end of the arm 23 moves rearward. The distal end portion of the arm 50A3 of the bell crank 50A is pressed rearward by the arm 23, and the bell crank 50A rotates clockwise in FIG. 31D to reach a door-open position illustrated in FIGS. 32A and 32B. At this time, the rod RD connected to the distal end portion of the arm 50A2 moves downward. As a result, the release mechanism RM is driven to release the engagement between the latch mechanism LM and the striker ST, and the door DR is opened. In this process, the lever 81 rotates counterclockwise in FIG. 31D. Since the tooth T1 of the lever 81 meshes with the tooth T2 of the rotary damper 82, the shaft portion of the rotary damper 82 rotates in accordance with the rotation of the lever 81. Accordingly, a torque (resistance force) acts on the lever 81 in a rotation direction opposite to the rotation direction of the lever 81. Therefore, the operational feeling of the grip 21 is heavier as compared with a case where the rotary damper 82 is not mounted.

<Transition to Initial State (Regression)>

Figure 32D:
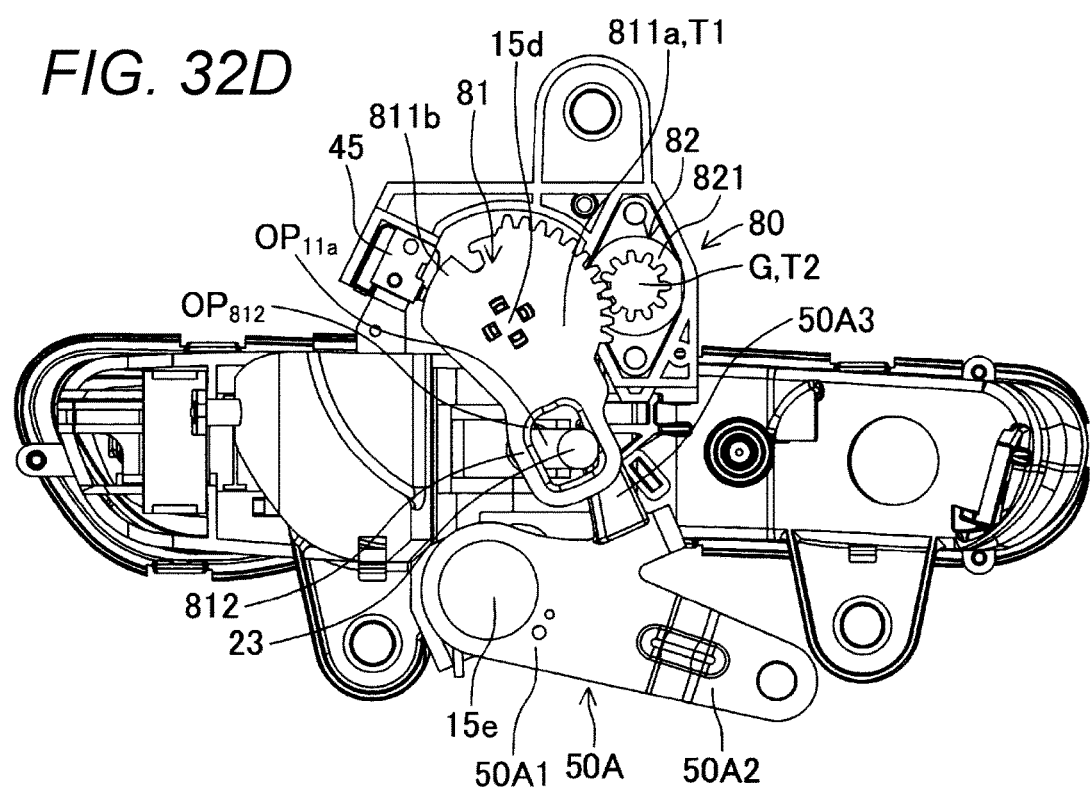
FIG. 32D is a side view of the door handle apparatus for a vehicle in the door-open state, when viewed from the vehicle interior side.

In the door-open state, when the user releases the hand from the grip 21, the grip 21 and the bell crank 50A are biased by the torsion spring to rotate, and return to the pop-up position. The grip 21 is biased by the torsion spring to rotate, and returns to the initial position. As described above, in the process in which the door handle apparatus 3 returns from the door-open state to the initial state, the lever 81 rotates clockwise in FIGS. 32D and 31D. At this time, the shaft portion of the rotary damper 82 engaged with the lever 81 rotates. As a result, a resistance force against the rotation of the grip 21 (operation to be housed in the housing portion 11) is applied. That is, the grip 21 rotates at a relatively low speed.

(Effects)

In the door handle apparatus 3, the rotation speed of the grip 21 when the grip 21 moves from the pop-up position to the initial position can be reduced. Therefore, even when the user releases the hand from the grip 21, the grip 21 is in the pop-up state for a while, and the user can grip the grip 21. For example, the user can grip the grip 21 and open the door DR again in the middle of closing the door DR.

Modification Example of Third Embodiment

The rotary damper 82 described above is configured to generate a resistance force against both a forward rotation direction (clockwise direction in FIG. 30D) and a reverse rotation direction (counterclockwise direction in FIG. 30D). Alternatively, a rotary damper including a latch mechanism that does not generate a resistance force at the time of the forward rotation but generates a resistance force only at the time of the reverse rotation may be adopted. According to this, it is possible to reduce the rotation speed of the grip 21 when the grip 21 moves from the pop-up position to the initial position while reducing the operation force at the time of popping up the grip 21.

A door handle apparatus for a vehicle according to the present disclosure is assembled to the door panel of the vehicle. The door handle apparatus for a vehicle includes: a grip that is allowed to be gripped from a vehicle exterior of the door panel, the grip being supported so as to be rotatable around a shaft extending in a predetermined direction, rotating in a first direction from a first state in which an outer surface of the grip is located in a same plane as an outer surface of the door panel to be transitionable to a second state in which the grip protrudes from the outer surface of the door panel, and rotating in a second direction opposite to the first direction from the second state to be transitionable to the first state; a biasing device that causes the grip to rotate in the second direction; and a resistance force generation device that generates a resistance force against an external force causing the grip to rotate in the second direction, the external force acting on the grip from the vehicle exterior.

In the door handle apparatus for a vehicle according to the aspect, when the user transitions the grip to the second state from the first state (pops up the grip) and releases the hand from the grip, a resistance force generation mechanism applies a resistance force to the rotation of the grip in the second direction. Accordingly, the grip does not immediately return to the first state, but the grip is in a pop-up state until a predetermined time elapses. That is, the user can grip the grip again. Therefore, practicality of the door handle apparatus for a vehicle according to the present disclosure is higher than that of the conventional apparatus.

In the door handle apparatus for a vehicle according to the aspect, the biasing device is a spring, and the resistance force generation device includes: a first lever that is engageable with the grip; a stopper that is engageable with the first lever; and an electric actuator that in the second state, engages the first lever with the grip and engages the stopper with the first lever to restrict a rotation of the grip in the second direction via the first lever, and retracts the stopper from the first lever to release the engagement between the first lever and the stopper when a predetermined condition is satisfied.

In this case, the electric actuator may include: a second lever that is rotatably supported around a predetermined shaft, and engaged with the stopper to drive the stopper; and an electric motor that rotates the second lever.

In the door handle apparatus for a vehicle according to the aspect, when the grip is popped up, the first lever is locked to the stopper, and the pop-up state is temporarily held. That is, even when the user releases the hand from the grip, the grip is in the pop-up state, and the user can grip the grip again. For example, the user can grip the grip and open the door again in the middle of closing the door.

In the door handle apparatus for a vehicle according to another aspect of the present disclosure, the biasing device is a spring, and the resistance force generation device is an oil damper.

According to this, a rotation speed of the grip when the grip returns from the second state to the first state can be reduced. Therefore, after the user releases the hand from the grip in the second state, the user can grip the grip again. The configuration of the apparatus is simpler as compared with a case where the pop-up state is held using the electric actuator.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A door handle apparatus for a vehicle, which is assembled to a door panel of the vehicle, the door handle apparatus comprising:
   a grip that is allowed to be gripped from a vehicle exterior of the door panel, the grip being supported so as to be rotatable around a shaft extending in a predetermined direction, rotating in a first direction from a first state in which an outer surface of the grip is located in a same plane as an outer surface of the door panel to be transitionable to a second state in which the grip protrudes from the outer surface of the door panel, and rotating in a second direction opposite to the first direction from the second state to be transitionable to the first state;
   a biasing device that causes the grip to rotate in the second direction; and
   a resistance force generation device that generates a resistance force against an external force causing the grip to rotate in the second direction, the external force acting on the grip from the vehicle exterior,
   wherein the biasing device is a spring,
   the resistance force generation device includes:
      a first lever that is engageable with the grip;
      a stopper that is engageable with the first lever; and
      an electric actuator that in the second state, engages the first lever with the grip and engages the stopper with the first lever to restrict a rotation of the grip in the second direction via the first lever, and retracts the stopper from the first lever to release the engagement between the first lever and the stopper when a predetermined condition is satisfied, and
   wherein the stopper includes a guide plate including a slit-like opening, and a head portion including a base portion and a flange portion that are orthogonal to each other, a cylindrical protrusion provided on a surface of the base portion is inserted into the slit-like opening, and a thickness direction of the flange portion being parallel to an extending direction of the slit-like opening.

2. The door handle apparatus for a vehicle according to claim 1, wherein the electric actuator includes:
   a second lever that is rotatably supported around a predetermined shaft, and engaged with the stopper to drive the stopper; and
   an electric motor that rotates the second lever.

3. The door handle apparatus for a vehicle according to claim 2, wherein the stopper is disposed adjacent to the second lever, and the guide plate of the stopper is parallel to the second lever.

4. The door handle apparatus for a vehicle according to claim 1, wherein the first lever is a plate-like member including a base portion rotatably supported around the shaft, and arms extending outward from an outer edge portion of the base portion.

* * * * *